US010642346B2

(12) United States Patent
Hayashida

(10) Patent No.: US 10,642,346 B2
(45) Date of Patent: May 5, 2020

(54) ACTION CONTROL METHOD AND DEVICE

(71) Applicant: FUJITSU LIMITED, Kawasaki-shi, Kanagawa (JP)

(72) Inventor: Naoko Hayashida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/788,890

(22) Filed: Oct. 20, 2017

(65) Prior Publication Data

US 2018/0120928 A1 May 3, 2018

(30) Foreign Application Priority Data

Oct. 31, 2016 (JP) ................................. 2016-213625

(51) Int. Cl.
G06F 3/01 (2006.01)
G06T 13/40 (2011.01)

(52) U.S. Cl.
CPC .............. G06F 3/011 (2013.01); G06T 13/40 (2013.01)

(58) Field of Classification Search
CPC ....... G06F 3/011; G06T 13/40; G06T 19/006; G06T 11/00; G06T 13/00; G06T 13/20; G06T 15/00; G06T 19/00; G06T 19/003; G02B 27/017; A63F 13/00; G06Q 30/00
USPC ........................................................ 345/619
See application file for complete search history.

(56) References Cited

U.S. PATENT DOCUMENTS

| 7,908,554 | B1* | 3/2011 | Blattner ............... G06Q 10/107 715/706 |
| 2009/0100351 | A1* | 4/2009 | Bromenshenkel ........ G06F 3/01 715/757 |
| 2009/0176520 | A1* | 7/2009 | B. S. ...................... G06Q 30/02 455/466 |
| 2009/0193077 | A1* | 7/2009 | Horii ........................ G06F 16/00 709/203 |
| 2011/0047486 | A1* | 2/2011 | Jones ..................... G06Q 30/02 715/757 |
| 2013/0241937 | A1* | 9/2013 | DeLuca .................. G06Q 50/01 345/501 |
| 2013/0331964 | A1 | 12/2013 | Huang |
| 2014/0073481 | A1* | 3/2014 | Aibara ................. G02B 27/017 482/1 |
| 2014/0347265 | A1* | 11/2014 | Aimone ................. G09G 3/003 345/156 |
| 2016/0042403 | A1* | 2/2016 | Tashiro .............. G06Q 30/0269 705/14.66 |

(Continued)

FOREIGN PATENT DOCUMENTS

| JP | 2004-287557 | 10/2004 |
| JP | 2005-100382 | 4/2005 |
| JP | 2008-233946 | 10/2008 |

(Continued)

Primary Examiner — Sae Won Yoon
(74) Attorney, Agent, or Firm — Fujitsu Patent Center

(57) ABSTRACT

An action control method includes when a first state of a first user in communication with a first machine avatar is detected, specifying a first action of the first machine avatar for changing a state of the first user from the first state to a second state that is more desirable than the first state based on history information indicating changes in states of users in response to actions of machine avatars or different users in communication with the users, and causing the first machine avatar to perform the first action.

18 Claims, 37 Drawing Sheets

(56) References Cited

U.S. PATENT DOCUMENTS

2016/0085420 A1* 3/2016 Agarwal ................. G06F 3/011
                                                        715/765
2018/0143025 A1* 5/2018 Kurata ................... G01C 21/26

FOREIGN PATENT DOCUMENTS

| JP | 2014-510336 | 4/2014 |
| WO | 2010/138582 | 12/2010 |

* cited by examiner

FIG. 4A
FIG. 4B
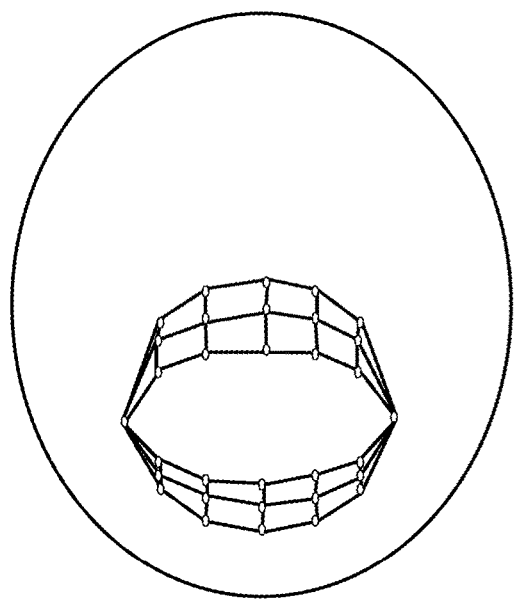
(a)
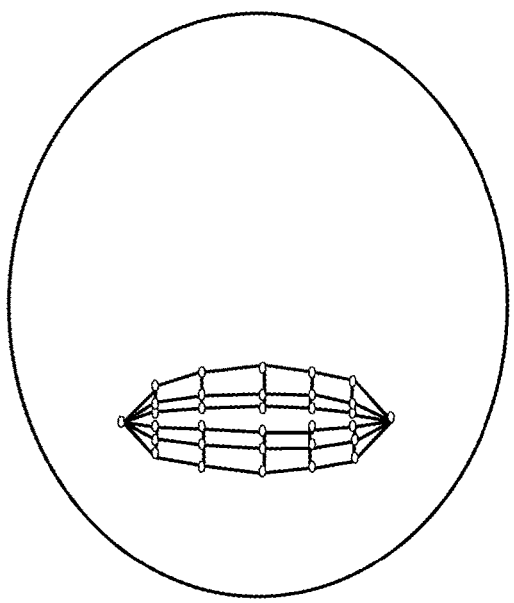
(b)

| MYOGENIC POTENTIAL DATA TABLE ||||| 
|---|---|---|---|---|
| DB RECORDING TIME | SENSOR RECORDING TIME | USER NAME | INFORMATION COLLECTING DEVICE ID | MYOGENIC POTENTIAL ACTIVITY VALUE(EMG($\mu$V)) |
| ⋮ | ⋮ | ⋮ | ⋮ | ⋮ |
| 2015/7/27 11:00:01.035 | 2015/7/27 11:00:01.000 | userA | TcA_c3_zygomaticus(cheek) | 33.9 |
| 2015/7/27 11:00:01.040 | 2015/7/27 11:00:01.010 | userA | TcA_c3_orbicularis(under eye) | 520. |
| 2015/7/27 11:00:05.069 | 2015/7/27 11:00:04.000 | userA | TcA_c3_corrugator(brow) | 20.2 |
| ⋮ | ⋮ | ⋮ | ⋮ | ⋮ |

| MYOGENIC POTENTIAL DATA TABLE ||||| 
|---|---|---|---|---|
| DB RECORDING TIME | SENSOR RECORDING TIME | USER NAME | INFORMATION COLLECTING DEVICE ID | HEAD ATTITUDE DATA (POSITION, ANGLE) |
| ⋮ | ⋮ | ⋮ | ⋮ | ⋮ |
| 2015/7/27 11:00:01.030 | 2015/7/27 11:00:00.000 | userA | TcA_c1 | (0,18,-10),(0,0,0) |
| 2015/7/27 11:00:03.0.25 | 2015/7/27 11:00:02.000 | userA | TcA_c1 | (0,18,-10),(0,0,1) |
| 2015/7/27 11:01:05.069 | 2015/7/27 11:00:04.000 | userA | TcA_c1 | (0,18,-10),(0,02.5) |
| ⋮ | ⋮ | ⋮ | ⋮ | ⋮ |

FIG. 8C

DEPTH SENSOR DATA FILE TABLE 830

| DB RECORDING TIME | SENSOR RECORDING START TIME | SENSOR RECORDING END TIME | USER NAME | INFORMATION COLLECTING DEVICE ID | DEPTH SENSOR DATA RECORDING FILE URI |
|---|---|---|---|---|---|
| ... | ... | ... | ... | ... | ... |
| 2015/7/27 11:00:01.030 | 2015/7/27 11:00:00.000 | 2015/7/27 11:00:01.000 | userA | TcA_c2 | 20150712_0011100_00.exf |
| 2015/7/27 11:00:03.0.25 | 2015/7/27 11:00:02.000 | 2015/7/27 11:00:03.000 | userA | TcA_c2 | 20150712_0011102_00.exf |
| 2015/7/27 11:01:05.069 | 2015/7/27 11:00:04.000 | 2015/7/27 11:01:05.000 | userA | TcA_c2 | 20150712_0011104_00.exf |
| ... | ... | ... | ... | ... | ... |

FIG. 9

LOG TABLE RELATED TO AVATAR DISPLAY INFORMATION 900

| DB RECORDING TIME | USER PRESENT TIME | USER NAME | INFORMATION PROCESSING DEVICE ID | LOG TYPE LABEL | AVATAR DISPLAY INFORMATION LOG DATA |
|---|---|---|---|---|---|
| .. | .. | .. | .. | .. | .. |
| 2015/7/27 11:00:00.020 | 2015/7/27 11:00:00.000 | userA | TCA | BONE | \<Human>\<Head>\<Bone>((0,18,-10),(0,1,0))\</Bone> \<RightEye>... \</Head> \<Neck>\<Bone>.... \<RightShoulder>... \</Neck> \<Spine>....\</Spine> \<Chest>....\</Chest> \<Hip>\<RightUppLeg>..\</RightUppLeg> \<LeftUppLeg>..\</LeftUppLeg> ... \</Hip>\<Human> |
| 2015/7/27 11:00:00.020 | 2015/7/27 11:00:00.000 | userA | TCA | Mesh | \<Human>\<Head>\<Mesh>HeadMeshesMatrix □ \</Mesh> \<RightEye>... \<>\<Mouse>.... \</Head> \<Neck>\<Bone>.... \<RightShoulder>... \</Neck> \<Spine>....\</Spine> \<Chest>....\</Chest> \<Hip>\<RightUppLeg>..\</RightUppLeg> \<LeftUppLeg>..\</LeftUppLeg> ... \</Hip>\<Human> |

FIG. 10A

LOG TABLE RELATED TO DESIRABLE NON-VERBAL BEHAVIOR ~1010

| DB RECORDING TIME | USER PRESENT TIME | USER NAME | INFORMATION PROCESSING DEVICE ID | DESIRABLE NON-VERBAL BEHAVIOR | CHECKING RESULT |
|---|---|---|---|---|---|
| .. | .. | .. | .. | .. | .. |
| 2015/7/27 11:00:01.030 | 2015/7/27 11:00:00.000 | userA | TcA_c2 | Flow | false |
| .. | .. | .. | .. | .. | .. |

FIG. 10B

LOG TABLE RELATED TO CONVERSATION HISTORY ~1020

| DIALOG START TIME | DIALOG END TIME | USER NAME 1 | USER NAME 2 |
|---|---|---|---|
| .. | .. | .. | .. |
| 2015/7/27 9:00:00.000 | 2015/7/27 9:30:00.000 | userA | userB |
| 2015/7/27 9:10:00.000 | 2015/7/27 9:32:00.000 | userA | userC |
| .. | .. | .. | .. |

FIG. 11

| MONITORING TARGET DEFINITION INFORMATION ⌐1100 | | |
|---|---|---|
| COMMUNICATION PARTNER USER NAME | MONITORING TARGET | TRIGGER CHECKING API |
| ⋮ | ⋮ | ⋮ |
| userA | Bone_Chest | isSigh |
| userA | Bone_Head, Bone_LeftShoulder, Bone_Rightshoulder | isNap |
| userC | Bone_Head | isNap |
| N/D | Bone_Head, Bone_Chest | isRestles |
| ⋮ | ⋮ | ⋮ |

| COMMUNICATION STRATEGY DEFINITION INFORMATION | | |
|---|---|---|
| COMMUNICATION PARTNER USER NAME | TRIGGERING NON-VERBAL BEHAVIOR | DESIRABLE NON-VERBAL BEHAVIOR |
| userA | isSigh, return true | Flow |
| N/D | isRestles, return true | Flow |
| N/D | N/D | Smile |
| ⋮ | ⋮ | ⋮ |

| USER STATE CHECKING API DEFINITION INFORMATION | | |
|---|---|---|
| USER STATE | INPUT TARGET DATA | USER STATE CHECKING API |
| ⋮ | ⋮ | ⋮ |
| Flow | Bone_Head, Bone_Spine | checkFlow |
| Flow | shape_Mouth | checkSmile |
| ⋮ | ⋮ | ⋮ |

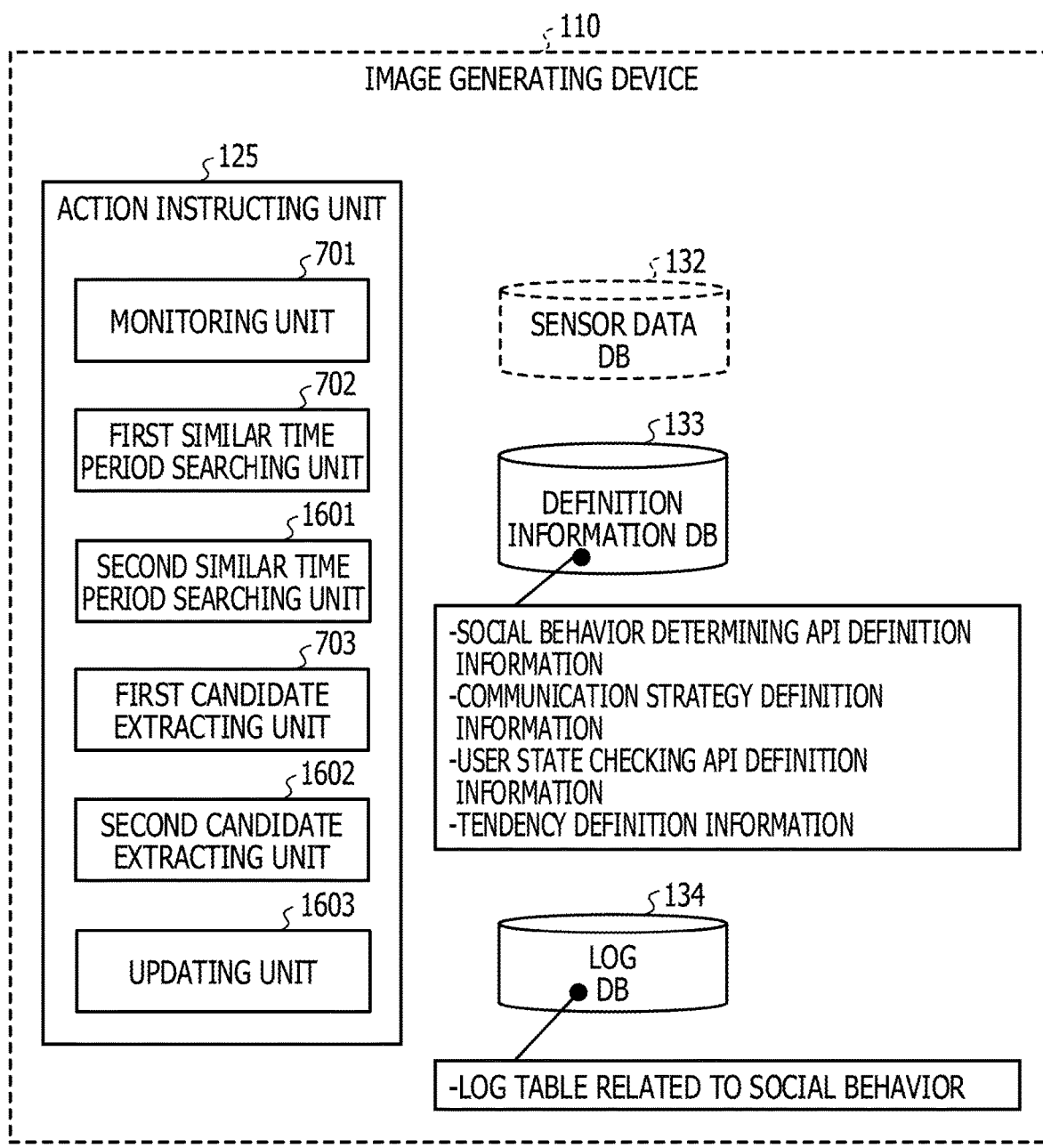

FIG. 17

LOG TABLE RELATED TO SOCIAL BEHAVIOR (1700)

| DB RECORDING TIME | SOCIAL BEHAVIOR DETERMINATION TIME (START) | SOCIAL BEHAVIOR DETERMINATION TIME (END) | USER NAME | INFORMATION PROCESSING DEVICE ID | SOCIAL BEHAVIOR TYPE LABEL | SOCIAL BEHAVIOR TARGET | SOCIAL BEHAVIOR STAGE LABEL | LOG DATA |
|---|---|---|---|---|---|---|---|---|
| ... | ... | ... | ... | ... | ... | ... | ... | ... |
| 2015/7/27 11:02:03.020 | 2015/7/27 11:00:04.000 | 2015/7/27 11:01:05.000 | userA | TcA | body-close-to | userB | S | Bone_Chest From ((0,8,-10),(4,0,0)) To ((0,8,-10),(12,0,0)) |
| 2015/7/27 11:02:05.050 | 2015/7/27 11:00:00.000 | 2015/7/27 11:00:04.000 | userA | TcA | bodyparts-close-to | userB | S | Bone_LeftHand From ((0,25,-12),(0,0,0)) To ((0,25,-12),(90,0,0)) |
| ... | ... | ... | ... | ... | ... | ... | ... | ... |

FIG. 18

| SOCIAL BEHAVIOR DETERMINING API DEFINITION INFORMATION | | | | |
|---|---|---|---|---|
| INFORMATION PROCESSING DEVICE ID | SOCIAL BEHAVIOR DETERMINING API | SENSOR DATA | SOCIAL BEHAVIOR TYPE LABEL | BONE DESIRED AS API INPUT |
| ⋮ | ⋮ | ⋮ | ⋮ | ⋮ |
| c2 | POSE ANALYZING API | DEPTH SENSOR DATA RECORDING | body-close-to | Bone_Chest |
| c2 | POSE ANALYZING API | DEPTH SENSOR DATA RECORDING | body-far-to | Bone_Chest |
| c1 | FACE ORIENTATION ANALYZING API | HEAD POSE DATA RECORDING | face-close-to | Bone_Chest |
| c1 | POSE ANALYZING API | DEPTH SENSOR DATA RECORDING | boduparts-close-to | Bone_LeftHand, Bone_RightHand |
| ⋮ | ⋮ | ⋮ | ⋮ | ⋮ |

FIG. 19A

| COMMUNICATION STRATEGY DEFINITION INFORMATION | | | 1910 |
|---|---|---|---|
| COMMUNICATION PARTNER USER NAME | TRIGGERING NON-VERBAL BEHAVIOR | DESIRABLE SOCIAL BEHAVIOR | |
| userA | isSigh, return true | SocialFlow | |
| N/D | N/D | SocialSmile | |
| ⋮ | ⋮ | ⋮ | |

FIG. 19B

| USER STATE CHECKING API DEFINITION INFORMATION | | | 1920 |
|---|---|---|---|
| USER STATE | INPUT TARGET DATA | USER STATE CHECKING API | |
| ⋮ | ⋮ | ⋮ | |
| SocialFlow | jointattention-to, upperbody-leanforward-to | checkSocialFlow | |
| SocialSmile | mutualattention-to, face-indirect-to, smile-to | checksocialSmile | |
| ⋮ | ⋮ | ⋮ | |

FIG. 20

| TENDENCY DEFINITION INFORMATION 2000 ||
|---|---|
| SOCIAL BEHAVIOR TYPE LABEL | APPROACHING TENDENCY/AVOIDING TENDENCY |
| body-close-to | APPROACHING TENDENCY |
| body-far-to | AVOIDING TENDENCY |
| bodyparts-close-to | APPROACHING TENDENCY |
| bodyparts-far-to | AVOIDING TENDENCY |
| mutualattention-to | APPROACHING TENDENCY |
| avertedattention-to | AVOIDING TENDENCY |
| jointattention-to | APPROACHING TENDENCY |
| followingattention-to | APPROACHING TENDENCY |
| sharedattention-to | APPROACHING TENDENCY |
| face-close-to | APPROACHING TENDENCY |
| face-far-to | AVOIDING TENDENCY |
| uperbody-leanforward-to | APPROACHING TENDENCY |
| upperbodu-leanbackward-to | AVOIDING TENDENCY |
| ⋮ | ⋮ |
| smile-to | APPROACHING TENDENCY |
| nosmile-to | AVOIDING TENDENCY |

FIG. 28

| | | | ⌐ 2800 |
|---|---|---|---|
| MONITORING TARGET DEFINITION INFORMATION | | | |
| COMMUNICATION PARTNER USER NAME | MONITORING TARGET | SUBTLE BEHAVIOR CHECK | TRIGGER CHECKING API |
| : | : | : | : |
| userA | Bone_Chest | false | isSigh |
| userA | Bone_Head, Bone_LeftShoulder, Bone_Rightshoulder | false | isNap |
| userC | Bone_Head | false | isNap |
| N/D | Bone_Head, Bone_Chest | true | isRestles |
| : | : | : | : |

FIG. 32

| COMMUNICATION PARTNER USER NAME | MONITORING TARGET DEFINITION INFORMATION ||||
|---|---|---|---|---|
| | MONITORING TARGET | STEADY NON-VERBAL BEHAVIOR FILTERING | STEADY NON-VERBAL BEHAVIOR FREQUENCY BAND | TRIGGER CHECKING API |
| .. | .. | .. | .. | .. |
| userA | Bone_Chest | false | isSigh | isSigh |
| userA | Bone_Head, Bone_LeftShoulder, Bone_Rightshoulder | true | Bone_LeftShoulder=LOW, Bone_RightShoulder=LOW | isNap |
| userC | Bone_Head | false | isNap | isNap |
| N/D | Bone_Head, Bone_Chest | true | isRestles | isRestles |
| .. | .. | .. | .. | .. |

3200

US 10,642,346 B2

ACTION CONTROL METHOD AND DEVICE

CROSS-REFERENCE TO RELATED APPLICATION

This application is based upon and claims the benefit of priority of the prior Japanese Patent Application No. 2016-213625, filed on Oct. 31, 2016, the entire contents of which are incorporated herein by reference.

FIELD

The embodiments discussed herein are related to an action instruction program, an action instruction method, and an image generating device.

BACKGROUND

In a communication service, communication is performed between users or a user and a machine via avatars in a virtual reality space.

In order to make communication proceed smoothly and construct interpersonal relationship appropriately via avatars in a virtual reality space, it may be important to maintain a balance of mutual intimacy as in a real space. Examples of the related art include Japanese National Publication of International Patent Application No. 2014-510336, Japanese Laid-open Patent Publication No. 2005-100382, Japanese Laid-open Patent Publication No. 2008-233946, and International Publication Pamphlet No. WO 2010/138582.

SUMMARY

According to an aspect of the embodiment, an action control method includes when a first state of a first user in communication with a first machine avatar is detected, specifying a first action of the first machine avatar for changing a state of the first user from the first state to a second state that is more desirable than the first state based on history information indicating changes in states of users in response to actions of machine avatars or different users in communication with the users, and causing the first machine avatar to perform the first action.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are second diagrams of assistance in explaining an avatar image representing method;

FIGS. 8A, 8B, and 8C are diagrams illustrating an example of data tables stored in a sensor data DB;

FIG. 9 is a first diagram illustrating an example of a log table stored in a log DB;

FIGS. 10A and 10B are second diagrams illustrating an example of log tables stored in a log DB;

FIG. 11 is a first diagram illustrating an example of definition information stored in a definition information DB;

FIGS. 12A and 12B are second diagrams illustrating an example of definition information stored in a definition information DB;

FIG. 16 is a second diagram illustrating a functional configuration of an action instructing unit and respective DBs in an image generating device;

FIG. 17 is a third diagram illustrating an example of log tables stored in a log DB;

FIG. 18 is a third diagram illustrating an example of definition information stored in a definition information DB;

FIGS. 19A and 19B are fourth diagrams illustrating an example of definition information stored in a definition information DB;

FIG. 20 is a fifth diagram illustrating an example of definition information stored in a definition information DB;

FIG. 28 is a sixth diagram illustrating an example of definition information stored in a definition information DB;

FIG. 32 is a seventh diagram illustrating an example of definition information stored in a definition information DB;

DESCRIPTION OF EMBODIMENTS

Figure 1:
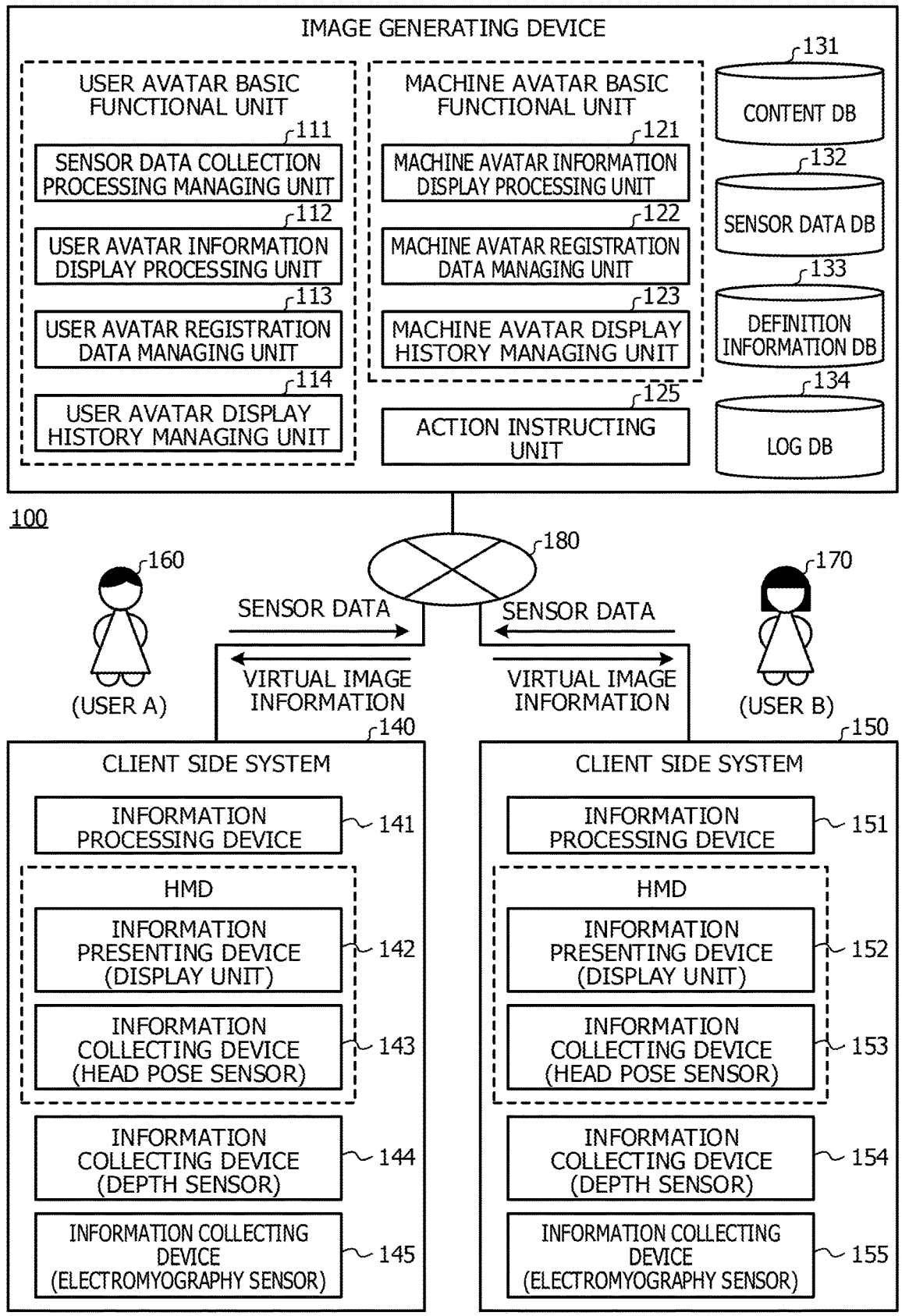
FIG. 1 is a diagram illustrating an example of an entire configuration of an image generating system.

In order to maintain a balance of mutual intimacy, it is desired that in communication between a user and a machine, for example, the non-verbal behavior of the user be analyzed and a result of the analysis be reflected in the behavior of an avatar of the machine. The non-verbal behavior is, for example, an action such as making eye contact, achieving physical closeness, a body gesture, a hand gesture, or a smile.

For example, it is desired that when the user performs such a non-verbal behavior as to disturb the balance of mutual intimacy, the avatar of the machine be operated so as to perform a non-verbal behavior such that the user maintains the balance of mutual intimacy.

Brief description will first be made of definitions of terms used in explaining an image generating system in each embodiment. The image generating system to be described in each of the following embodiments is a system that provides a virtual reality space for communication performed between users present at places separated from each other or between a user and a machine.

The "virtual reality space" in this case refers to a space in which the body of an avatar may be expressed by the positions and rotation angles of bones. Therefore, suppose that the virtual reality space includes a space in which the avatar of another user is projected in a real space in which a certain user is present, and it is difficult for the user himself/herself present in the real space to see the avatar of the user himself/herself.

In addition, of avatars having the positions and rotation angles of bodies expressed by bones in the virtual reality space, an avatar whose image is generated so as to be in synchronism with the non-verbal behavior (action) of the user in the real space will be referred to as a "user avatar." In addition, of the avatars having the positions and rotation angles of the bodies expressed by bones in the virtual reality space, the avatar of a machine operating autonomously according to instructions of a computer program will be referred to as a "machine avatar" (in the following, however, the avatar of the machine, including the machine itself that operates autonomously, will be referred to as a machine avatar). Incidentally, "bones" are objects indicating respective body parts of the body of an avatar in the virtual reality space, and include information such as positions and rotation angles.

In addition, of non-verbal behaviors of the user in the real space, non-verbal behaviors directed to a communication partner (communication target) will be referred to as "social behaviors." The social behaviors include various kinds of non-verbal behaviors such as making eye contact, looking at a same thing, turning the body toward the partner, approaching the partner, and smiling at the partner.

Description will next be made of an outline of processing of the image generating system in each embodiment. The image generating system in each of the following embodiments monitors non-verbal behaviors of the user as a communication partner for the machine avatar in the virtual reality space, and determines whether or not the user has performed a "particular non-verbal behavior." Then, when it is determined that the user has performed the particular non-verbal behavior, reference is made to the behavior of a communication partner that the user was communicating with when performing the particular non-verbal behavior in the past. Then, a next behavior of the machine avatar is determined based on the behavior of the communication partner such that the user performs a desirable non-verbal behavior and a behavior series including the desirable non-verbal behavior or such that the user is in a state (desirable user state) after performing the behavior series including the desirable non-verbal behavior. Incidentally, in each of the following embodiments, having performed the behavior series including the desirable non-verbal behavior and being in the desirable user state will be referred to collectively as a "post desirable-change user state." For example, the image generating system determines, while referring to the behavior of the communication partner in the past with the user, what behavior is appropriate as the behavior of the machine avatar for bringing the user into the "post desirable-change user state," and reflects a result of the determination in a next behavior of the machine avatar.

Thus, the machine avatar may perform an own behavior determined to be most appropriate to change the state of the user to a state desirable for the machine avatar. The behavior of the machine avatar is determined after appropriateness is determined from both aspects of appropriateness for the user as a conversation partner and appropriateness when the machine avatar itself performs the behavior. It is consequently possible to make communication between the user and the machine avatar proceed smoothly, and construct interpersonal relationship therebetween appropriately.

Each embodiment will be described in the following with reference to the accompanying drawings. It is to be noted that in the present specification and the drawings, constituent elements having substantially same functional configurations are identified by the same reference symbols, and thereby repeated description thereof will be omitted.

[First Embodiment]

<Entire Configuration of Image Generating System>

An image generating system will first be described. FIG. 1 is a diagram illustrating an example of an entire configuration of an image generating system. As illustrated in FIG. 1, an image generating system 100 includes: an image generating device 110 in which server software is arranged; and client side systems 140 and 150 including information processing devices 141 and 151 in which client application software is arranged. The image generating device 110 and the client side systems 140 and 150 are coupled to each other via a network 180 typified by the Internet, a local area network (LAN), or the like.

In the image generating system 100, the image generating device 110 and the client side systems 140 and 150 perform whole processing in a divided manner. The image generating system 100 thereby provides communication service. A user 160 (user identifier (ID)="userA") and a user 170 (user ID="userB") use the communication service provided by the image generating system 100 at places separated from each other. Thus, the user 160 and the user 170 may communicate with each other in the same virtual reality space via user avatars (images in states associated with the users).

The image generating device 110 is a server device that collects sensor data obtained as a result of sensing the users 160 and 170 and which performs various kinds of processing.

Installed on the image generating device 110 are a user avatar basic function program, a machine avatar basic function program, and an action instructing program as the server software. When these programs are executed, the image generating device 110 functions as a user avatar basic functional unit, a machine avatar basic functional unit, and an action instructing unit 125.

The user avatar basic functional unit includes a sensor data collection processing managing unit 111, a user avatar information display processing unit 112, a user avatar registration data managing unit 113, and a user avatar display history managing unit 114. The user avatar basic functional unit implements basic functions related to the user avatars when the communication service is provided.

The sensor data collection processing managing unit 111 collects sensor data obtained as a result of sensing the users 160 and 170, and stores the sensor data in data tables of a sensor data database (database will hereinafter be abbreviated to a DB) 132.

The user avatar information display processing unit 112 generates an image of a user avatar in the virtual reality space based on the sensor data stored in the sensor data DB 132. The user avatar information display processing unit 112 generates the image of the user avatar using an avatar skeleton model stored in a content DB 131, for example. The avatar skeleton model is an image of a human model, and is an image expressing the movement of body parts, which movement accompanies a non-verbal behavior of the user, using a plurality of bones. The user avatar information display processing unit 112 generates the image of the user avatar by calculating the position and rotation angles of each bone in the virtual reality space, and reflects the calculated position and the calculated rotation angles in the avatar skeleton model.

In addition, the user avatar information display processing unit 112 generates (or updates) virtual reality space information by embedding the image of the user avatar and an image of a machine avatar to be described later in an image of the virtual reality space (background image), the background image being stored in the content DB 131. The user avatar information display processing unit 112 further transmits the generated or updated virtual reality space information to the client side systems 140 and 150.

The user avatar registration data managing unit 113 registers, in the content DB 131 and a definition information DB 133, various kinds of definition information used when the user avatar information display processing unit 112 generates and transmits the virtual reality space information.

The user avatar display history managing unit 114 records log data used in generating the image of the user avatar in a log table of a log DB 134.

The machine avatar basic functional unit includes a machine avatar information display processing unit 121, a machine avatar registration data managing unit 122, and a machine avatar display history managing unit 123. The machine avatar basic functional unit implements basic functions related to the machine avatar when the communication service is provided.

The machine avatar information display processing unit 121 refers to the log data used in generating the image of the user avatar, the log data being stored into the log DB 134 by the user avatar display history managing unit 114, and generates an image of the machine avatar in the virtual reality space. The machine avatar information display processing unit 121 generates the image of the machine avatar such that the machine avatar performs a standard behavior according to the non-verbal behavior of the communication partner user and a communication strategy possessed by the machine avatar.

In addition, the machine avatar information display processing unit 121 notifies the generated image of the machine avatar to the user avatar information display processing unit 112. The image of the machine avatar is consequently embedded in the virtual reality space information generated by the user avatar information display processing unit 112.

Incidentally, the machine avatar information display processing unit 121 changes the image of the machine avatar, which image is to be notified to the user avatar information display processing unit 112, based on an instruction from the action instructing unit 125.

For example, when an instruction is given from the action instructing unit 125 to display an image of the machine avatar, which image is generated in the action instructing unit 125, at a next time, the machine avatar information display processing unit 121 notifies the image of the machine avatar which image is generated in the action instructing unit 125 to the user avatar information display processing unit 112.

When an instruction is given from the action instructing unit 125 to display an image of the machine avatar for performing a standard behavior at the next time, on the other hand, the machine avatar information display processing unit 121 notifies the image of the machine avatar which image is generated in the machine avatar information display processing unit 121 to the user avatar information display processing unit 112.

Incidentally, the action instructing unit 125 instructs the machine avatar information display processing unit 121 to display the image of the machine avatar for performing the standard behavior at the next time when it is difficult for the action instructing unit 125 to determine an appropriate image for the machine avatar.

The machine avatar registration data managing unit 122 registers, in the content DB 131, various kinds of information used in generating the image of the machine avatar.

The machine avatar display history managing unit 123 records log data used in generating the image of the machine avatar in a log table of the log DB 134.

The action instructing unit 125 monitors the non-verbal behavior of the communication partner user using the log data used in generating the image of the user avatar. In addition, the action instructing unit 125 determines whether or not the communication partner user has performed a particular non-verbal behavior based on a result of the monitoring. Further, when the action instructing unit 125 determines that the communication partner user has performed a particular non-verbal behavior, the action instructing unit 125 determines an appropriate image of the machine avatar for bringing the user into a post desirable-change user state, and gives an instruction to the machine avatar information display processing unit 121.

When it is difficult for the action instructing unit 125 to determine an appropriate image of the machine avatar for bringing the user into a post desirable-change user state, on the other hand, the action instructing unit 125 instructs the machine avatar information display processing unit 121 to display an image of the machine avatar for performing a standard behavior.

Thus, in the image generating device 110 in the first embodiment, when it is determined that the communication partner user has performed a particular non-verbal behavior, a next image of the machine avatar is determined so that the user changes to a post desirable-change user state. For example, it is possible to determine what behavior is appropriate for bringing the user into a post desirable-change user state, and reflect a result of the determination in a next behavior of the machine avatar.

The client side systems will next be described. Incidentally, because the client side system 140 and the client side system 150 include a similar configuration, the following description will be made of the client side system 140.

The client side system 140 includes the information processing device 141, an information presenting device 142, and information collecting devices 143 to 145.

An information processing program as a client application is installed in the information processing device 141. The information processing device 141 transmits sensor data output from the information collecting devices 143 to 145 to the image generating device 110, and receives the virtual reality space information transmitted from the image generating device 110 and outputs the virtual reality space information to the information presenting device 142.

Incidentally, in the first embodiment, description will be made supposing that the information processing device 141 is included in an environment embedded terminal surrounding the user 160. However, the information processing device 141 does not have to be included in an environment embedded terminal. For example, the information processing device 141 may be included in an HMD. Alternatively, the information processing device 141 may be included in a wearable mobile terminal such as a contact lens or an eyeglass, in a stationary server device, or the like.

The information presenting device 142 displays the virtual reality space information transmitted from the image generating device 110 to the user 160. Incidentally, in the first embodiment, the information presenting device 142 is implemented by a display unit of an HMD.

The information collecting devices 143 to 145 sense the non-verbal behavior of the user 160 in the real space, and output sensor data.

In the first embodiment, the information collecting device 143 is a head pose sensor, and is included in the HMD. The head pose sensor 143 senses a "head orientation" included in the non-verbal behavior of the user 160 in the real space, and outputs head pose data.

In addition, in the first embodiment, the information collecting device 144 is a depth sensor. The depth sensor 144 is installed in front of the user 160. The depth sensor 144 outputs a two-dimensional depth image or the like that changes according to the non-verbal behavior of the user 160 in the real space by sensing a three-dimensional distance from the installation position of the depth sensor 144 to the user 160. Data (for example, 3 cm) indicating the depth of an object which depth is measured by the depth sensor 144 will be referred to herein as depth data. In addition, the two-dimensional depth image refers to an image obtained by plotting the depth data obtained from the depth sensor 144 in an XY plane. Each pixel on the two-dimensional depth image stores the value of a distance to an object (nearest object as viewed from the depth sensor 144) at a corresponding XY coordinate position, the distance being obtained from the depth sensor 144. Incidentally, data obtained from the depth sensor 144 (which data includes a color image as well as the depth data and the two-dimensional depth image, and the like) will be referred to collectively as depth sensor data.

In addition, in the first embodiment, the information collecting device 145 is a electromyography sensor. The electromyography sensor 145 senses a "change in expression" which change is included in the non-verbal behavior of the user 160 in the real space, and outputs myogenic potential data.

Incidentally, while the following description will be made supposing that one user is assigned onto one device (information processing device) in which client application software is arranged, a plurality of users may be assigned onto one device.

In addition, while the following description will be made supposing that server software and client application software are each arranged on one device (one image generating device or one information processing device), a plurality of pieces of software may be arranged on one device. Alternatively, the server software and the client application software may be arranged on one device. Alternatively, functions implemented in each software including the server software and the client application software may be distributed and arranged in a plurality of devices.

In addition, suppose in the following that the client application software identifies the user 160, and converts the virtual reality space information transmitted from the image generating device 110 into virtual reality space information corresponding to the identified user 160 and displays the virtual reality space information corresponding to the identified user 160.

In addition, the following description will be made supposing that sensor data obtained as a result of sensing the non-verbal behavior of the user 160 is transmitted to the image generating device 110 in association with the user 160. Incidentally, suppose that the information processing device 141 in which the client application software is arranged is access-controlled by the client application software or the server software. For example, suppose in the following that the client application software performs personal identification (user authentication) in advance in the information processing device 141 in which the client application software is arranged.

In addition, suppose in the following that the client application software checks specifications of the information presenting device 142, and converts the virtual reality space information transmitted from the image generating device 110 into virtual reality space information corresponding to the checked specifications and displays the virtual reality space information corresponding to the checked specifications.

In addition, suppose in the following that the client application software identifies the information processing device 141, and transmits the sensor data obtained as a result of sensing the non-verbal behavior of the user 160 to the image generating device 110 in association with the information processing device 141.

In addition, the following description will be made supposing that the user 160 has one kind of identifier identifying the user 160. However, in a case where the image generating system 100 provides a plurality of services, the user 160 may have different identifiers for the respective services. In that case, however, suppose that the image generating system 100 manages association between the plurality of identifiers possessed by the user 160.

In addition, while the following description will be made supposing that the head pose sensor, the depth sensor, and the electromyography sensor as the information collecting devices 143 to 145 sense the non-verbal behavior of the user 160, another sensor may sense the non-verbal behavior of the user 160. The other sensor includes, for example, a moving image imaging device, a 1 timeframe image (color image) imaging device, an audio obtaining device, and a biosensor.

Incidentally, there may be a case where data on the user 160 is not included in the sensor data of a contactless type sensor as in a case where the user 160 does not appear in a 1 timeframe image in which the user 160 is to be detected, for example. In addition, there may be, for example, a case where a plurality of users are detected in the 1 timeframe image in which the user 160 is to be detected and it is difficult to distinguish which users are sensed. The present embodiment assumes that separate measures are taken for such events, and that the sensor data is correctly associated with the user 160 in the image generating device 110.

In addition, while the following description will be made supposing that the sensor data itself sensed by the information collecting devices 143 to 145 is transmitted to the image generating device 110, intermediate information that may be derived from the sensed sensor data may be transmitted to the image generating device 110. For example, in a case where face image data of the user 160 is sensed, information indicating the magnitude of a change in a smiling face, the information being derived by directing attention to face parts of the user 160, may be transmitted to the image generating device 110. Alternatively, information indicating a change in body posture, the information being derived by directing attention to the size of the face of the user 160, may be transmitted to the image generating device 110.

Further, suppose in the following that time stamps are added to the sensor data transmitted from the information processing devices 141 and 151. In addition, suppose that time adjustment between the client side system 140 and the client side system 150 is completed for the time stamps added in this case.

<Image of Virtual Reality Space>

Figure 2:
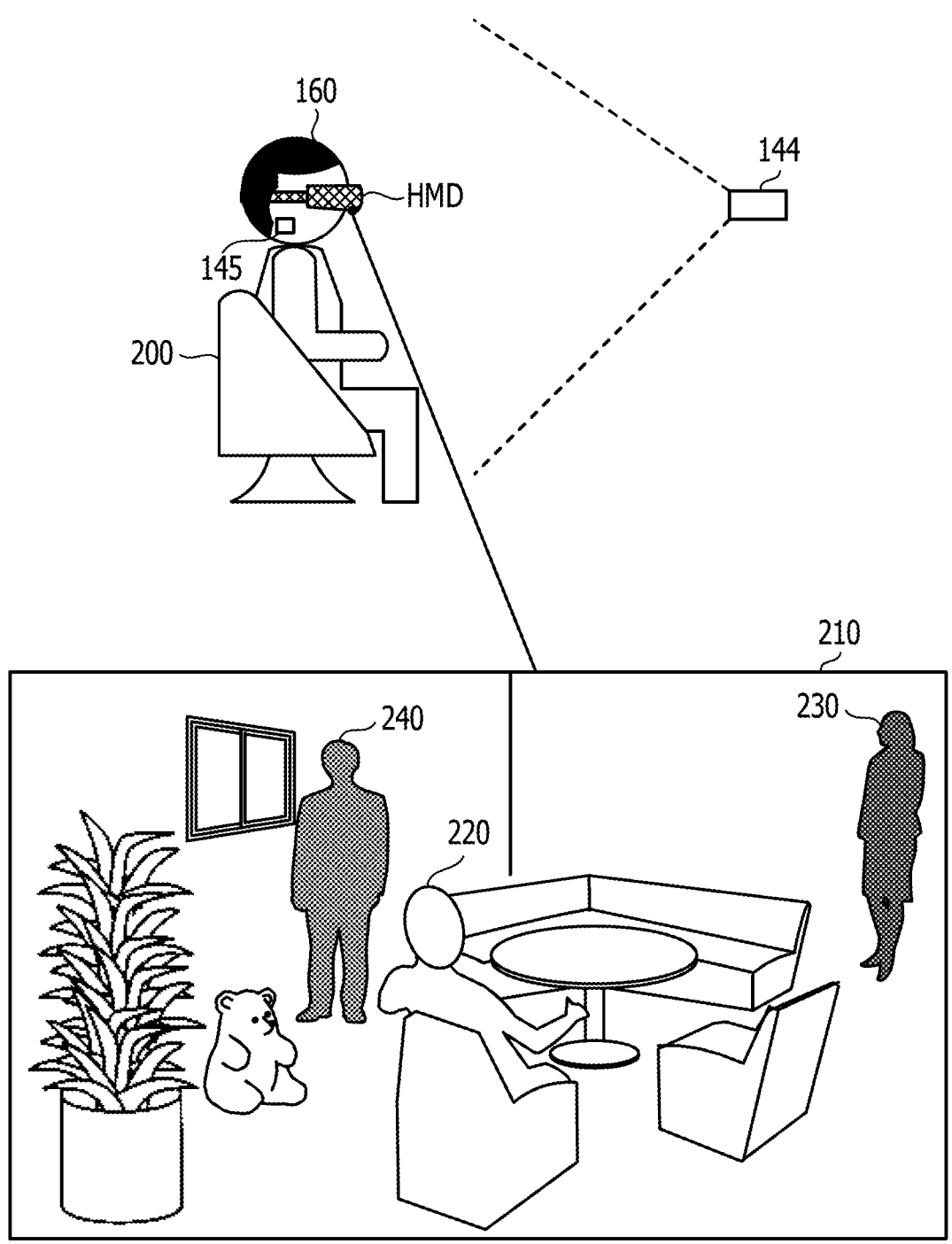
FIG. 2 is a diagram illustrating an example of an image of a virtual reality space.

Description will next be made of an image of the virtual reality space which image includes images of the user avatars of the user 160 and the user 170 and an image of the machine avatar. FIG. 2 is a diagram illustrating an example of an image of a virtual reality space.

As illustrated in FIG. 2, a user (the user 160 in this case) using the communication service is seated in a chair 200, for example, wearing the HMD (HMD including the head pose sensor 143 and the display unit 142) and the electromyography sensor 145 in the real space. In addition, the depth sensor 144 is installed in front of the user 160 to sense the user 160.

Head pose data, depth sensor data, and myogenic potential data obtained by sensing by the head pose sensor 143, the depth sensor 144, and the electromyography sensor 145 are transmitted to the image generating device 110 to generate an image 220 of the user avatar of the user 160. Similar processing is also performed for the user 170 to generate an image 230 of the user avatar of the user 170.

In addition, the image generating device 110 generates an image 240 of the machine avatar that communicates with the user 160 and the user 170. Further, the images of the user avatars and the machine avatar which images are generated in the image generating device 110 are incorporated into an image of the virtual reality space, and the image of the virtual reality space is transmitted as virtual reality space information to each of the information processing devices 141 and 151.

An image 210 illustrated in FIG. 2 is an example of the image of the virtual reality space, the image of the virtual reality space being included in the virtual reality space information transmitted to the information processing device 141. The image 210 incorporates the image 220 of the user avatar of the user 160 and the image 230 of the user avatar of the user 170 as well as the image 240 of the machine avatar. As illustrated in FIG. 2, the image 210 is displayed such that the user 160 sees the image 220 of the user avatar of the user 160 himself/herself from behind. When the user 160 performs a non-verbal behavior in this state, the image 220 of the user avatar within the image 210 also changes in synchronism. According to the image 210, the user 160 checks the image 220 of the user avatar, which image changes within the virtual reality space according to the non-verbal behavior of the user 160 himself/herself, from the rear side of the image 220 of the user avatar.

<Method of Representing Image of Avatar>

Description will next be made of a method of representing an image of an avatar (the user avatars and the machine avatar) in the virtual reality space. The image generating device 110 in the first embodiment represents the position and rotation angles of each bone in the virtual reality space using the avatar skeleton model. In addition, the image generating device 110 in the first embodiment generates an image of the avatar by representing the states of surfaces of the avatar (clothes of the avatar, the color of the body, expression, and the like) using a point group referred to as a mesh.

The avatar skeleton model will first be described. As described above, a plurality of bones are included in the avatar skeleton model. For example, the bone of a head is included in the head of the avatar skeleton model. The position and rotation angles of the bone of the head are calculated based on head pose data. In addition, the bones of a body and limbs other than the head are included in the body and limbs other than the head of the avatar skeleton model. The positions and rotation angles of these bones are calculated based on depth sensor data.

Figure 3:
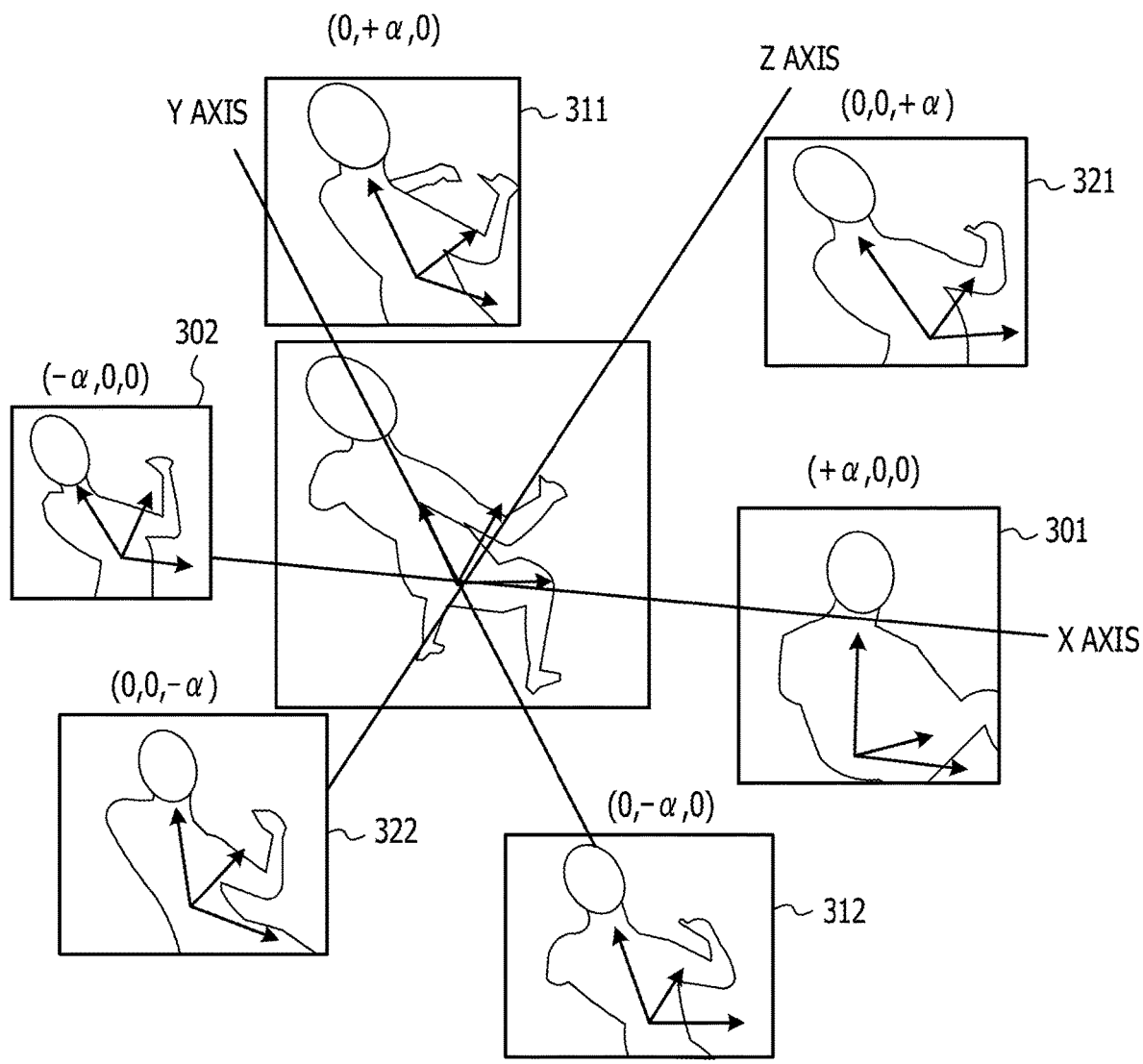
FIG. 3 is a first diagram of assistance in explaining an avatar image representing method.

The following description will be made of, as an example, a representing method that represents an image of an upper part of the body of the avatar using the avatar skeleton model. FIG. 3 is a first diagram illustrating an example of an avatar image representing method. FIG. 3 represents, as an image of the avatar, a non-verbal behavior in which the upper part of the body of the user leans forward or backward, a non-verbal behavior in which the user changes the orientation of the upper part of the body so as to look around left or right, and a non-verbal behavior in which the whole of the upper part of the body sways to a left side or a right side. In the case of the representing method using the avatar skeleton model, a bone ("Bone_Chest") located in the vicinity of the waist of the avatar being set as an origin, these non-verbal behaviors may be represented as changes in rotation angles of the bone with respect to three axial directions.

Incidentally, in FIG. 3, an X-axis, a Y-axis, and a Z-axis of a coordinate system uniquely defined in the virtual reality space are respectively set as a left-right direction, an upward-downward direction, and a front-rear direction of the avatar.

An image 301 represents an image of the avatar in a case where the bone is rotated by +α [degrees] with respect to the X-axis. An image 302 represents an image of the avatar in a case where the bone is rotated by −α [degrees] with respect to the X-axis. In addition, an image 311 represents an image of the avatar in a case where the bone is rotated by +α [degrees] with respect to the Y-axis. An image 312 represents an image of the avatar in a case where the bone is rotated by −α [degrees] with respect to the Y-axis.

Further, an image 321 represents an image of the avatar in a case where the bone is rotated by +α [degrees] with respect to the Z-axis. An image 322 represents an image of the avatar in a case where the bone is rotated by −α [degrees] with respect to the Z-axis.

Description will next be made of a mesh representing the state of a surface of the avatar. FIGS. 4A and 4B are second diagrams illustrating an example of an avatar image representing method. In FIGS. 4A and 4B, a mesh is used to represent an oral expression of the user as an image of the avatar.

As illustrated in FIGS. 4A and 4B, the oral expression of the user may be represented as matrix data of a point group around a mouth. Examples of FIGS. 4A and 4B illustrate a group of 32 points around the mouth. Of the figures, FIG. 4A represents a case where the user is in a smiling state. FIG. 4B represents a case where the user is not in a smiling state.

<Hardware Configuration of Image Generating Device>

Figure 5:
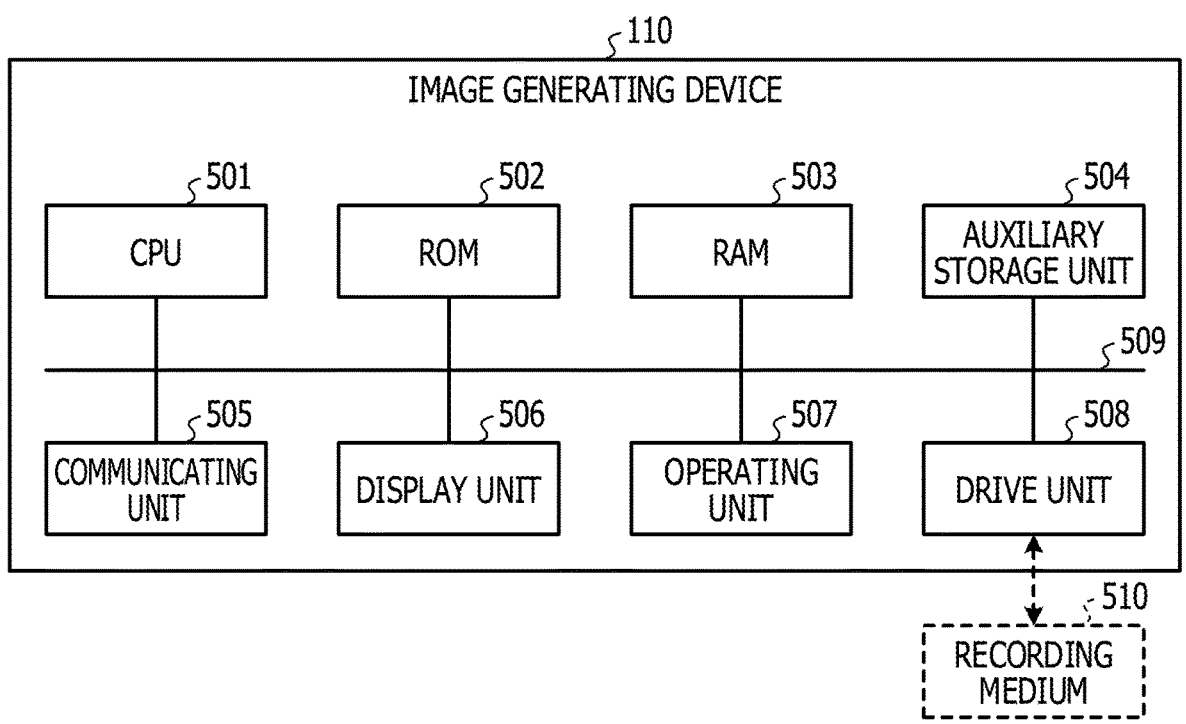
FIG. 5 is a diagram illustrating an example of a hardware configuration of an image generating device.

Description will next be made of a hardware configuration of the image generating device 110 included in the image generating system 100. FIG. 5 is a diagram illustrating an example of a hardware configuration of an image generating device. As illustrated in FIG. 5, the image generating device 110 includes a central processing unit (CPU) 501, a read only memory (ROM) 502, and a random access memory (RAM) 503. The image generating device 110 also includes an auxiliary storage unit 504, a communicating unit 505, a display unit 506, an operating unit 507, and a drive unit 508. Incidentally, the parts of the image generating device 110 are mutually coupled via a bus 509.

The CPU 501 executes various kinds of programs (for example, the server software) installed in the auxiliary storage unit 504. The ROM 502 is a nonvolatile memory. The ROM 502 is a main storage unit storing various kinds of programs, data, and the like needed for the CPU 501 to execute the various kinds of programs stored in the auxiliary storage unit 504. For example, the ROM 502 stores a boot program such as a basic input/output system (BIOS) or an extensible firmware interface (EFI).

The RAM 503 is a volatile memory such as a dynamic random access memory (DRAM) or a static random access memory (SRAM). The RAM 503 functions as a main storage unit. The RAM 503 provides a work area in which the various kinds of programs stored in the auxiliary storage unit 504 are expanded when executed by the CPU 501.

The auxiliary storage unit 504 stores the various kinds of programs installed in the image generating device 110 and information (various kinds of content, various kinds of definition information, and the like) used when the various kinds of programs are executed. In addition, the auxiliary storage unit 504 stores information (sensor data, log data, and the like) obtained by executing the various kinds of programs.

The communicating unit 505 is a device for communicating with the information processing devices 141 and 151 of the client side systems 140 and 150 coupled to the image generating device 110. The display unit 506 is a device that displays a processing result and a processing state of the image generating device 110. The operating unit 507 is a device used when various kinds of instructions are input to the image generating device 110.

The drive unit 508 is a device for setting a recording medium 510. The recording medium 510 in this case includes media on which information is recorded optically, electrically, or magnetically, such as a compact disk (CD)-ROM, a flexible disk, and a magneto-optical disk. The recording medium 510 also includes a semiconductor memory or the like in which information is recorded electrically, such as a ROM or a flash memory.

Incidentally, the various kinds of programs installed in the auxiliary storage unit 504 are installed by, for example, setting a distributed recording medium 510 in the drive unit 508 and reading the various kinds of programs recorded on the recording medium 510 by the drive unit 508. Alternatively, the various kinds of programs installed in the auxiliary storage unit 504 may be installed by receiving the various kinds of programs from the network 180 via the communicating unit 505.

Incidentally, while FIG. 5 has been described as a hardware configuration of the image generating device 110, the information processing device 141 disposed in the client side system 140 and the information processing device 151 disposed in the client side system 150 also have a substantially similar hardware configuration.

<Hardware Configuration of HMD>

Figure 6:
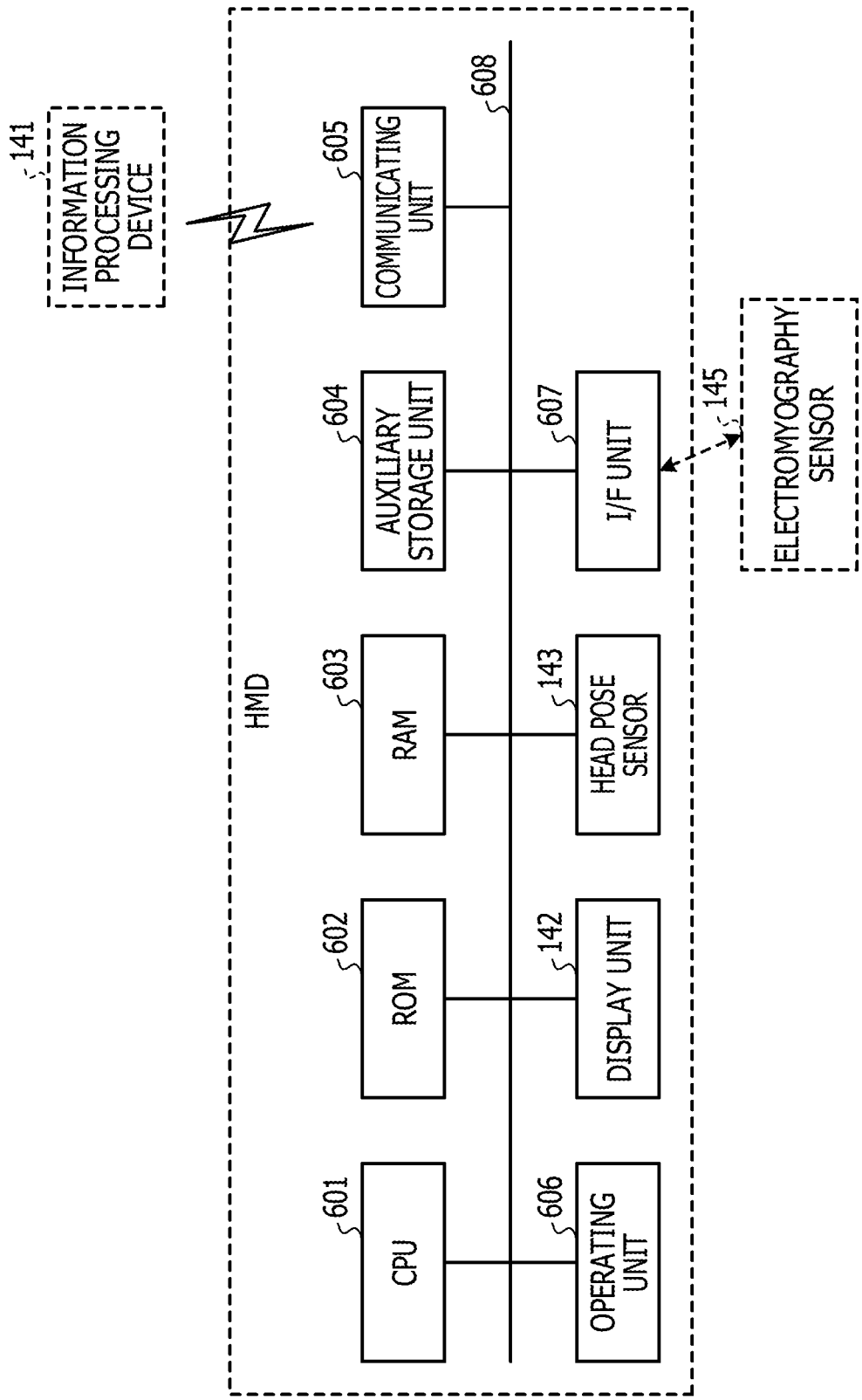
FIG. 6 is a diagram illustrating an example of a hardware configuration of a head-mounted display (HMD)

A hardware configuration of the HMD will next be described. FIG. 6 is a diagram illustrating an example of a hardware configuration of an HMD. As illustrated in FIG. 6, the HMD includes a CPU 601, a ROM 602, and a RAM 603. The HMD also includes an auxiliary storage unit 604 and a communicating unit 605. The HMD further includes an operating unit 606, a display unit 142, a head pose sensor 143, and an interface (I/F) unit 607. These parts are mutually coupled via a bus 608. Incidentally, the HMD is further provided with an audio output device (speaker or the like) and an audio obtaining device (microphone or the like). However, description of transmission and reception of audio data will be omitted in the first embodiment, and therefore description of the devices related to audio will also be omitted here.

The CPU 601 is a computer that executes various kinds of programs installed in the auxiliary storage unit 604. The ROM 602 is a nonvolatile memory. The ROM 602 is a main storage unit storing various kinds of programs, data, and the like needed for the CPU 601 to execute the various kinds of programs stored in the auxiliary storage unit 604. For example, the ROM 602 stores a boot program such as a BIOS or an EFI.

The RAM 603 is a volatile memory such as a DRAM or an SRAM. The RAM 603 functions as a main storage unit. The RAM 603 provides a work area in which the various kinds of programs stored in the auxiliary storage unit 604 are expanded when executed by the CPU 601.

The auxiliary storage unit 604 stores the various kinds of installed programs and information used when the various kinds of programs are executed. The communicating unit 605 is a device for communicating with the information processing device 141.

The operating unit 606 is a device used when various kinds of instructions are input to the HMD. The display unit 142 is a device that displays an image of the virtual reality space, the image of the virtual reality space being included in the virtual reality space information transmitted from the image generating device 110 via the information processing device 141.

The head pose sensor 143 senses "head orientation" included in the non-verbal behavior of the user 160 in the real space, and outputs head pose data.

The I/F unit 607 is coupled to the electromyography sensor 145 to obtain myogenic potential data output from the electromyography sensor 145.

Obtained sensor data such as the head pose data and the myogenic potential data is transmitted to the information processing device 141 by the communicating unit 605.

Incidentally, while the example of FIG. 6 represents a case where the HMD is formed as an integral device, the HMD may be formed integrally, or may be formed by a plurality of separate devices.

<Description of Functional Configuration of Action Instructing Unit and Respective DBs in Image Generating Device>

Figure 7:
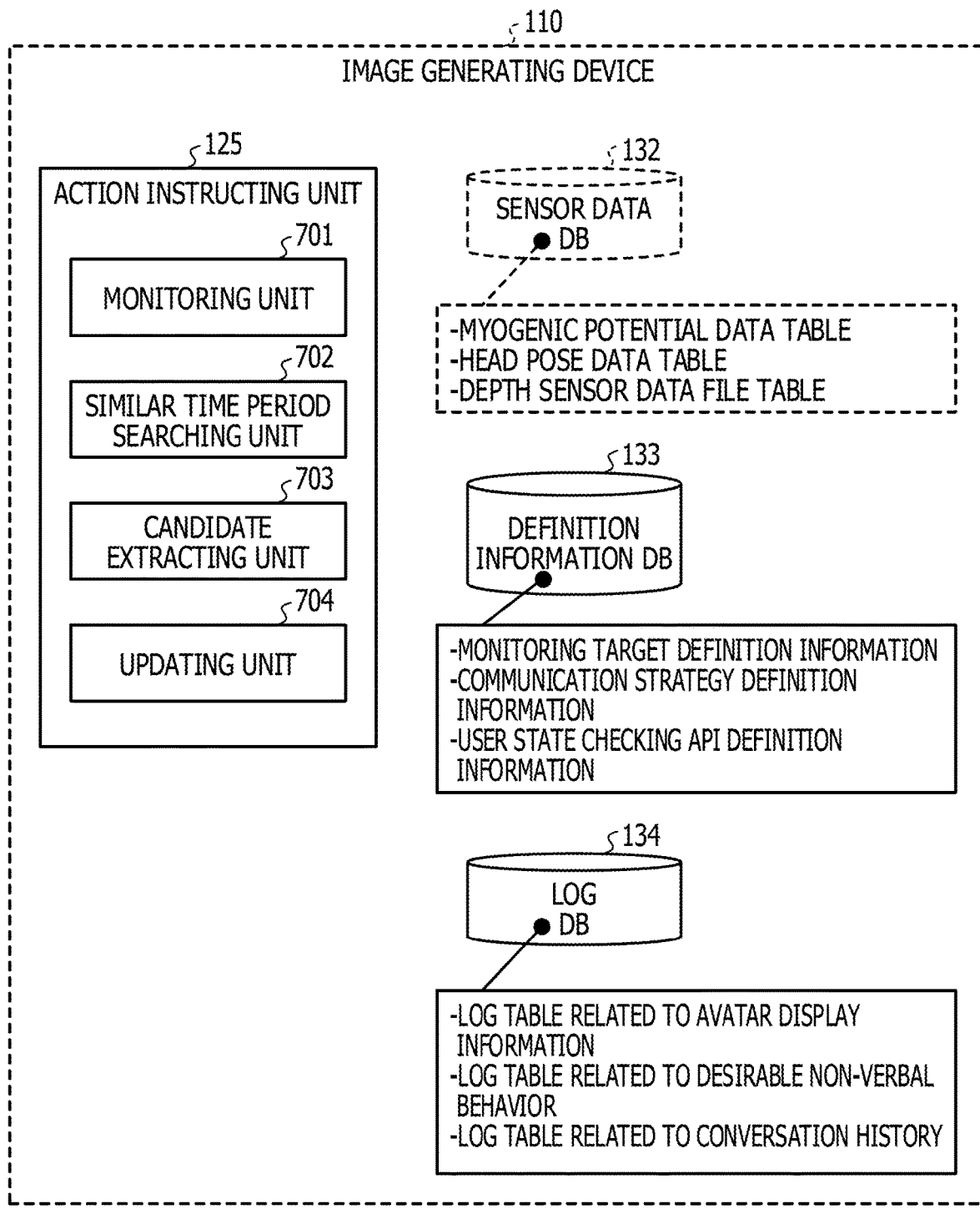
FIG. 7 is a first diagram illustrating a functional configuration of an action instructing unit and respective DBs in an image generating device.

A functional configuration of the action instructing unit 125 and respective DBs in the image generating device 110 will next be described with reference to FIG. 7. FIG. 7 is a first diagram illustrating a functional configuration of an action instructing unit and respective DBs in an image generating device. As illustrated in FIG. 7, the action instructing unit 125 includes a monitoring unit 701, a similar time period searching unit 702, a candidate extracting unit 703, and an updating unit 704.

In addition, the sensor data DB 132 stores, as data tables, a "myogenic potential data table," a "head pose data table," and a "depth sensor data file table." The definition information DB 133 stores, as definition information, "monitoring target definition information," "communication strategy definition information," and "user state checking application programming interface (API) definition information."

Further, the log DB 134 includes, as log tables, a "log table related to avatar display information," a "log table related to desirable non-verbal behavior," and a "log table related to a conversation history." The following description will be made of details of the tables stored in the respective DBs and details of functions of the respective parts possessed by the action instructing unit 125.

<Description of Tables Stored in Respective DBs>

Description will be made of the respective tables stored in the respective DBs (the sensor data DB 132, the log DB 134, and the definition information DB 133).

(1) Data Tables

The data tables stored in the sensor data DB 132 will first be described. The data tables illustrated in FIGS. 8A to 8C are stored into the sensor data DB 132 by the sensor data collection processing managing unit 111.

FIGS. 8A to 8C are diagrams illustrating an example of data tables stored in a sensor data DB. Of the figures, FIG. 8A illustrates a myogenic potential data table 810 storing myogenic potential data. As illustrated in FIG. 8A, the myogenic potential data table 810 storing the myogenic potential data includes, as information items, a "DB recording time," a "sensor recording time," a "user name," an "information collecting device ID," and a "myogenic potential activity value."

Recorded as the "DB recording time" is a time stamp added at a point in time of storing myogenic potential data transmitted from the client side system 140 or 150 into the sensor data DB 132.

Recorded as the "sensor recording time" is a time stamp added at a point in time of sensing the user 160 or 170 by the electromyography sensor 145 or 155.

Recorded as the "user name" is an identifier identifying the user 160 or 170 sensed by the electromyography sensor 145 or 155.

Recorded as the "information collecting device ID" is an identifier identifying an electromyography sensor. Electromyography sensors have different identifiers according to parts to be sensed. "TcA_c3_zygomaticus(cheek)" in a first row of data rows of FIG. 8A is an identifier of an electromyography sensor sensing a cheek. In addition, "TcA_c3_orbicularis(under eye)" in a second row of the data rows of FIG. 8A is an identifier of an electromyography sensor sensing a part under an eye. Further, "TcA_c3_corrugator(brow)" in a third row of the data rows of FIG. 8A is an identifier of an electromyography sensor sensing an eyebrow.

Recorded as the "myogenic potential activity value" is the value of myogenic potential data sensed by a corresponding electromyography sensor.

FIG. 8B illustrates a head pose data table 820 storing head pose data. As illustrated in FIG. 8B, information items included in the head pose data table 820 are substantially same as the information items included in the myogenic potential data table 810.

Incidentally, in the "information collecting device ID" of the head pose data table 820, "TcA_c1" indicates that an information collecting device having "c1" as a kind of the information collecting device is associated with an information processing device having "TcA" as an information processing device ID. For example, "TcA_c1" is the head pose sensor 143 associated with the information processing device 141.

In addition, recorded as the "head pose data" is data indicating the position of the head and data indicating the rotation angles of the head.

FIG. 8C illustrates a depth sensor data file table 830 storing depth sensor data. As illustrated in FIG. 8C, information items included in the depth sensor data file table 830 include a "sensor recording start time" as well as a "DB recording time," a "user name," and an "information collecting device ID." The information items included in the depth sensor data file table 830 further include a "sensor recording end time" and a "depth sensor data recording file uniform resource identifier (URI)."

Recorded as the "sensor recording start time" is a time of starting sensing by the depth sensor 144 or 154. The depth sensors 144 and 154 output depth sensor data as a file having a given recording length. Recorded as the "sensor recording start time" is a time stamp added at a point in time of sensing first depth sensor data included in a corresponding file.

Recorded as the "sensor recording end time" is a time of ending the sensing by the depth sensor 144 or 154. For example, a time stamp is recorded which is added at a point in time of sensing last depth sensor data included in the file having the given recording length.

Recorded as the "depth sensor data recording file URI" is a URI indicating the storage location of the file having the given recording length.

Incidentally, in the "information collecting device ID" of the depth sensor data file table 830, "TcA_c2" indicates that an information collecting device having "c2" as a kind of the information collecting device is associated with an information processing device having "TcA" as an information processing device ID. For example, "TcA_c2" is the depth sensor 144 associated with the information processing device 141.

(2) Log Tables

The log tables stored in the log DB 134 will next be described. The various kinds of log tables illustrated in FIG. 9 and FIGS. 10A and 10B are stored into the log DB 134 by the user avatar display history managing unit 114 and the machine avatar display history managing unit 123.

FIG. 9 is a first diagram illustrating an example of a log table stored in a log DB, and is a diagram illustrating a log table related to avatar display information. A log table 900 related to the avatar display information stores data used in generating images of avatars.

As illustrated in FIG. 9, the log table 900 related to the avatar display information includes, as information items, a "DB recording time," a "user present time," a "user name," an "information processing device ID," a "log type label," and "avatar display information log data."

Recorded as the "DB recording time" is a time of storing data used in generating an image of an avatar in the log table 900 related to the avatar display information.

Recorded as the "user present time" is a time at which the user performs a non-verbal behavior. Recorded as the "user name" is an identifier identifying the user performing the non-verbal behavior.

Recorded as the "information processing device ID" is an identifier identifying an information processing device that manages the user performing the non-verbal behavior.

Recorded as the "log type label" is information indicating a representing method in generating the image of the avatar. Recorded in the example of FIG. 9 are "bone," which indicates that a non-verbal behavior is represented by using the avatar skeleton model, and "mesh," which indicates that a non-verbal behavior is represented by using a mesh.

Recorded as the "avatar display information log data" is data used in generating the image of the avatar, the data being recorded as a structured list.

An example in a first row of data rows of FIG. 9 indicates that the user 160 having a user name="userA" performed a non-verbal behavior at 11:00:00.000 on Jul. 27, 2015" and that the position coordinates of the bone of the head in an image of the user avatar became (0, 18, −10). The example in the first row also indicates that the rotation angles of the bone of the head in the image of the user avatar became (0, 1, 0). The example in the first row also indicates that avatar display information log data including the position coordinates and the rotation angles was recorded in the log DB 134 at 11:00:00.020 on Jul. 27, 2015.

FIGS. 10A and 10B are second diagrams illustrating an example of log tables stored in a log DB. Of the figures, FIG. 10A is a diagram illustrating a log table 1010 related to desirable non-verbal behaviors. The log table 1010 related to the desirable non-verbal behaviors stores information indicating whether or not desirable non-verbal behaviors defined in communication strategy definition information are performed by corresponding users. Incidentally, there may be a mode in which processing of log recording into the log table 1010 related to the desirable non-verbal behaviors, the log table 1010 being illustrated in FIG. 10A, is performed only in certain periods that users perform the particular non-verbal behaviors.

As illustrated in FIG. 10A, the log table 1010 related to the desirable non-verbal behaviors includes, as information items, a "DB recording time," a "user present time," a "user name," an "information processing device ID," a "desirable non-verbal behavior," and a "checking result."

Recorded as the "DB recording time" is a time of storing a checking result indicating whether or not a user is changed to a post desirable-change user state in the log table 1010 related to the desirable non-verbal behaviors.

Recorded as the "user present time" is a time at which the user is changed to the post desirable-change user state. Recorded as the "user name" is an identifier identifying the user changed to the post desirable-change user state.

Recorded as the "information processing device ID" is an identifier identifying an information processing device that manages the user changed to the post desirable-change user state.

Recorded as the "desirable non-verbal behavior" is the post desirable-change user state. The example of FIG. 10A indicates that whether or not the user is changed to a concentrating state as a post desirable-change user state is checked.

Recorded as the "checking result" is a checking result when whether or not the user is changed to the post desirable-change user state is checked. The example of FIG. 10A indicates that it is not determined that the user is changed to the post desirable-change user state ("false") as a result of checking whether or not the user is changed to the post desirable-change user state.

FIG. 10B is a diagram illustrating a log table 1020 related to a conversation history. The log table 1020 related to the conversation history stores information about conversations performed in the virtual reality space.

As illustrated in FIG. 10B, the log table 1020 related to the conversation history includes, as information items, a "conversation start time," a "conversation end time," a "user name 1," and a "user name 2."

Recorded as the "conversation start time" is a time at which a conversation is started. Recorded as the "conversation end time" is a time at which the conversation is ended.

Recorded as the "user name 1" and the "user name 2" are identifiers identifying users participating in the conversation performed via user avatars in the virtual reality space.

(3) Definition Information

The definition information stored in the definition information DB 133 will next be described. FIG. 11 is a first diagram illustrating an example of definition information stored in a definition information DB, and is a diagram illustrating monitoring target definition information. Monitoring target definition information 1100 defines the bones to be monitored of user avatars and APIs used for monitoring, to detect that particular non-verbal behaviors are performed by users.

The monitoring target definition information 1100 includes, as information items, a "communication partner user name," a "monitoring target," and a "trigger checking API."

Defined as the "communication partner user name" is an identifier for identifying a communication partner user that the machine avatar communicates with.

Defined as the "monitoring target" is a bone (bones) of a user avatar, the bone (bones) being to be monitored to detect that a particular non-verbal behavior is performed by the user.

Defined as the "trigger checking API" is an API used for monitoring.

An example in a first row of data rows of the monitoring target definition information 1100 illustrated in FIG. 11 indicates that monitoring is performed by inputting the position coordinates and rotation angles of "Bone_Chest" of the user avatar having a user name="userA" to an API="isSigh." According to the example in the first row of the data rows, the monitoring unit 701 monitors whether the corresponding user sighs.

In addition, an example in a second row of the data rows indicates that monitoring is performed by inputting the position coordinates and rotation angles of "Bone_Head" and the like of the user avatar having the user name="userA" to an API="isNap." According to the example in the second row of the data rows, the monitoring unit 701 monitors whether the corresponding user is dozing.

In addition, an example in a third row of the data rows indicates that monitoring is performed by inputting the position coordinates and rotation angles of "Bone_Head" of a user avatar having a user name="userC" to the API="isNap." According to the example in the third row of the data rows, the monitoring unit 701 monitors whether the corresponding user is dozing.

Further, an example in a fourth row of the data rows indicates that monitoring is performed by inputting the position coordinates and rotation angles of "Bone_Head"

and "Bone_Chest" of a user avatar of some user to an API="isRestles." According to the example in the fourth row of the data rows, the monitoring unit 701 monitors whether some user is in a restless state.

FIGS. 12A and 12B are second diagrams illustrating an example of definition information stored in a definition information DB. Of the figures, FIG. 12A illustrates communication strategy definition information 1210. FIG. 12B illustrates user state checking API definition information 1220.

As illustrated in FIG. 12A, the communication strategy definition information 1210 defines the post desirable-change user states of communication partner users, the post desirable-change user states being desirable for the machine avatar, in cases where the users perform particular non-verbal behaviors. The communication strategy definition information 1210 includes, as information items, a "communication partner user name," a "triggering non-verbal behavior," and a "desirable non-verbal behavior."

Defined as the "communication partner user name" is an identifier for identifying a communication partner user that the machine avatar communicates with.

Defined as the "triggering non-verbal behavior" is a detecting condition for detecting that a particular non-verbal behavior is performed by the user. Defined as the "desirable non-verbal behavior" is a post desirable-change user state when it is detected that the particular non-verbal behavior is performed by the user.

An example in a first row of data rows of the communication strategy definition information 1210 in FIG. 12A indicates that when the output of the API="isSigh" for the user name="userA" is "true," it is determined that a particular non-verbal behavior is performed by the user. In addition, the example in the first row indicates that a post desirable-change user state when it is determined that the particular non-verbal behavior is performed by the user is "Flow."

In addition, an example in a second row of the data rows indicates that when the output of the API="isRestles" for some user is "true," it is determined that a particular non-verbal behavior is performed by the user. In addition, the example in the second row indicates that a post desirable-change user state when it is determined that the particular non-verbal behavior is performed by the user is "Flow."

On the other hand, as illustrated in FIG. 12B, the user state checking API definition information 1220 defines checking methods for checking the user states of communication partner users by a calling function (API) within the system, input data for the API, and output data from the API. The user state checking API definition information 1220 includes, as information items, a "user state," "input target data," and a "user state checking API."

Defined as the "user state" is output data from an API. A post desirable-change user state is defined as the "user state" when the API is used to check the post desirable-change user state. Defined as the "input target data" is input data for the API. When the API is used to check the post desirable-change user state, a bone (bones) used to check the post desirable-change user state is (are) defined as the "input target data." Defined as the "user state checking API" is the calling function name of the API. When the API is used to check the post desirable-change user state, the name of the API called at the time of the checking is defined as the "user state checking API."

An example in a first row of data rows of the user state checking API definition information 1220 in FIG. 12B indicates that whether or not a user state is "Flow" may be checked by using an API referred to as checkFlow. In addition, the example in the first row indicates that the checking is performed by inputting the position coordinates and rotation angles of "Bone_Head" and "Bone_Spine" of the user to the API="checkFlow."

An example in a second row of the data rows indicates that whether a user state is "Smile" may be checked by using an API referred to as checkSmile. In addition, the example in the second row indicates that the checking is performed by inputting the matrix data of "Shape_Mouse" of the user to the API="checkSmile."

<Description of Functions of Action Instructing Unit>

Figure 13:
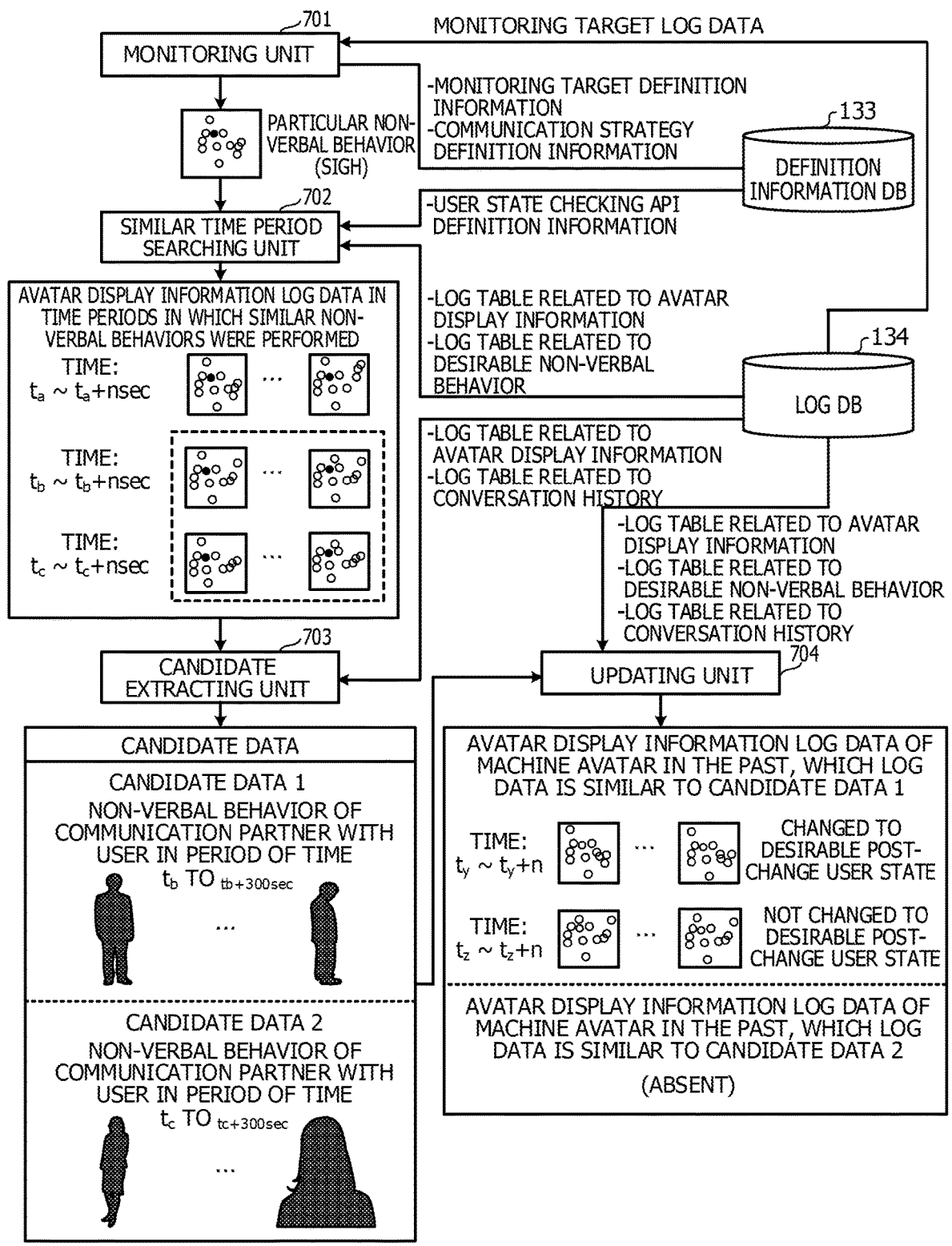
FIG. 13 is a first diagram of assistance in explaining functions of an action instructing unit.

Description will next be made of details of functions of the parts of the action instructing unit 125 in the image generating device 110. FIG. 13 is a first diagram of assistance in explaining functions of an action instructing unit.

As illustrated in FIG. 13, the monitoring unit 701 monitors monitoring target log data in data (avatar display information log data) used in generating an image of the user avatar of a communication partner user (following description will be made supposing that the communication partner user is the user 160). Which data is set as a monitoring target is determined based on the monitoring target definition information 1100 stored in the definition information DB 133.

The monitoring unit 701 determines whether or not the user 160 has performed a particular non-verbal behavior based on a result of monitoring the monitoring target log data. In addition, when determining that the user 160 has performed the particular non-verbal behavior, the monitoring unit 701 notifies the similar time period searching unit 702 of a time period in which the user 160 performed the particular non-verbal behavior. Further, the monitoring unit 701 refers to the communication strategy definition information 1210, and identifies a post desirable-change user state when the user 160 has performed the particular non-verbal behavior. The monitoring unit 701 notifies the identified post desirable-change user state to the similar time period searching unit 702.

Description will be made by citing a concrete example. The monitoring unit 701 obtains the log data of Bone_Chest used in generating the image 220 of the user avatar of the user 160 from time $t_{1-m}$ to time $t_1$ from the log table 900 related to the avatar display information, and inputs the log data of Bone_Chest to the API="isSigh."

Here, suppose that time $t_1$ denotes an update time at which virtual reality space information is generated (updated). In addition, suppose that time $t_{1-1}$ denotes a first virtual reality space information update time before time $t_1$, and that time $t_{1+1}$ denotes a next virtual reality space information update time after time $t_1$. Hence, time $t_{1-m}$ denotes an mth virtual reality space information update time before time $t_1$. Incidentally, there may be a mode in which DB recording times in FIG. 9 are used as the update times referred to here.

When "true" is output as a result of the input, the monitoring unit 701 determines that the user 160 has performed a particular non-verbal behavior (has sighed). When determining that the user 160 has sighed, the monitoring unit 701 notifies a time period from time $t_{1-m}$ to time $t_1$ to the similar time period searching unit 702. In addition, the monitoring unit 701 refers to the communication strategy definition information 1210, and identifies "Flow" as a post desirable-change user state in a case where the user 160 has sighed. The monitoring unit 701 notifies "Flow" as the identified post desirable-change user state to the similar time period searching unit 702.

The similar time period searching unit 702 refers to the log table 900 related to the avatar display information, and reads avatar display information log data in the time period notified from the monitoring unit 701. In addition, the similar time period searching unit 702 retrieves log data (action group) similar to the read avatar display information log data from the log table 900 related to the avatar display information. For example, log data similar to the non-verbal behavior determined to have sighed is retrieved.

In addition, the similar time period searching unit 702 refers to the log table 1010 related to the desirable non-verbal behaviors for an adjacent time period subsequent to a time period corresponding to the retrieved log data. As a result of the reference, the similar time period searching unit 702 determines whether or not the user 160 changed to the post desirable-change user state. For example, whether a user state changed to Flow is determined.

Further, when determining that the user 160 changed to the post desirable-change user state in the adjacent time period, the similar time period searching unit 702 extracts the retrieved time period, and notifies the time period to the candidate extracting unit 703. Incidentally, when determining that the user 160 did not change to the post desirable-change user state in any adjacent time period, the similar time period searching unit 702 decides to generate an image of the machine avatar for performing a standard behavior. Incidentally, there may be a mode in which past log data of the user 160 himself/herself, the past log data preceding a certain period, is included in retrieval targets in the retrieval by the similar time period searching unit 702 or log data of all users within the system or users similar to the user 160 is included in the retrieval targets.

Description will be made by citing a concrete example. The similar time period searching unit 702 refers to the log table 900 related to the avatar display information. In addition, the similar time period searching unit 702 reads the avatar display information log data (time series data of position coordinates and rotation angles of all bones) of the user 160 in the period from time $t_{1-m}$ to time $t_1$. Incidentally, the time series data of the position coordinates and rotation angles of all of the bones from time $t_{1-m}$ to time $t_1$ will hereinafter be referred to as "time series data at a search start position."

Next, the similar time period searching unit 702 refers to avatar display information log data in a certain period (for example, the past one day) in the log table 900 related to the avatar display information, and searches for a time period of time series data similar to the time series data at the search start position. For example, supposing that the time series data at the search start position is time series data for five seconds, the similar time period searching unit 702 makes a search using the values of the time series data as it is as a multidimensional vector. Supposing that the number of bones is 80, the similar time period searching unit 702 makes a search using values of the time series data as an 80-dimensional vector of the position coordinates of the bones. In addition, the similar time period searching unit 702 makes a search using values of the time series data as an 80-dimensional vector of the rotation angles of the bones.

Suppose that as a result of the search, time periods from time $t_a$ to time $t_{a+nsec}$, from time $t_b$ to time $t_{b+nsec}$, and from time $t_c$ to time $t_{c+nsec}$ are extracted, as illustrated in FIG. 13. Incidentally, time $t_{a+nsec}$ refers to a virtual reality space information update time n seconds after time $t_a$.

The similar time period searching unit 702 refers to the log table 1010 related to the desirable non-verbal behaviors for a time period adjacent to each of the extracted time periods. In this case, the similar time period searching unit 702 sets a time period within 300 [seconds] of the start time of each of the extracted time periods as an adjacent time period, and refers to the log table 1010 related to the desirable non-verbal behaviors.

For example, in the log table 1010 related to the desirable non-verbal behaviors, the similar time period searching unit 702 refers to a "checking result" for "Flow," where a "user present time" is included in the time period of time $t_a$ to time $t_{a+300\ sec}$ and a "user name" corresponds to UserA. When a result of the reference indicates that the "checking result" for "Flow" is "false," the similar time period searching unit 702 determines that the user 160 did not change to the post desirable-change user state in the time period of time $t_a$ to time $t_{a+300\ sec}$.

Similarly, in the log table 1010 related to the desirable non-verbal behaviors, the similar time period searching unit 702 refers to a "checking result" for "Flow," where a "user present time" is included in the time period of time $t_b$ to time $t_{b+300\ sec}$ and a "user name" corresponds to UserA. When a result of the reference indicates that the "checking result" for "Flow" is "true," the similar time period searching unit 702 determines that the user 160 changed to the post desirable-change user state in the time period of time $t_b$ to time $t_{b+300\ sec}$. In this case, the similar time period searching unit 702 notifies the time period of time $t_b$ to time $t_{b+300\ sec}$ to the candidate extracting unit 703. The time period of time $t_b$ to time $t_{b+300\ sec}$ may be said to be a time period during the past one day in which time period the user 160 changed from a sighing state (output of "isSigh" is "true") to a concentrating state ("IsFlow" is "true").

Similarly, in the log table 1010 related to the desirable non-verbal behaviors, the similar time period searching unit 702 refers to a "checking result" for "Flow," where a "user present time" is included in the time period of time $t_c$ to time $t_{c+300\ sec}$ and a "user name" corresponds to UserA. When a result of the reference indicates that the "checking result" for "Flow" is "true," the similar time period searching unit 702 determines that the user 160 changed to the post desirable-change user state in the time period of time $t_c$ to time $t_{c+300\ sec}$. In this case, the similar time period searching unit 702 notifies the time period of time $t_c$ to time $t_{c+300\ sec}$ to the candidate extracting unit 703. The time period of time $t_c$ to time $t_{c+300\ sec}$ may be said to be a time period during the past one day in which time period the user 160 changed from a sighing state (output of "isSigh" is "true") to a concentrating state ("IsFlow" is "true").

Incidentally, in the present embodiment, an expression beginning with a lowercase letter as in "isSigh" denotes a function determining a user state. On the other hand, an expression beginning with a capital letter as in "IsFlow" denotes a variable (user state). Hence, when the variable "IsFlow" includes "true," it is indicated that the user state is Flow. When the variable "IsFlow" includes "false," it is indicated that the user state is not Flow.

The candidate extracting unit 703 refers to the log table 900 related to the avatar display information, and extracts avatar display information log data included in the time periods notified from the similar time period searching unit 702, the avatar display information log data being log data of a user as a communication partner with the user 160 or the machine avatar. The time series data of position coordinates and rotation angles of each bone included in the log data extracted by the candidate extracting unit 703 will hereinafter be referred to as "candidate data." The candidate extracting unit 703 notifies the extracted candidate data to the updating unit 704.

Description will be made by citing a concrete example. The candidate extracting unit 703 refers to the log table 900 related to the avatar display information for the time period of time $t_b$ to time $t_{b+300\ sec}$ and the time period of time $t_c$ to time $t_{c+300\ sec}$, the time periods being notified from the similar time period searching unit 702. In addition, the candidate extracting unit 703 extracts log data in the time period of time $t_b$ to time $t_{b+300\ sec}$ and the time period of time $t_c$ to time $t_{c+300\ sec}$, the log data being log data of the user as the communication partner with the user 160 or the machine avatar.

Incidentally, in extracting the log data, the candidate extracting unit 703 refers to the log table 1020 related to the conversation history. By referring to the log table 1020 related to the conversation history, the candidate extracting unit 703 may identify the user or the machine avatar that communicated with the user 160 in the time period of time $t_b$ to time $t_{b+300\ sec}$. Similarly, by referring to the log table 1020 related to the conversation history, the candidate extracting unit 703 may identify the user or the machine avatar that communicated with the user 160 in the time period of time $t_c$ to time $t_{c+300\ sec}$.

Here, suppose that the user 160 was communicating with a machine avatar M (for example, the machine avatar represented as the image 240) in the time period of time $t_b$ to time $t_{b+300\ sec}$. In this case, the candidate extracting unit 703 extracts the log data of the machine avatar M in the time period of time $t_b$ to time $t_{b+300\ sec}$ from the log table 900 related to the avatar display information.

Incidentally, the log data in the time period of time $t_b$ to time $t_{b+300\ sec}$ in the log table 900 related to the avatar display information includes a time period of time series data similar to the time series data at the search start position (which time period will be referred to as a "first time period"). Further, the log data in the time period of time $t_b$ to time $t_{b+300\ sec}$ includes a time period in which the user 160 changed to the post desirable-change user state (which time period will be referred to as a "third time period"). Hence, the log data of the machine avatar M in the time period of time $t_b$ to time $t_{b+300\ sec}$, the log data being extracted by the candidate extracting unit 703 from the log table 900 related to the avatar display information, is log data in a "second time period" between the first time period and the third time period. For example, the candidate extracting unit 703 notifies the updating unit 704 of, as candidate data 1, the time series data of the position coordinates and rotation angles of each bone included in the log data in the second time period.

In addition, suppose that the user 160 was communicating with the user 170 in the time period of time $t_c$ to time $t_{c+300\ sec}$. In this case, the candidate extracting unit 703 extracts the log data of the user 170 in the time period of time $t_c$ to time $t_{c+300\ sec}$ from the log table 900 related to the avatar display information.

Incidentally, the log data in the time period of time $t_c$ to time $t_{c+300\ sec}$ in the log table 900 related to the avatar display information includes a time period (first time period) of time series data similar to the time series data at the search start position. Further, the log data in the time period of time $t_c$ to time $t_{c+300\ sec}$ includes a time period (third time period) in which the user 160 changed to the post desirable-change user state. Hence, the log data of the user avatar of the user 170 in the time period of time $t_c$ to time $t_{c+300\ sec}$ the log data being extracted by the candidate extracting unit 703 from the log table 900 related to the avatar display information, is log data in a second time period between the first time period and the third time period. For example, the candidate extracting unit 703 notifies the updating unit 704 of, as candidate data 2, the time series data of the position coordinates and rotation angles of each bone included in the log data in the second time period.

The updating unit 704 evaluates the effectiveness of the candidate data notified from the candidate extracting unit 703, and generates an image of the machine avatar at time $t_{1+1}$ based on candidate data evaluated as effective. In addition, the updating unit 704 notifies the machine avatar information display processing unit 121 of the generated image of the machine avatar at time $t_{1+1}$.

Incidentally, in evaluating the effectiveness of the candidate data, the updating unit 704 checks whether or not an image of the machine avatar, the image being generated based on data similar to the candidate data, has been displayed in the past. When determining that an image of the machine avatar, the image being generated based on data similar to the candidate data, has been displayed in the past, the updating unit 704 checks whether or not the display of the image resulted in the user 160 changing to the post desirable-change user state. The updating unit 704 evaluates the effectiveness of the candidate data based on a result of the checking, and notifies the machine avatar information display processing unit 121 of an image of the machine avatar at time $t_{1+1}$, which image is generated based on the candidate data evaluated as effective.

Incidentally, when the similar time period searching unit 702 determines that an image of the machine avatar for performing a standard behavior is to be generated, the updating unit 704 instructs the machine avatar information display processing unit 121 to generate the image of the machine avatar for performing the standard behavior.

Functions of the updating unit 704 will be described by citing a concrete example. The updating unit 704 refers to the log table 1020 related to the conversation history for the past one week, and extracts time periods in which the user 160 and the machine avatar communicated with each other. In addition, the updating unit 704 refers to the log table 900 related to the avatar display information for the past one week, and retrieves time series data identical or similar to the candidate data 1 and the candidate data 2 from time series data derived from avatar display information log data in the extracted time periods.

For example, suppose that the updating unit 704 extracts two pieces of time series data identical or similar to the candidate data 1 in the past one week (from time $t_y$ to time $t_{y+n}$ and from time $t_z$ to time $t_{z+n}$). In this case, the updating unit 704 refers to the log table 1010 related to the desirable non-verbal behaviors, and determines whether or not the user 160 changed to the post desirable-change user state in time periods subsequent to the two respective extracted pieces of time series data.

Here, suppose that the user 160 changed to the post desirable-change user state in one of the time periods subsequent to the two respective extracted pieces of time series data. In this case, the updating unit 704 calculates, as an evaluation value of the candidate data 1, the ratio (1/2) of the number of times that the user 160 changed to the post desirable-change user state.

On the other hand, suppose that the updating unit 704 does not extract any time series data identical or similar to the candidate data 2 in the past one week. In this case, the updating unit 704 calculates, as an evaluation value of the candidate data 2, the ratio (0/0) of the number of times that the user 160 changed to the post desirable-change user state.

The updating unit 704 compares the evaluation value of the candidate data 1 and the evaluation value of the candidate data 2 with each other. When the updating unit 704 determines that the evaluation value of the candidate data 1 is larger, the updating unit 704 generates an image of the machine avatar at time $t_{1+1}$ based on the candidate data 1, and notifies the machine avatar information display processing unit 121 of the image of the machine avatar at time $t_{1+1}$.

Incidentally, in the above-described concrete example, the time periods in which the user 160 and the machine avatar communicated with each other are set as a target to evaluate the candidate data 1 and the candidate data 2. However, there may be an embodiment in which an evaluation value of zero (case where a change to the post desirable-change user state is not made even once) is set as a maximum evaluation value at a time of evaluation. In addition, time periods in which another user and the machine avatar communicated with each other may be set as a target to evaluate the candidate data 1 and the candidate data 2. Alternatively, time periods in which a user having an attribute similar to that of the user 160 and the machine avatar communicated with each other may be set as a target to evaluate the candidate data 1 and the candidate data 2.

<Machine Avatar Image Update Processing>

Figure 14:
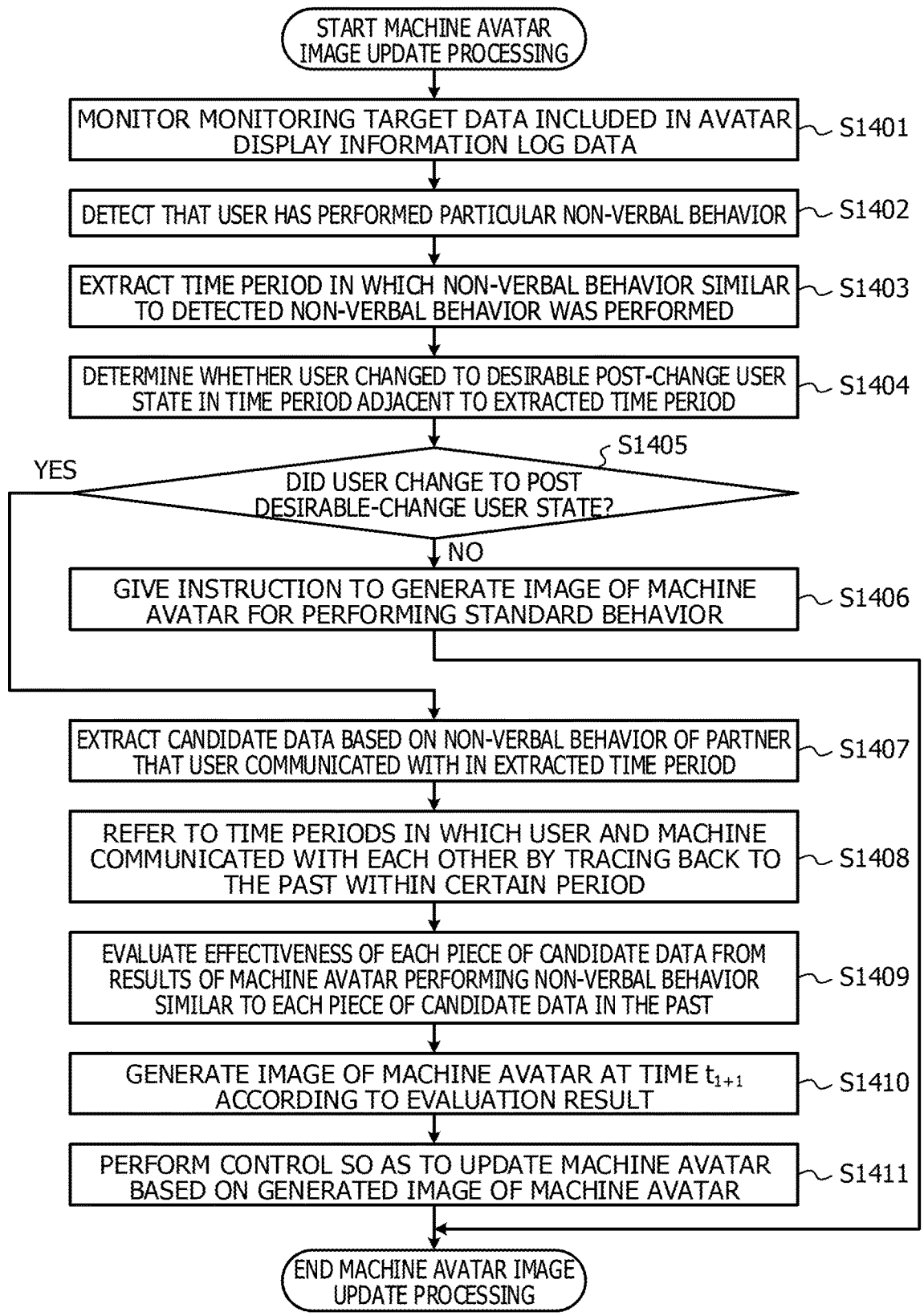
FIG. 14 is a first flowchart of machine avatar image update processing.

A flow of machine avatar image update processing will next be described. FIG. 14 is a first flowchart of machine avatar image update processing.

In step S1401, the monitoring unit 701 refers to the log table 900 of the avatar display information, and monitors monitoring target log data in data used in generating an image of the user avatar of the user 160.

In step S1402, the monitoring unit 701 determines whether or not the user 160 has performed a particular non-verbal behavior based on a result of monitoring the monitoring target log data. In addition, when determining that the user 160 has performed the particular non-verbal behavior, the monitoring unit 701 notifies the similar time period searching unit 702 of a time period (from time $t_{1-m}$ to time $t_1$) in which the user 160 performed the particular non-verbal behavior. Further, when determining that the user 160 has performed the particular non-verbal behavior, the monitoring unit 701 identifies a post desirable-change user state of the user 160 by referring to the communication strategy definition information 1210. The monitoring unit 701 notifies the similar time period searching unit 702 of the identified post desirable-change user state.

In step S1403, the similar time period searching unit 702 refers to the log table 900 related to the avatar display information, and extracts a time period including log data similar to avatar display information log data in the notified time period. Thus, a time period in which a non-verbal behavior similar to the particular non-verbal behavior was performed is extracted.

In step S1404, the similar time period searching unit 702 determines whether or not the user 160 changed to the post desirable-change user state in a time period adjacent to the extracted time period.

When determining that the user 160 did not change to the post desirable-change user state in the adjacent time period (No in step S1405), the similar time period searching unit 702 proceeds to step S1406.

In step S1406, the updating unit 704 instructs the machine avatar information display processing unit 121 to generate an image of the machine avatar for performing a standard behavior.

When determining that the user 160 changed to the post desirable-change user state in the adjacent time period (Yes in step S1405), on the other hand, the similar time period searching unit 702 proceeds to step S1407.

In step S1407, the candidate extracting unit 703 extracts candidate data based on avatar display information log data of a communication partner with the user 160 in the extracted time period.

In step S1408, the updating unit 704 refers to time periods in which the user 160 and the machine avatar communicated with each other by tracing back to the past within a certain period.

In step S1409, the updating unit 704 retrieves time series data similar to the candidate data in the referred-to time periods, and determines whether or not the user 160 changed to the post desirable-change user state in time periods subsequent to the retrieved time series data. In addition, the updating unit 704 evaluates the effectiveness of the candidate data based on a result of the determination. Thus, the effectiveness of the candidate data may be evaluated based on the non-verbal behaviors of the user in response to non-verbal behaviors performed by the machine avatar in the past.

In step S1410, the updating unit 704 generates an image of the machine avatar at time $t_{1+1}$ based on effective candidate data.

In step S1411, the updating unit 704 instructs the machine avatar information display processing unit 121 to update display using the generated image of the machine avatar.

As is clear from the above description, when a communication partner user performs a particular non-verbal behavior, the image generating system according to the first embodiment refers to the log data of a user or the machine avatar that the user in question communicated with in the past. Then, the image generating system according to the first embodiment generates a next image of the machine avatar, which image is effective in bringing the user into a post desirable-change user state, based on the referred-to log data.

Thus, according to the image generating system in accordance with the first embodiment, the machine avatar may be made to behave appropriately when the communication partner user performs a particular non-verbal behavior.

The behavior to be performed by the machine avatar is determined after appropriateness is determined from both aspects of appropriateness for the user as a conversation partner and appropriateness when the machine avatar itself performs the behavior.

Thus, according to the image generating system in accordance with the first embodiment, it is possible to make communication between the user and the machine avatar proceed smoothly, and construct interpersonal relationship therebetween appropriately.

For example, the image generating system in accordance with the first embodiment has, as a communication strategy, a post desirable-change user state in response to a non-verbal behavior performed by the conversation partner user, the post desirable-change user state being desirable for the machine avatar, and determines a non-verbal behavior of the machine avatar so as to guide the conversation partner user to the desirable post-change state. Thus, according to the image generating system in accordance with the first embodiment, it is possible to make communication between the user and the machine avatar proceed smoothly, and construct interpersonal relationship therebetween appropriately.

[Second Embodiment]

In the foregoing first embodiment, the similar time period searching unit 702 refers to avatar display information log data in the log table 900 related to the avatar display information, and searches for time periods of time series data similar to the time series data at the search start position. On the other hand, the second embodiment encodes time series data by dividing the time series data into labels of five levels, and searches for time periods in which label changes similar to label changes at a search start position occur.

Figure 15:
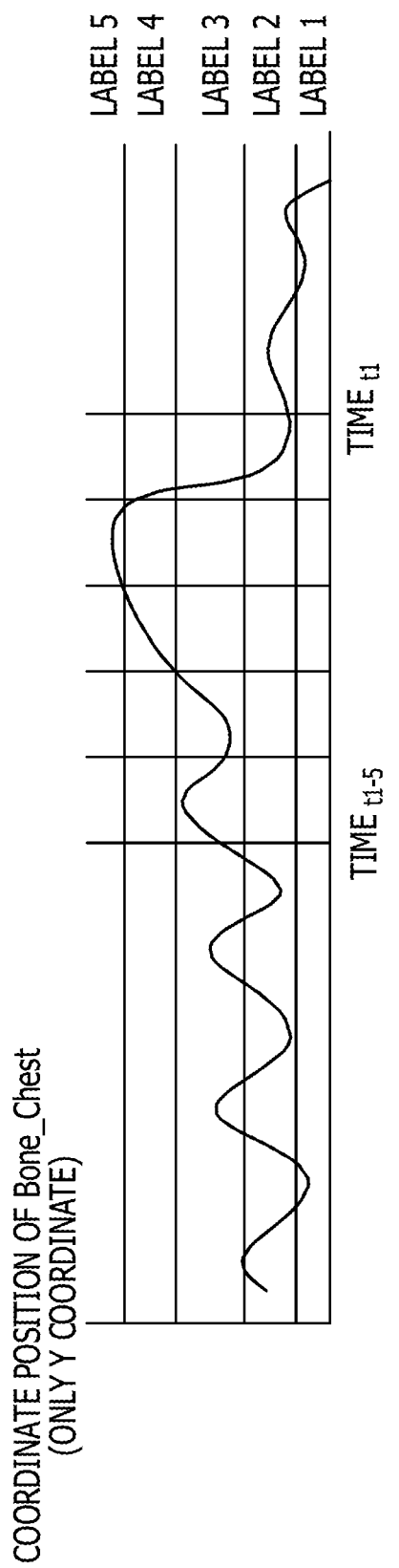
FIG. 15 is a diagram illustrating an example of a method of encoding avatar display information log data.

FIG. 15 is a diagram illustrating an example of a method of encoding avatar display information log data. The example of FIG. 15 illustrates time series data on the Y-coordinate position of a bone="Bone_Chest" in avatar display information log data.

As illustrated in FIG. 15, when encoding is performed at intervals of one second, the time series data of the Y-coordinate position of the bone="Bone_Chest" makes a transition from label 3 to label 2 via label 3, label 4 and label 5 in a period of past five seconds from time $t_1$. The similar time period searching unit 702 may therefore encode the time series data at the search start position as (3, 3, 4, 5, 2).

By encoding time series data derived based on avatar display information log data recorded in the log table 900 related to the avatar display information by a similar encoding method, the similar time period searching unit 702 may search for similar time periods using the coded data.

Incidentally, in searching for similar time periods using the coded data, the similar time period searching unit 702 may regard a time period in which coded data matches 100% as a similar time period, or may regard a time period in which coded data matches 80% as a similar time period. For example, suppose that a determining condition for determining whether or not coded data matches may be set arbitrarily.

In addition, in searching for similar time periods, the similar time period searching unit 702 generates coded data on all of the bones included in avatar display information log data, and extracts a time period in which coded data on all of the bones matches as a similar time period. However, the similar time period searching unit 702 may generate coded data on a part of the bones (for example, a monitoring target bone), and extract a time period in which coded data on the part of the bones matches as a similar time period. In addition, the similar time period searching unit 702 may generate coded data on a part of the position coordinates or rotation angles of a part of the bones, and extract a time period in which coded data on the part of the position coordinates or rotation angles of the part of the bones matches as a similar time period.

Alternatively, the similar time period searching unit 702 may generate coded data on all of the bones, calculate a degree of matching for each bone, and extract a similar time period based on a statistical value (for example, an average value) of the calculated degrees of matching.

[Third Embodiment]

In the foregoing first embodiment, the similar time period searching unit 702 refers to the log table 900 related to the avatar display information, and searches for time periods of time series data similar to the time series data at the search start position. On the other hand, a third embodiment further refers to a log table related to social behaviors, and searches for time periods of log data similar to social behavior log data at a search start position. Thus, according to the third embodiment, candidate data based on social behaviors may be extracted. The following description will be made of the third embodiment, centering on differences from the first embodiment.

<Description of Functional Configuration of Action Instructing Unit and Respective DBs in Image Generating Device>

A functional configuration of an action instructing unit 125 and respective DBs in an image generating device 110 will first be described with reference to FIG. 16. FIG. 16 is a second diagram illustrating a functional configuration of an action instructing unit and respective DBs in an image generating device. As illustrated in FIG. 16, the action instructing unit 125 includes a monitoring unit 701, a first similar time period searching unit 702, a second similar time period searching unit 1601, a first candidate extracting unit 703, a second candidate extracting unit 1602, and an updating unit 1603.

Incidentally, the first similar time period searching unit 702 has the substantially same functions as the similar time period searching unit 702 in FIG. 7. In addition, the first candidate extracting unit 703 has the substantially same functions as the candidate extracting unit 703 in FIG. 7.

In addition, a sensor data DB 132 stores the various kinds of data table illustrated in FIG. 7. A definition information DB 133 stores "social behavior determining API definition information," "communication strategy definition information," "user state checking API definition information," and "tendency definition information" in addition to the various kinds of definition information illustrated in FIG. 7.

Further, a log DB 134 includes a "log table related to social behaviors" in addition to the various kinds of log tables illustrated in FIG. 7.

<Description of Tables Stored in Respective DBs>

Description will next be made of tables other than the tables already described in the foregoing first embodiment among the respective tables stored in the respective DBs (the sensor data DB 132, the log DB 134, and the definition information DB 133).

(1) Log Table

FIG. 17 is a third diagram illustrating an example of a log table stored in a log DB, and is a diagram illustrating the log table related to the social behaviors. A log table 1700 related to the social behaviors is a table in which the sensor data collection processing managing unit 111 records information related to social behaviors, the information being calculated by inputting sensor data to a social behavior determining API. The log table 1700 related to the social behaviors is stored into the log DB 134 by the sensor data collection processing managing unit 111.

As illustrated in FIG. 17, the log table 1700 related to the social behaviors includes, as information items, a "DB recording time," a "social behavior determination time (start)," and a "social behavior determination time (end)." The log table 1700 related to the social behaviors further includes, as information items, a "user name," an "information processing device ID," and a "social behavior."

Recorded as the "DB recording time" is a time stamp added at a point in time of recording social behavior log data in the log table 1700 related to the social behaviors.

Recorded as the "social behavior determination time (start)" and the "social behavior determination time (end)" are a time at which a user started a social behavior and a time at which the user ended the social behavior. For example, time stamps each added to first and last sensor data of sensor data in a given time range are recorded, the sensor data being used in determining that the social behavior is performed. In a case of depth sensor data, time stamps are recorded which are added to first and last depth sensor data included in a depth sensor data file used in determining that the social behavior is performed. However, in a case of a long depth sensor data file, the time of starting the social behavior and the time of ending the social behavior may be accurately identified and recorded based on time stamps of depth sensor data actually used in generating the social behavior log data.

Incidentally, the sensor data collection processing managing unit 111 generates social behavior log data at time $t_{l+1}$ using sensor data in a time range to time $t_{l+1-k}$ tracing back by a certain time k from sensor data sensed at time $t_{l+1}$. For example, the sensor data collection processing managing unit 111 generates social behavior log data at time $t_{l+1}$ using sensor data in a time range=time $t_{l+1-k}$ to time $t_{l+1}$. Therefore, for example, the sensor data collection processing managing unit 111 extracts depth sensor data tracing back by the certain time k from a sensor recording end time="2015/7/27/11:01:05.000" (see FIG. 8C). The sensor data collection processing managing unit 111 then determines a social behavior at the time $t_{l+1}$ based on the extracted depth sensor data.

Recorded as the "user name" is an identifier identifying the user. Recorded as the "information processing device ID" is an identifier of an information processing device managing the user.

The "social behavior" further includes a "type label," a "target," a "stage label," and "log data."

Recorded as the "type label" is information indicating a kind of the social behavior. Recorded as the "target" is an identifier identifying a user as a target of the social behavior. Recorded as the "stage label" is a stage label of the social behavior. The stage label of the social behavior is output by the social behavior determining API, and is recorded. For example, when the social behavior is an action of starting a motion, "S (stroke)" is recorded as a stage label. When the social behavior is a state of staying after starting a motion, "H (Hold)" is recorded as a stage label. When the social behavior is an action of returning to an original position, "R (Return)" is recorded as a stage label. When the social behavior is a preparing action, "P (Preparation)" is recorded as a stage label. In a case of an action unclear as to whether the action is a social behavior or an action unclear as to the kind of the social behavior, a partner in the social behavior, the length of the social behavior, or the like, "U (Unclear)" is recorded as a stage label.

Recorded as the "log data" is log data on a bone used in the social behavior performed by the user.

An example in a first row of data rows of FIG. 17 indicates that it is determined that the user 160 (user name="userA") performed a social behavior with a type label of "body-close-to" toward the user 170 (target="userB"). In addition, the example in the first row of the data rows of FIG. 17 indicates that a bone (Bone_Chest) of the user avatar rotated by +8 [degrees] from 4 [degrees] to 12 [degrees] with respect to the X-axis without changing in position as a result of the social behavior performed by the user 160.

(2) Definition Information

FIG. 18 is a third diagram illustrating an example of definition information stored in a definition information DB, and is a diagram illustrating social behavior determining API definition information. Social behavior determining API definition information 1800 defines APIs used when the sensor data collection processing managing unit 111 determines the social behaviors of users based on sensor data.

As illustrated in FIG. 18, the social behavior determining API definition information 1800 includes, as information items, an "information collecting device ID," a "social behavior determining API," "sensor data," a "social behavior type label," and a "bone desired as API input."

Defined as the "information collecting device ID" is an identifier indicating a kind of information collecting device. Defined as the "social behavior determining API" is an API used in determining a social behavior.

Defined as the "sensor data" is a kind of sensor data input to the social behavior determining API.

Defined as the "social behavior type label" is a kind of social behavior determined by the social behavior determining API. Defined as the "bone desired as API input" is a kind of bone (kinds of bones) to be input to the API in determining the social behavior using the social behavior determining API.

An example in a first row of data rows of FIG. 18 indicates that depth sensor data sensed by the depth sensor 144 identified by an information collecting device ID="c2" is input to a "pose analyzing API." In addition, the example in the first row of the data rows of FIG. 18 indicates that whether or not the social behavior of a user corresponds to "body-close-to" is determined. Further, the example in the first row of the data rows of FIG. 18 indicates that whether or not the social behavior of the user corresponds to "body-close-to" is determined based on the motion of a bone="Bone-Chest."

In addition, an example in a second row of the data rows of FIG. 18 indicates that depth sensor data sensed by the depth sensor 144 identified by the information collecting device ID="c2" is input to the "pose analyzing API." The example in the second row of the data rows of FIG. 18 also indicates that whether or not the social behavior of the user 160 corresponds to "body-far-to" is determined. Further, the example in the second row of the data rows of FIG. 18 indicates that whether or not the social behavior of the user 160 corresponds to "body-far-to" is determined based on the motion of a bone="Bone_Chest."

In addition, an example in a third row of the data rows of FIG. 18 indicates that head pose data sensed by the head pose sensor 143 identified by an information collecting device ID="c1" is input to a "face orientation analyzing API." In addition, the example in the third row of the data rows of FIG. 18 indicates that whether or not the social behavior of the user 160 corresponds to "face-close-to" is determined. Further, the example in the third row of the data rows of FIG. 18 indicates that whether or not the social behavior of the user 160 corresponds to "face-close-to" is determined based on the motion of a bone="Bone_Head."

Further, an example in a fourth row of the data rows of FIG. 18 indicates that depth sensor data sensed by the depth sensor 144 identified by the information collecting device ID="c2" is input to the "pose analyzing API." In addition, the example in the fourth row of the data rows of FIG. 18 indicates that whether or not the social behavior of the user 160 corresponds to "bodyparts-close-to" is determined. Further, the example in the fourth row of the data rows of FIG. 18 indicates that whether or not the social behavior of the user 160 corresponds to "bodyparts-close-to" is determined based on the motion of bones="Bone_LeftHand" and "Bone_RightHand."

FIGS. 19A and 19B are fourth diagrams illustrating an example of definition information stored in a definition information DB. Of the figures, FIG. 19A illustrates communication strategy definition information 1910. FIG. 19B illustrates user state checking API definition information 1920.

As illustrated in FIG. 19A, the communication strategy definition information 1910 defines the post desirable-change user states of communication partner users when the users perform a particular non-verbal behavior, the post desirable-change user states being desirable for the machine avatar. The communication strategy definition information 1910 includes, as information items, a "communication partner user name," a "triggering non-verbal behavior," and a "desirable social behavior."

Defined as the "communication partner user name" is an identifier for identifying a communication partner user that the machine avatar communicates with.

Defined as the "triggering non-verbal behavior" is a detecting condition for detecting that a particular non-verbal behavior is performed by the user. Defined as the "desirable social behavior" is a post desirable-change user state (a desirable social behavior is performed and a state after the desirable social behavior is performed is brought about) when it is detected that the particular non-verbal behavior is performed by the user.

An example in a first row of data rows of the communication strategy definition information 1910 of FIG. 19A indicates that when the output of the API="isSigh" is "true" for the user name="userA," it is determined that the particular non-verbal behavior has been performed by the user. In addition, it is indicated that a post desirable-change user state when it is determined that the particular non-verbal behavior has been performed by the user is "SocialFlow."

On the other hand, as illustrated in FIG. 19B, the user state checking API definition information 1920 defines checking methods for checking the user states of communication partner users by a calling function (API) within the system, input data for the API, and output data from the API. The user state checking API definition information 1920 includes, as information items, a "user state," "input target data," and a "user state checking API."

Defined as the "user state" is output data from an API. A post desirable-change user state is defined as the "user state" when the API is used to check the post desirable-change user state. Defined as the "input target data" is input data for the API. When the API is used to check the post desirable-change user state, social behavior type labels used to check the post desirable-change user state are defined as the "input target data." Defined as the "user state checking API" is a calling function name of the API. When the API is used to check the post desirable-change user state, the name of the API called at the time of the checking is defined as the "user state checking API."

An example in a first row of data rows of FIG. 19B indicates that whether or not a user state is "SocialFlow" may be checked by using an API referred to as checkSocialFlow. In addition, the example in the first row indicates that the checking is performed by inputting, as input target data, "jointattention-to" and "upperbody-leanforward-to," which are social behavior type labels of a corresponding user, to the API.

For example, when the input target data is input to the API, either "true" or "false" is output from the API with regard to "SocialFlow." For example, when the user fixes attention to a substantially same thing that the machine avatar is directing attention to and the upper part of the body of the user is leaned forward, "true" is output from the API with regard to "SocialFlow."

An example in a second row of the data rows indicates that whether or not a user state is "SocialSmile" may be checked by using an API referred to as checkSocialSmile. In addition, the example in the second row indicates that the checking is performed by inputting, as input target data, "mutualattention-to," "face-indirect-to," and "Shape-Mouse," which are social behavior type labels of a corresponding user, to the API.

For example, when the input target data in a time period in which the user is dialoging with the machine avatar is input to the API, either "true" or "false" is output from the API with regard to "SocialSmile." For example, "true" is output from the API when three states are established at the substantially same time, the three states being a state in which the user and the machine avatar are directing attention to each other, a state in which the face of the user is not oriented toward the machine avatar, and a state in which the user is smiling.

Incidentally, also in the present embodiment, the input target data may be not only social behavior type labels, but Shape_Mouse, bones, or the like as in the first embodiment may be specified and used together with social behavior type labels as illustrated in the present example.

FIG. 20 is a fifth diagram illustrating an example of definition information stored in a definition information DB. As illustrated in FIG. 20, tendency definition information 2000 includes, as information items, a "social behavior type label" and an "approaching tendency/avoiding tendency."

Defined as the "social behavior type label" is a kind of social behavior. Defined as the "approaching tendency/avoiding tendency" is either an approaching tendency or an avoiding tendency for each kind of social behavior. Incidentally, records defined as "social behavior type labels" in the tendency definition information 2000 denote the following actions.

For example, "body-close-to" denotes an action of bringing a body close to a partner. "body-far-to" denotes an action of moving the body away from the partner. "bodyparts-close-to" denotes an action of bringing parts of the body close to the partner. "bodyparts-far-to" denotes an action of moving parts of the body away from the partner.

In addition, "mutualattention-to" denotes an action of looking at each other. However, the action of looking at each other in this case includes an action in a case where one looks at a hand of another and the other looks at the face of the one as well as looking at each other's faces, for example. "avertedattention-to" denotes an action of looking away from the partner. "jointattention-to" denotes an action of looking at a substantially same thing as the partner. "followingattention-to" denotes an action of following and looking at a thing at which the partner is looking. "sharedattention-to" denotes an action of looking at a substantially same thing as the partner while knowing that both look at the substantially same thing.

In addition, "face-close-to" denotes an action of bringing the face close to the partner. "face-far-to" denotes an action of moving the face away from the partner. "upperbody-leanforward-to" denotes an action of leaning forward the upper part of the body. "upperbody-leanbackward-to" denotes an action of leaning the body rearward.

Further, "smile-to" denotes an action of smiling at the partner. "nosmile-to" denotes an action of not smiling at the partner.

Actions other than the actions illustrated in the tendency definition information 2000 of FIG. 20 may also be defined as approaching tendency behaviors or avoiding tendency behaviors in the tendency definition information 2000. For example, approaching tendency behaviors include an action of turning the face to the partner side and an action of turning the body to the partner side. In addition, avoiding tendency behaviors include an action of turning the face away from the partner and an action of turning the body away from the partner.

<Description of Functions of Action Instructing Unit>

Figure 21:
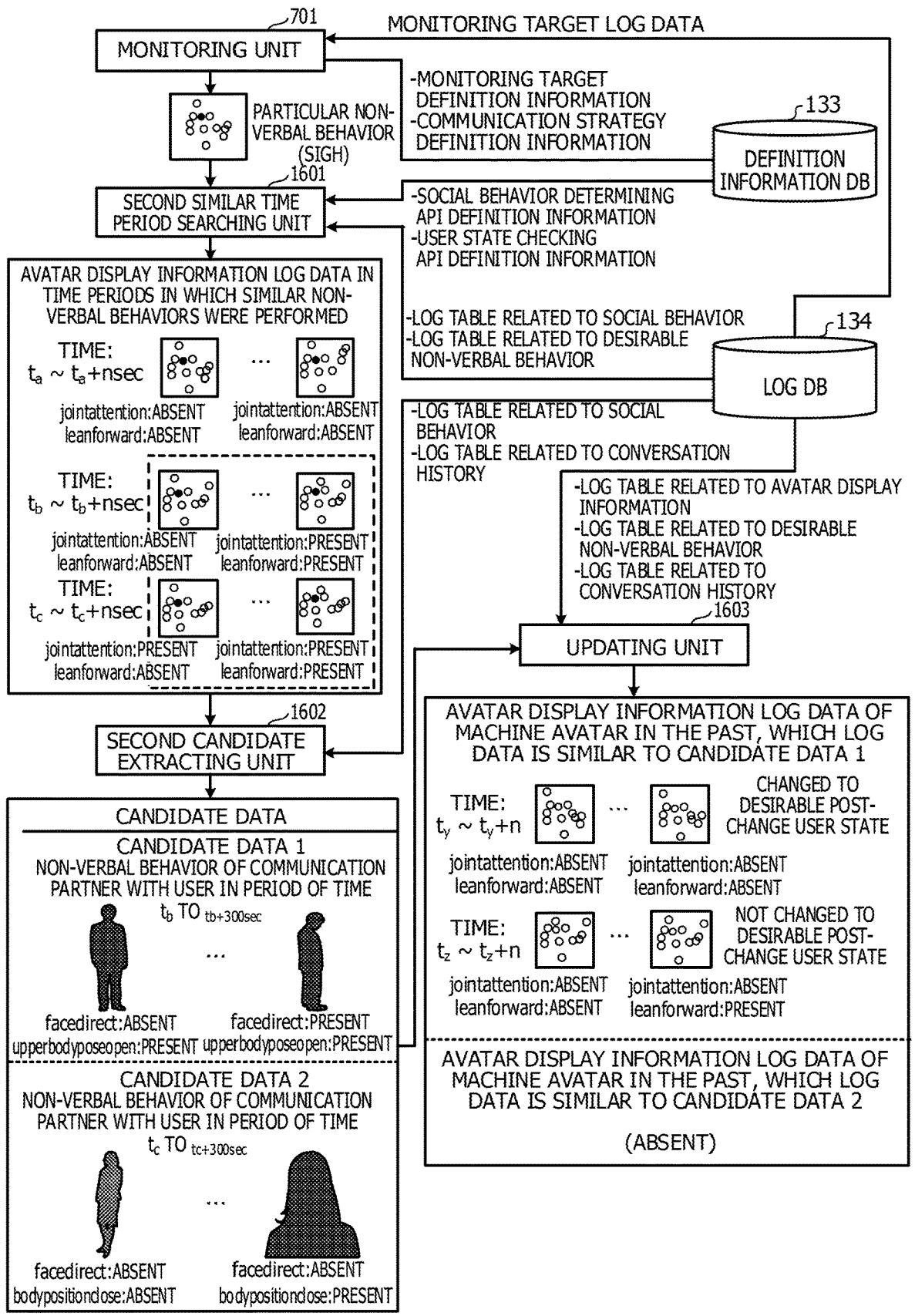
FIG. 21 is a second diagram of assistance in explaining functions of an action instructing unit.

Description will next be made of details of functions of the respective parts of the action instructing unit 125 in the image generating device 110. FIG. 21 is a second diagram of assistance in explaining functions of an action instructing unit. Incidentally, functions already described with reference to FIG. 7 are omitted in FIG. 21. The following description will be made of functions of the second similar time period searching unit 1601, the second candidate extracting unit 1602, and the updating unit 1603, for example, among the respective parts illustrated in FIG. 16.

The second similar time period searching unit 1601 refers to the log table 1010 related to the desirable non-verbal behaviors, and determines whether or not the user 160 changed to a post desirable-change user state in a time period adjacent to a time period extracted by the first similar time period searching unit 702.

Description will be made by citing a concrete example. Suppose that the first similar time period searching unit 702 extracts time periods of time $t_a$ to time $t_{a+nsec}$, time $t_b$ to time $t_{b+nsec}$, and time $t_c$ to time $t_{c+nsec}$. The second similar time period searching unit 1601 refers to the log table 1010 related to the desirable non-verbal behaviors for a time period adjacent to each of the extracted time periods.

For example, the second similar time period searching unit 1601 refers to a "checking result" satisfying the following conditions in the log table 1010 related to the desirable non-verbal behaviors. •A "user present time" is included in the time period of time $t_a$ to time $t_{a+300\ sec}$. •A "user name" corresponds to UserA. •A "desirable non-verbal behavior" is SocialFlow.

When the "checking result" is "false" as a result of the reference, the second similar time period searching unit 1601 determines that the user 160 did not change to the post desirable-change user state.

Similarly, the second similar time period searching unit 1601 refers to a "checking result" satisfying the following conditions in the log table 1010 related to the desirable non-verbal behaviors. •A "user present time" is included in the time period of time $t_b$ to time $t_{b+300\ sec}$. •A "user name" corresponds to UserA. •A "desirable non-verbal behavior" is SocialFlow.

When the "checking result" is "true" as a result of the reference, the second similar time period searching unit 1601 determines that the user 160 changed to the post desirable-change user state. In this case, the second similar time period searching unit 1601 notifies the time period of time $t_b$ to time $t_{b+300\ sec}$ to the second candidate extracting unit 1602. The time period of time $t_b$ to time $t_{b+300\ sec}$ is a time period in which the state of the user 160 changed from a state of sighing to a state of concentrating in cooperation during the past one day. Incidentally, the state of sighing is a state in which the output of "isSigh" is "true." In addition, the state of concentrating in cooperation as used in the description is a state of "SocialFlow."

Similarly, the second similar time period searching unit 1601 refers to a "checking result" satisfying the following conditions in the log table 1010 related to the desirable non-verbal behaviors. •A "user present time" is included in the time period of time $t_c$ to time $t_{c+300\ sec}$. •A "user name" corresponds to userA. •A "desirable non-verbal behavior" is SocialFlow.

When the "checking result" is "true" as a result of the reference, the second similar time period searching unit 1601 determines that the user 160 changed to the post desirable-change user state. In this case, the second similar time period searching unit 1601 notifies the time period of time $t_c$ to time $t_{c+300\ sec}$ to the second candidate extracting unit 1602. The time period of time $t_c$ to time $t_{c+300\ sec}$ is a time period in which the state of the user 160 changed from a state of sighing to a state of concentrating in cooperation during the past one day.

The second candidate extracting unit 1602 identifies second time periods based on the time periods notified from the second similar time period searching unit 1601.

The second candidate extracting unit 1602 refers to the log table 1700 related to the social behaviors based on the identified second time periods, and extracts the log data of a user as a communication partner with the user 160 or the machine avatar. The second candidate extracting unit 1602 notifies the updating unit 1603 of, as candidate data, the time series data of position coordinates and rotation angles of each bone included in the extracted social behavior log data.

Incidentally, the example of FIG. 21 illustrates that the log data of the machine avatar M is extracted in the second time period of the time period of time $t_b$ to time $t_{b+300\ sec}$ (candidate data 1). For example, it is illustrated that social behavior log data is extracted in which a type label="face-direct" makes a transition from "absent" to "present" and a type label="upper-bodypose-open" continues to remain "present."

In addition, the example of FIG. 21 illustrates that the log data of the user 170 is extracted in the second time period of the time period of time $t_c$ to time $t_{c+300\ sec}$ (candidate data 2). For example, it is illustrated that social behavior log data is extracted in which a type label="face-direct" continues to remain "absent" and a type label="bodyposition-close" makes a transition from "absent" to "present."

The updating unit 1603 evaluates the effectiveness of the candidate data notified from the second candidate extracting unit 1602, and generates an image of the machine avatar M at time $t_{1+1}$ based on candidate data evaluated as effective. In addition, the updating unit 1603 notifies the generated image of the machine avatar M at time $t_{1+1}$ to the machine avatar information display processing unit 121.

Incidentally, in order to determine the effectiveness of the candidate data for the user, the updating unit 1603 checks whether the machine avatar has performed a social behavior similar to that of the candidate data toward the user 160 in the past. In a case where the machine avatar has performed a social behavior similar to that of the candidate data toward the user 160 in the past, the updating unit 1603 checks whether the user 160 changed to a post desirable-change user state. The effectiveness in this case indicates a degree of possibility that the user 160 changes to the post desirable-change user state when the machine avatar performs a social behavior similar to that of the candidate data toward the user 160. When it is determined that the machine avatar has performed a social behavior similar to that of the candidate data toward the user 160 in the past, the updating unit 1603 checks whether or not the user 160 changed to the post desirable-change user state as a result of the social behavior performed toward the user 160. The updating unit 1603 evaluates the effectiveness of the candidate data based on a result of the checking, and notifies the machine avatar information display processing unit 121 of an image of the machine avatar at time $t_{1+1}$, the image being generated based on candidate data evaluated as effective.

Functions of the updating unit 1603 will be described by citing a concrete example. The following description will be made of a case where the effectiveness of the candidate data notified from the second candidate extracting unit 1602 is evaluated.

The updating unit 1603 refers to the log table 1020 related to the conversation history for the past one week, and extracts time periods in which the user 160 and the machine avatar communicated with each other.

The updating unit 1603 also refers to the log table 1700 related to the social behaviors for the past one week. Then, the updating unit 1603 extracts time series data identical or similar to the candidate data 1 and the candidate data 2, the time series data being derived from social behavior log data in the extracted time periods.

For example, suppose that the updating unit 1603 extracts two pieces of time series data identical or similar to the candidate data 1 in the past one week (from time $t_y$ to time $t_{y+n}$ and from time $t_z$ to time $t_{z+n}$). In this case, the updating unit 1603 refers to the log table 1010 related to the desirable non-verbal behaviors, and determines whether or not the user 160 changed to the post desirable-change user state in time periods subsequent to the two respective extracted pieces of time series data.

The example of FIG. 21 illustrates that the user 160 did not change to the post desirable-change user state in the time period subsequent to the time period of time $t_y$ to time $t_{y+n}$ among the time periods subsequent to the two respective extracted pieces of time series data. For example, in the social behavior of the user 160 in the time period subsequent to the time period of time $t_y$ to time $t_{y+n}$, both "jointattention-to" and "lean-forward-to" continue to remain "absent."

The example of FIG. 21 also illustrates that the user 160 changed to the post desirable-change user state in the time period subsequent to the time period of time $t_z$ to time $t_{z+n}$ among the time periods subsequent to the two respective extracted pieces of time series data. For example, in the social behavior of the user 160 in the time period subsequent to the time period of time $t_z$ to time $t_{z+n}$, "jointattention-to" continues to remain "absent," while "lean-forward-to" makes a transition from "absent" to "present." Consequently, the updating unit 1603 calculates, as an evaluation value of the candidate data 1, the ratio (1/2) of the number of times that the user 160 changed to the post desirable-change user state.

On the other hand, suppose that the updating unit 1603 does not extract any time series data identical or similar to the candidate data 2 in the past one week. In this case, the updating unit 1603 calculates, as an evaluation value of the candidate data 2, the ratio (0/0) of the number of times that the user 160 changed to the post desirable-change user state.

The updating unit 1603 compares the evaluation value of the candidate data 1 and the evaluation value of the candidate data 2 with each other. When the updating unit 1603 determines that the evaluation value of the candidate data 1 is larger, the updating unit 1603 generates an image of the machine avatar at time $t_{1+1}$ based on the candidate data 1, and notifies the machine avatar information display processing unit 121 of the image of the machine avatar at time $t_{1+1}$. Incidentally, as for the evaluation value, a case where the number of times of performing the social behavior is zero may be evaluated highly in some cases.

<Image Update Processing of Machine Avatar>

Figure 22:
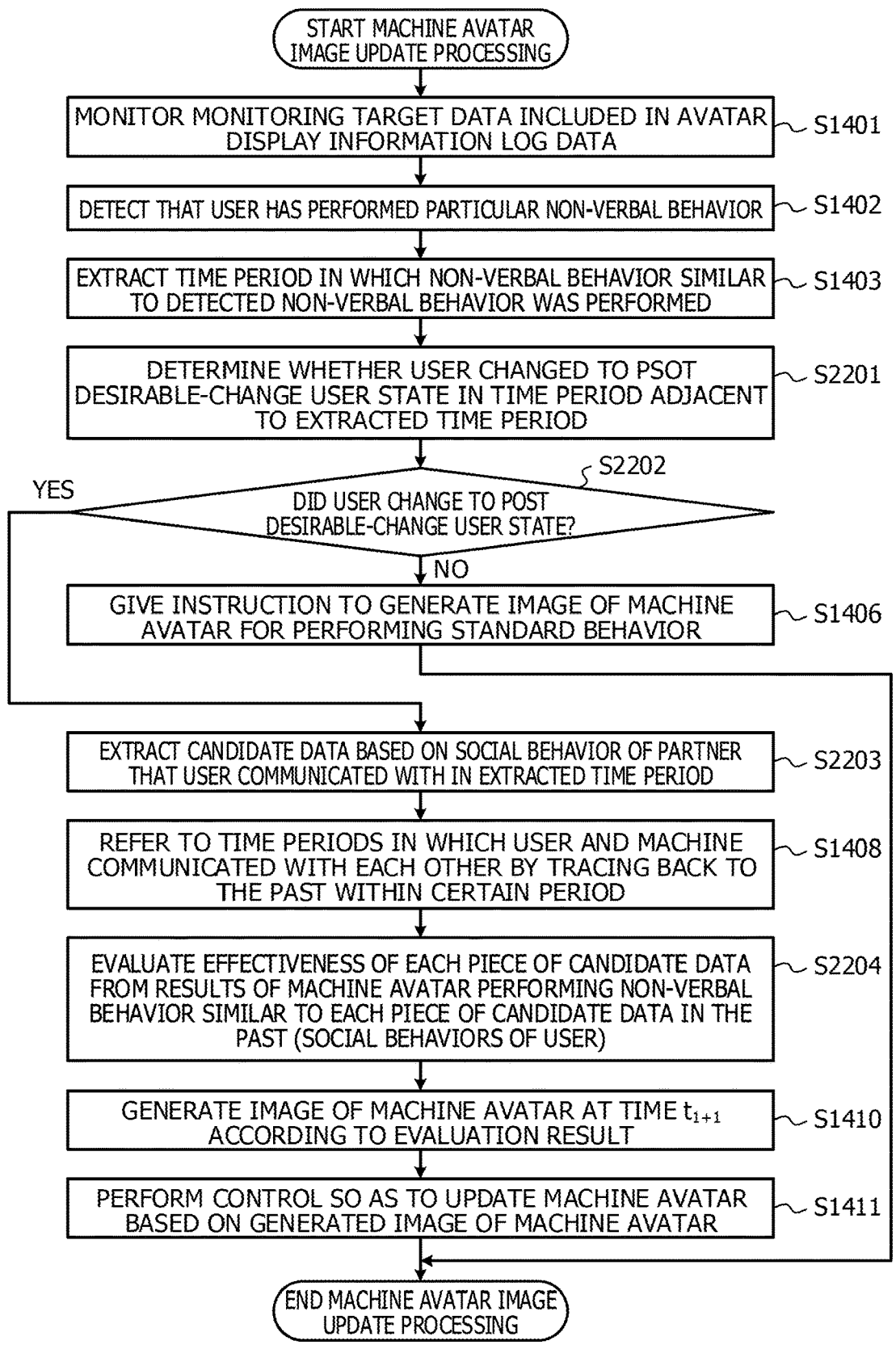
FIG. 22 is a second flowchart of machine avatar image update processing.

A flow of machine avatar image update processing will next be described. FIG. 22 is a second flowchart of machine avatar image update processing. The machine avatar image update processing of FIG. 22 is performed in parallel with the first flowchart illustrated in FIG. 14. Incidentally, of respective processes illustrated in FIG. 22, steps S1401 to S1403, step S1406, step S1408, and steps S1410 to S1411 are substantially the same as the respective corresponding processes in FIG. 14. Description will therefore be omitted in the following.

In step S2201, the second similar time period searching unit 1601 determines whether or not the user 160 changed to the post desirable-change user state in a time period adjacent to a time period extracted by the first similar time period searching unit 702.

When determining that the user 160 did not change to the post desirable-change user state in the adjacent time period (No in step S2202), the second similar time period searching unit 1601 proceeds to step S1406.

When determining that the user 160 changed to the post desirable-change user state in the adjacent time period (Yes in step S2202), on the other hand, the second similar time period searching unit 1601 proceeds to step S2203.

In step S2203, the second candidate extracting unit 1602 extracts candidate data based on social behavior log data of a communication partner with the user 160 in the extracted time period.

In step S2204, the updating unit 1603 retrieves time series data similar to the candidate data in the time periods referred to in step S1408, and identifies the social behaviors of the user 160 in time periods subsequent to the retrieved time series data. In addition, the updating unit 1603 determines whether or not the user 160 changed to the post desirable-change user state based on the identified social behaviors, and evaluates the effectiveness of the candidate data based on a result of the determination.

As is clear from the above description, when a communication partner user performs a particular non-verbal behavior, the image generating system according to the third embodiment refers to the social behavior of a user or the machine avatar that the user in question communicated with in the past. Then, the image generating system according to the third embodiment generates a next image of the machine avatar, the next image being effective in bringing about a post desirable-change user state, based on the referred-to social behavior.

By thus referring to social behaviors, it is possible to extract more candidate data. For example, even in non-verbal behaviors of raising a hand, the position coordinates and rotation angles of the bone in the avatar skeleton model differ depending on a raising speed and a raising angle. For example, even in a case of identical non-verbal behaviors as viewed from the eyes of a user, the avatar display information log data is not necessarily completely the same. On the other hand, because social behavior log data indicates a non-verbal behavior toward a communication partner, a similar non-verbal behavior of raising a hand in a direction of the partner may be regarded as the same social behavior. Consequently, by referring to social behaviors in the machine avatar image update processing, it is possible to extract, as candidate data, non-verbal behaviors that it is difficult to extract in the first embodiment.

[Fourth Embodiment]

In the foregoing third embodiment, the updating unit 1603 refers to the log table 900 related to the avatar display information or the log table 1700 related to the social behaviors, and searches for time series data identical or similar to candidate data.

On the other hand, a fourth embodiment encodes candidate data and encodes avatar display information log data and social behavior log data, and searches for identical or similar coded data.

Figure 23:
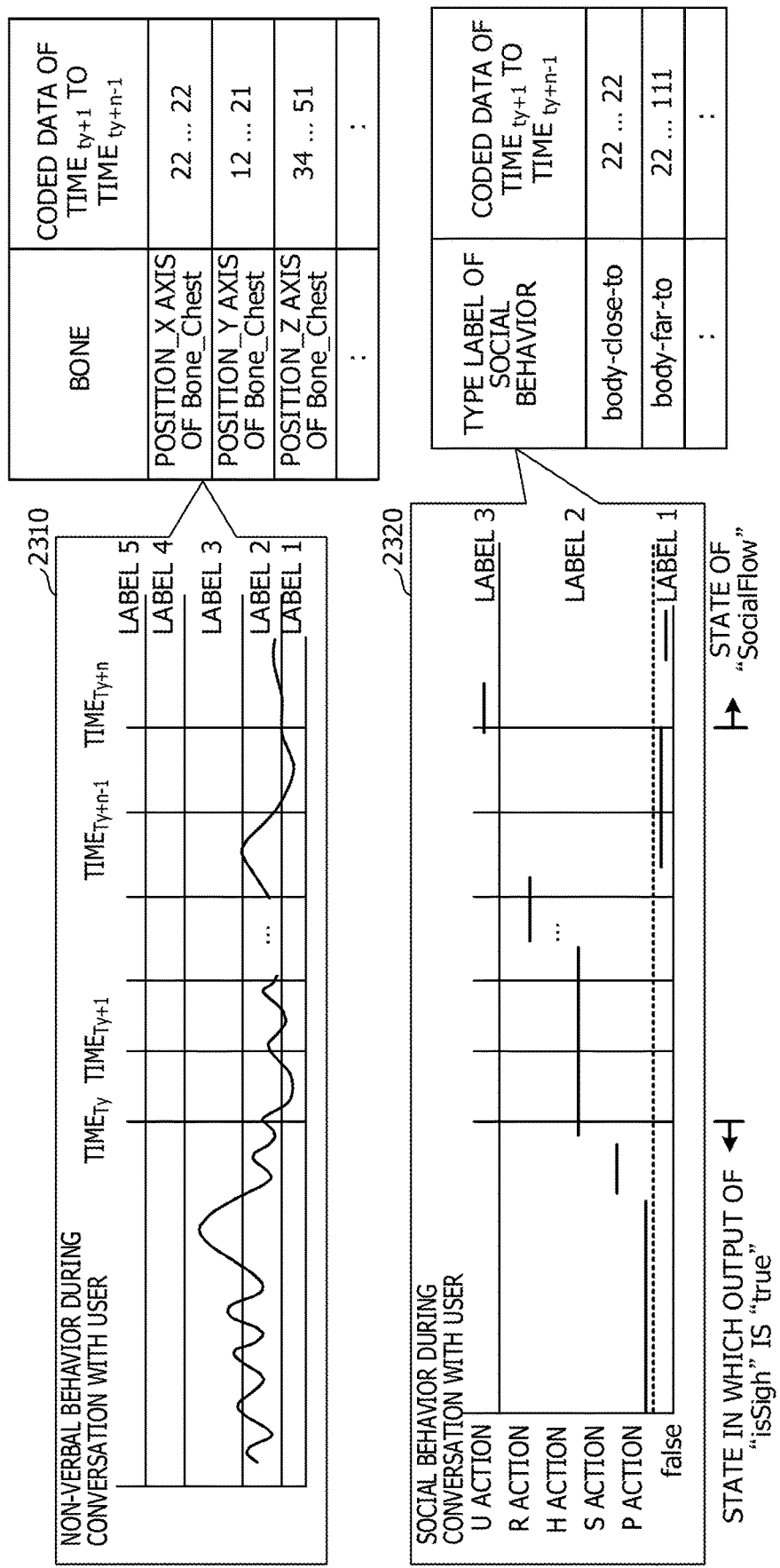
FIG. 23 is a diagram illustrating an example of a method of encoding avatar display information log data and social behavior log data.

FIG. 23 is a diagram illustrating an example of a method of encoding avatar display information log data and social behavior log data. In FIG. 23, a graph 2310 illustrates time series data on the Y-coordinate position of "Bone_Chest" among the respective bones of the machine avatar.

Incidentally, a method of encoding avatar display information log data (method of performing encoding by division into labels of five levels) is already described in the foregoing second embodiment, and therefore description will be omitted in the following.

On the other hand, a graph 2320 illustrates changes in the stage label of "body-close-to" among social behaviors of the machine avatar toward the user 160 (user ID="userA").

As illustrated in the graph 2320, the fourth embodiment encodes the stage label into one of labels of three levels in each update cycle. For example, in a case of the stage label="false," the stage label is encoded into a label 1, and in a case of the stage label="P," "S," "H," or "R," the stage label is encoded into a label 2. In addition, in a case of the stage label="U," the stage label is encoded into a label 3.

Thus, the social behavior log data of the machine avatar M in a period of time $t_{y+1}$ to time $t_{y+n-1}$ may be encoded into (2, 2, . . . , 1, 1). Incidentally, the user 160 is in a sighing state (output of "isSigh" is "true") before time $t_y$, and the user 160 is in a concentrating state (state of "SocialFlow") after time $t_{y+n}$.

An example of coded data obtained by encoding avatar display information log data and social behavior log data in the period of time $t_{y+1}$ to time $t_{y+n-1}$ is illustrated in the right side of the graph 2310 and the graph 2320 of FIG. 23.

When avatar display information log data and social behavior log data are thus encoded, the updating unit 1603 may make a search using the coded data in searching for data identical or similar to candidate data.

Incidentally, while the stage label is encoded into labels of three levels when the social behavior log data is encoded in the above description, the encoding method is not limited to this. The stage label may be encoded into labels of five levels, which are the same as those of the stage label.

[Fifth Embodiment]

The updating unit 1603 in the foregoing third embodiment evaluates the effectiveness of candidate data based on an evaluation value calculated according to whether or not the user 160 changed to a post desirable-change user state. On the other hand, a fifth embodiment calculates distances (degrees of similarity) between candidate data and time series data similar to the candidate data, and calculates weighted evaluation values by weighting evaluation values using average values of the calculated distances.

Incidentally, in describing the calculation of the weighted evaluation values using a concrete example, description will be made of a case where there are following two pieces of candidate data as time series data similar to the candidate data 1 in the fifth embodiment.

One piece of candidate data is extracted based on the log data of a user P. Another piece of candidate data is extracted based on the log data of a user Q. Incidentally, the pieces of candidate data of respective non-verbal behavior groups will be denoted as $SV_{pc}$ and $SV_{qc}$. In addition, suppose, for example, that there are six cases of the machine avatar M performing a non-verbal behavior similar to the candidate data $SV_{pc}$ toward the user 160 during the past one week, and that there are two cases of the machine avatar M performing a non-verbal behavior similar to the candidate data $SV_{qc}$ toward the user 160 during the past one week. Suppose that social behavior groups of the machine avatar M in the six time periods similar to $SV_{pc}$ are $SV_{mp1}$, $SV_{mp2}$, . . . , and $SV_{mp6}$. Similarly, suppose that social behavior groups of the machine avatar M in the two time periods similar to $SV_{qc}$ are $SV_{mq1}$ and $SV_{mq2}$.

In the fifth embodiment, the updating unit 1603 analyzes the breakdown of "$SV_{pc}$," which is the candidate data of the non-verbal behavior group of the user P. For example, when $SV_{pc}$ is social behavior log data for 100 seconds, and a time occupied by an approaching tendency behavior is 50 seconds, the updating unit 1603 calculates that a ratio of the approaching tendency behavior is 0.5. In addition, when a time occupied by an avoiding tendency behavior is 30 seconds, the updating unit 1603 calculates that a ratio of the avoiding tendency behavior is 0.3. The ratio of the approaching tendency behavior and the ratio of the avoiding tendency behavior are calculated because a plurality of non-verbal behaviors are performed in one time period in the present embodiment, in which it is desired to calculate similarity between a non-verbal behavior group performed in one time period and non-verbal behavior groups performed in a plurality of time periods. For example, by calculating the above-described ratios, it is possible to numerically evaluate the tendency of social behaviors included in the non-verbal behavior group performed in one time period.

For example, when both of the ratios of approaching tendency behaviors and the ratios of avoiding tendency behaviors, the approaching tendency behaviors and the avoiding tendency behaviors being included in non-verbal behaviors performed in two respective time periods, are close to each other, the tendencies of the social behaviors included in the two non-verbal behavior groups are close to each other, and therefore it may be determined that the non-verbal behaviors in the two time periods are similar.

Accordingly, the updating unit 1603 first calculates the ratio of an approaching tendency behavior and the ratio of an avoiding tendency behavior in each of the social behavior log data groups $SV_{mp1}$ to $SV_{mp6}$ of the machine avatar in the six time periods similar to the candidate data $SV_{pc}$ of the non-verbal behavior group of the user P. The updating unit 1603 similarly calculates the ratio of an approaching tendency behavior and the ratio of an avoiding tendency behavior in each of the social behavior log data groups $SV_{mq1}$ and $SV_{mq2}$ of the machine avatar in the two time periods similar to the candidate data $SV_{qc}$ of the non-verbal behavior group of the user Q.

Next, the updating unit 1603 calculates distances between the ratio of the approaching tendency of $SV_{pc}$ and each of the ratios of the approaching tendencies of $SV_{mp1}$, $SV_{mp2}$, $SV_{mp3}$, $SV_{mp4}$, $SV_{mp5}$, and $SV_{mp6}$. In addition, the updating unit 1603 calculates distances between the ratio of the avoiding tendency of $SV_{pc}$ and each of the ratios of the avoiding tendencies of $SV_{mp1}$, $SV_{mp2}$, $SV_{mp3}$, $SV_{mp4}$, $SV_{mp5}$, and $SV_{mp6}$.

Similarly, the updating unit 1603 calculates distances between the ratio of the approaching tendency of $SV_{qc}$ and each of the ratios of the approaching tendencies of $SV_{mq1}$ and $SV_{mq2}$. The updating unit 1603 also calculates distances between the ratio of the avoiding tendency of $SV_{qc}$ and each of the ratios of the avoiding tendencies of $SV_{mq1}$ and $SV_{mq2}$.

In addition, the updating unit 1603 calculates average values of the distances calculated for the ratios of the approaching tendencies, and calculates average values of the distances calculated for the ratios of the avoiding tendencies.

Further, the updating unit 1603 calculates weighted evaluation values by weighting the evaluation value of the candidate data 1 and the evaluation value of the candidate data 2 using the respective calculated average values.

The above functions of the updating unit 1603 will be described by citing a concrete example. Suppose that the ratio of the approaching tendency of $SV_{pc}$ is 0.5, and that the ratios of the approaching tendencies of $SV_{mp1}$, $SV_{mp2}$, $SV_{mp3}$, $SV_{mp4}$, $SV_{mp5}$, and $SV_{mp6}$, respectively, are (0.7, 0.3, 0.9, 0, 0, 0.1). In this case, approaching tendency distances from $SV_{pc}$ are (0.2, −0.2, 0.4, −0.5, −0.5, −0.4). As a result, an average value of the distances between the ratio of the approaching tendency of $SV_{pc}$ and the ratios of the approaching tendencies of $SV_{mp1}$ to $SV_{mp6}$ is −0.16.

In addition, suppose that the ratio of the avoiding tendency of $SV_{pc}$ is 0.3, and the ratios of the avoiding tendencies of $SV_{mp1}$, $SV_{mp2}$, $SV_{mp3}$, $SV_{mp4}$, $SV_{mp5}$, and $SV_{mp6}$, respectively, are (0.4, 0.2, 0.1, 0.5, 0.9, 0.7). In this case, avoiding tendency distances from $SV_{pc}$ are (0.1, −0.1, −0.2, 0.2, 0.6, 0.4). As a result, an average value of the distances between the ratio of the avoiding tendency of $SV_{pc}$ and the ratios of the avoiding tendencies of $SV_{mp1}$ to $SV_{mp6}$ is 0.16.

Similarly, suppose that an average value of distances between the ratio of the approaching tendency of $SV_{qc}$ and the ratios of the approaching tendencies of $SV_{mq1}$ to $SV_{mq2}$ is calculated to be 0.3.

In addition, suppose that an average value of distances between the ratio of the avoiding tendency of $SV_{qc}$ and the ratios of the avoiding tendencies of $SV_{mq1}$ to $SV_{mq2}$ is calculated to be 0.16.

Consequently, the updating unit 1603 calculates a weighted evaluation value=(⅗)×(1−|−0.16×10.16|) by weighting the evaluation value of the candidate data 1 (the evaluation value being assumed to be "⅗" in this case). Similarly, the updating unit 1603 calculates a weighted evaluation value=(½)×(1−|−0.3|×|0.16|) by weighting the evaluation value of the candidate data 2 (the evaluation value being assumed to be "½" in this case).

When evaluation values are thus weighted using social behavior log data, the more similar the ratios of the approaching tendency and the avoiding tendency of candidate data are (for example, the more similar the social behaviors of the candidate data are), the more the evaluation value of the candidate data may be increased.

[Sixth Embodiment]

The foregoing fifth embodiment evaluates the effectiveness of each piece of extracted candidate data, and generates an image of the machine avatar at time $t_{l+1}$ using candidate data evaluated as effective. On the other hand, a sixth embodiment synthesizes most recent social behavior log data of the machine avatar and social behavior log data corresponding to candidate data, and evaluates the effectiveness of the synthesized data. Then, an image of the machine avatar at time $t_{l+1}$ is generated using the candidate data corresponding to synthesized data evaluated as effective. The following description will be made of the sixth embodiment, centering on differences from the foregoing fifth embodiment.

<Description of Functional Configuration of Action Instructing Unit and respective DBs in Image Generating Device>

Figure 24:
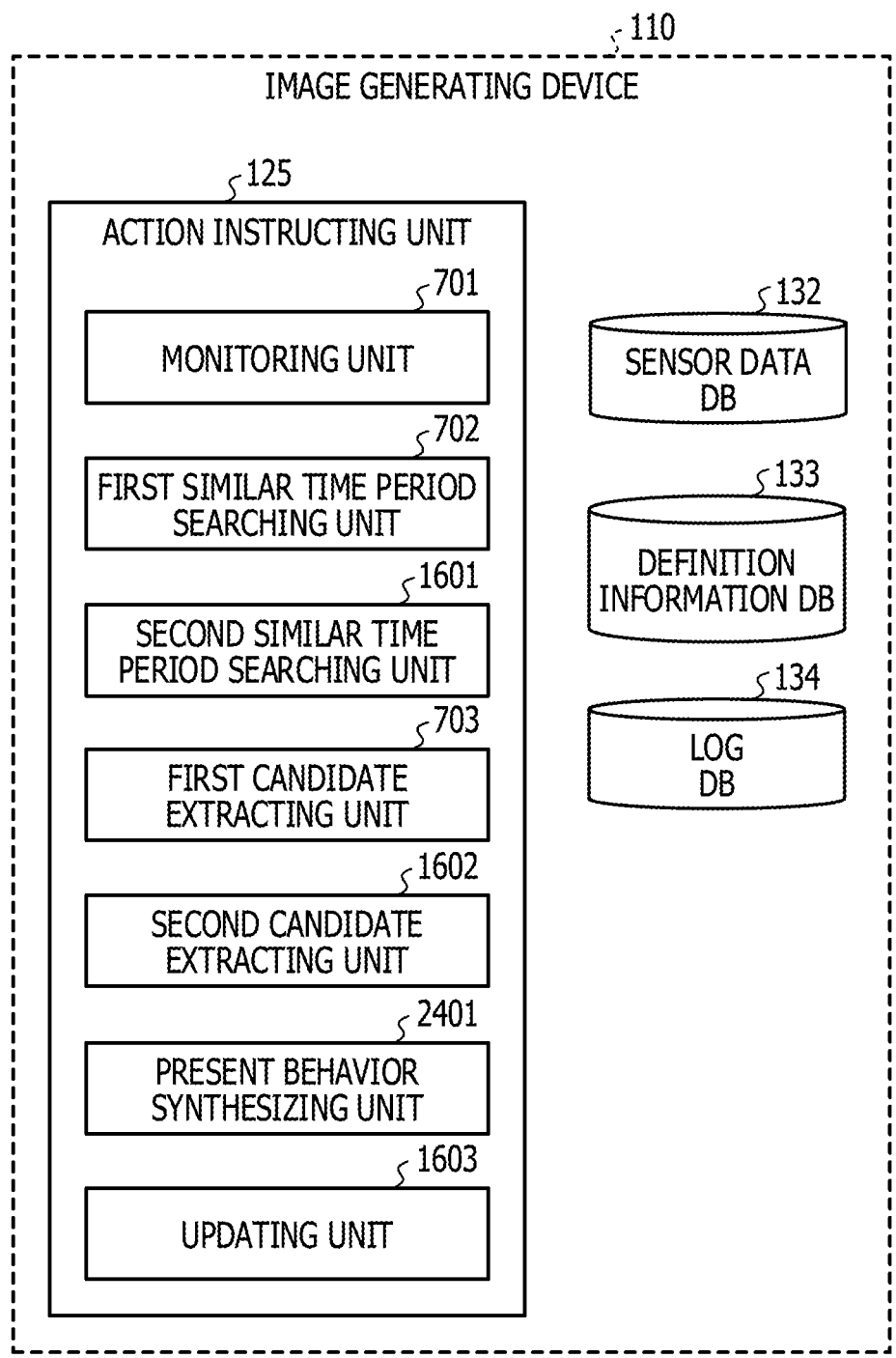
FIG. 24 is a third diagram illustrating a functional configuration of an action instructing unit and respective DBs in an image generating device.

FIG. 24 is a third diagram illustrating a functional configuration of an action instructing unit and respective DBs in an image generating device. A difference from FIG. 16 is that a present behavior synthesizing unit 2401 is provided.

The present behavior synthesizing unit 2401 synthesizes the social behavior log data of the machine avatar at a present time and in a most recent period and social behavior log data corresponding to candidate data extracted in the second candidate extracting unit 1602.

Suppose that coded data obtained by encoding the social behavior log data of the machine avatar at a present time and in a most recent period (time $t_{l-5}$ to time $t_1$) is "$SV_{mt1}$." In addition, description will be made of a case where there are following two pieces of candidate data as non-verbal behaviors to be performed by the machine avatar. In the present example, one piece of candidate data is extracted based on the log data of the user P. Another piece of candidate data is extracted based on the log data of the user Q. Suppose that coded data obtained by encoding social behavior log data corresponding to the candidate data 1 is "$SV_{pc}$," and that coded data obtained by encoding social behavior log data corresponding to the candidate data 2 is "$SV_{qc}$."

The present behavior synthesizing unit 2401 synthesizes $SV_{mt1}$ and $SV_{pc}$. In addition, the present behavior synthesizing unit 2401 synthesizes $SV_{mt1}$ and $SV_{qc}$. A concrete example of synthesis processing of the present behavior synthesizing unit 2401 will be described with reference to FIG. 25.

Figure 25:
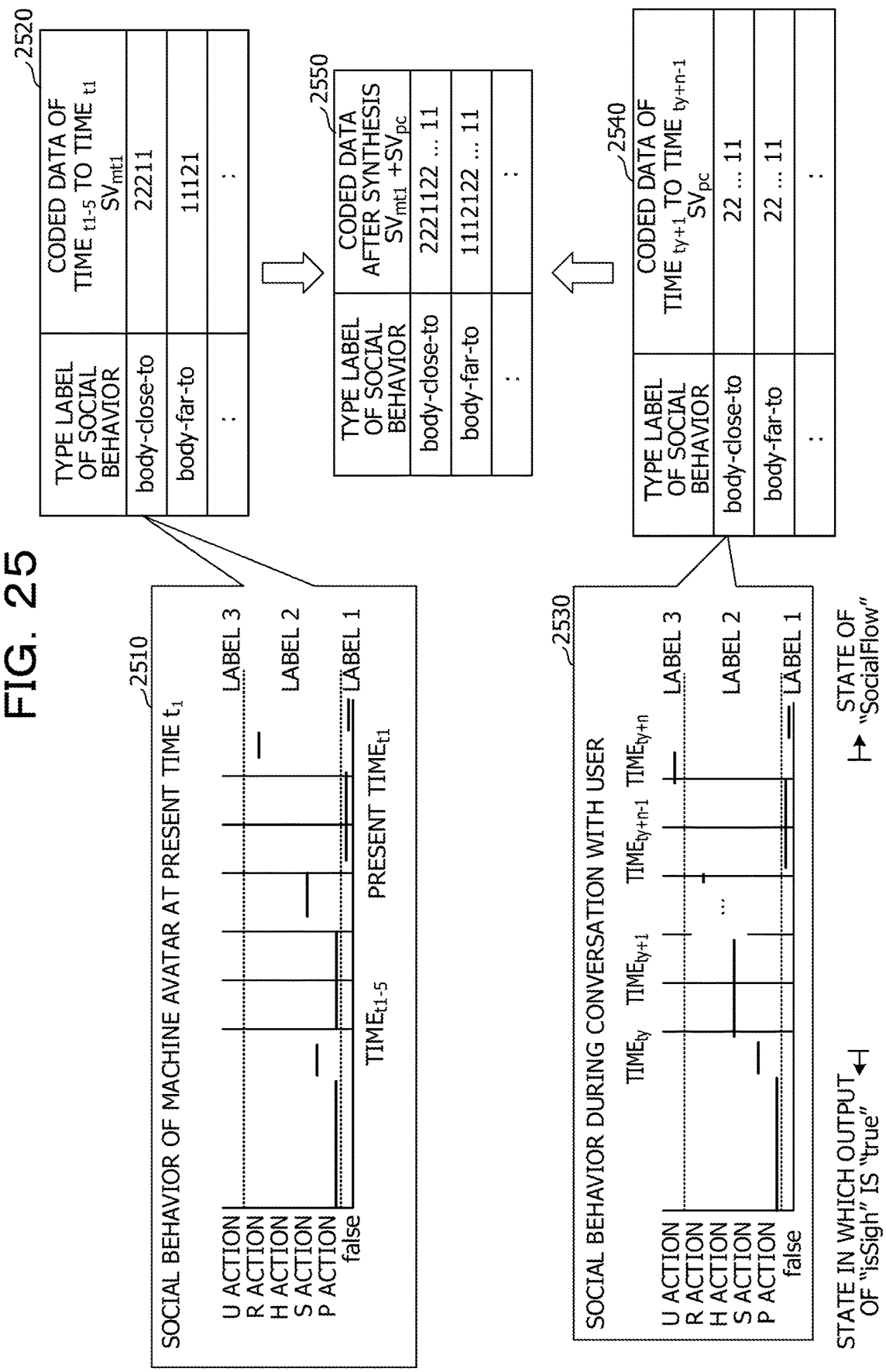
FIG. 25 is a diagram illustrating details of synthesis processing by a present behavior synthesizing unit.

FIG. 25 is a diagram illustrating details of synthesis processing by a present behavior synthesizing unit. In FIG. 25, a graph 2510 illustrates changes in the stage label of "body-close-to" in the social behavior log data of the machine avatar in the period of time $t_{l-5}$ to time $t_1$. In addition, a table 2520 illustrates coded data ($SV_{mt1}$) obtained by encoding the stage label of each type label of the social behavior log data of the machine avatar in the period of time $t_{l-5}$ to time $t_1$.

A graph 2530 illustrates changes in the stage label of "body-close-to" in the social behavior log data corresponding to the candidate data 1. In addition, a table 2540 illustrates coded data ($SV_{pc}$) obtained by encoding the social behavior log data corresponding to the candidate data 1.

Further, a table 2550 illustrates coded data after the synthesis processing by the present behavior synthesizing unit. As illustrated in the table 2550, the present behavior synthesizing unit 2401 generates synthesized data by synthesizing the coded data for each corresponding type label.

For example, the present behavior synthesizing unit 2401 synthesizes coded data (2, 2, 2, 1, 1) of "body-close-to" which coded data is included in $SV_{mt1}$ and coded data (2, 2, . . . , 1, 1) of "body-close-to" which coded data is included in $SV_{pc}$. Synthesized data (2, 2, 2, 1, 1, 2, 2, . . . , 1, 1) is thereby generated.

Similarly, the present behavior synthesizing unit 2401 synthesizes coded data (1, 1, 1, 2, 1) of "body-far-to" which coded data is included in $SV_{mt1}$ and coded data (2, 2, . . . , 1, 1) of "body-far-to" which coded data is included in $SV_{pc}$. Synthesized data (1, 1, 1, 2, 1, 2, 2, . . . , 1, 1) is thereby generated.

<Machine Avatar Image Update Processing>

Figure 26:
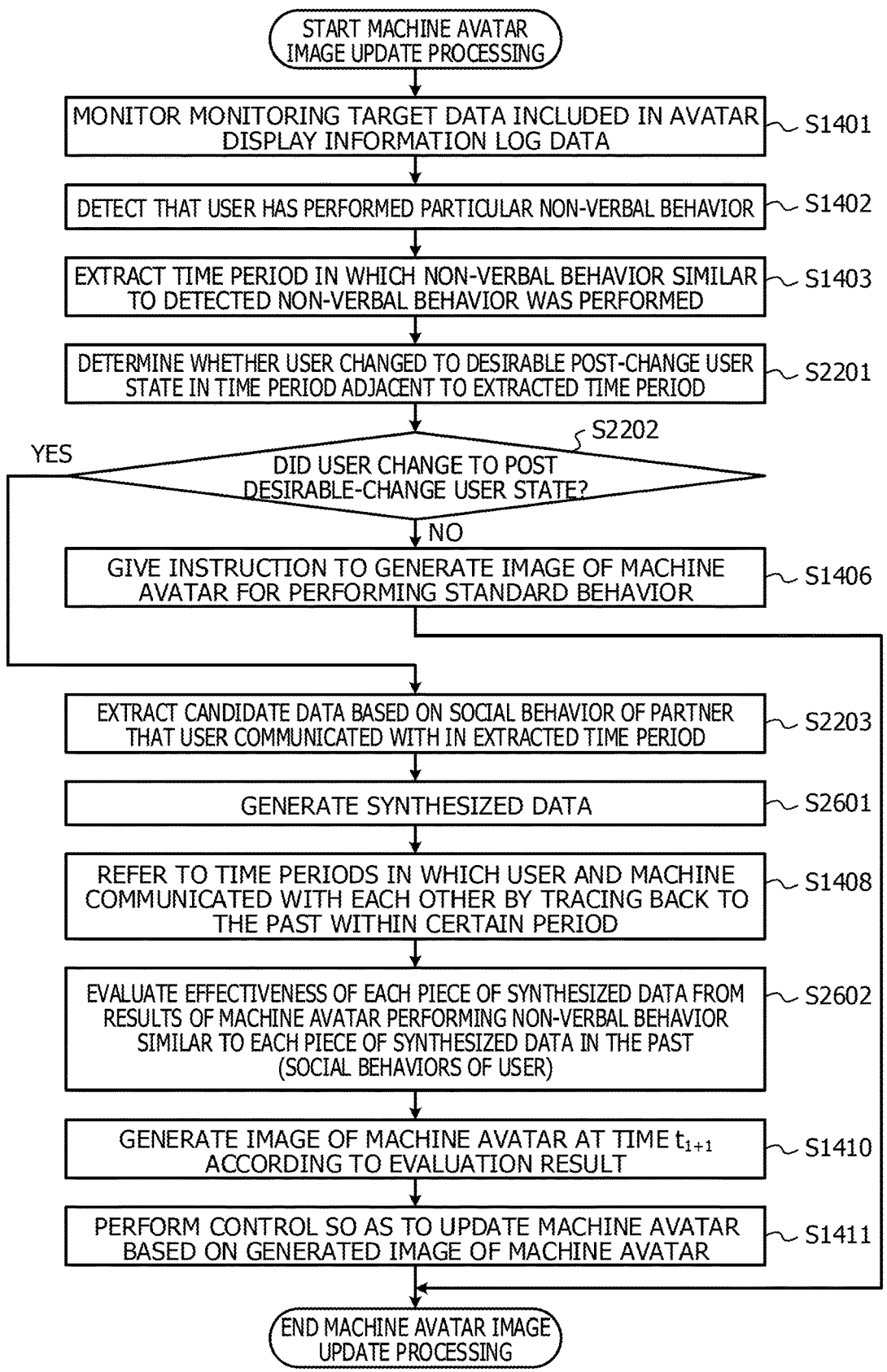
FIG. 26 is a third flowchart of machine avatar image update processing.

A flow of machine avatar image update processing will next be described. FIG. 26 is a third flowchart of machine avatar image update processing. Incidentally, of respective processes illustrated in FIG. 26, steps S1401 to S2203, step S1408, and step S1410 and step S1411 are substantially the same as the respective corresponding processes in FIG. 22. Description will therefore be omitted in the following.

In step S2601, the present behavior synthesizing unit 2401 synthesizes the social behavior log data of the machine avatar at a present time and in a most recent period and social behavior log data corresponding to candidate data extracted in the second candidate extracting unit 1602. The present behavior synthesizing unit 2401 thereby generates synthesized data.

In step S2602, the updating unit 1603 retrieves coded data similar to the synthesized data in time periods referred to in step S1408. In addition, the updating unit 1603 determines whether or not the user 160 changed to a post desirable-change user state in time periods subsequent to the retrieved coded data. In addition, the updating unit 1603 evaluates the effectiveness of the synthesized data based on a result of the determination.

By thus evaluating the synthesized data, the sixth embodiment may increase a possibility of the communication partner user changing to the post desirable-change user state.

[Seventh Embodiment]

In the foregoing first to sixth embodiments, the monitoring unit 701 determines whether or not the user 160 has performed a particular non-verbal behavior by using a trigger checking API for monitoring target log data. On the other hand, a seventh embodiment separates monitoring target log data into a plurality of frequency bands by performing frequency analysis of the monitoring target log data, and determines whether or not a particular non-verbal behavior has been performed by using a trigger checking API for data in each of the frequency bands. The following description will be made of the seventh embodiment, centering mainly on differences from the first embodiment.

<Description of Functional Configuration of Action Instructing Unit and Respective DBs in Image Generating Device>

Figure 27:
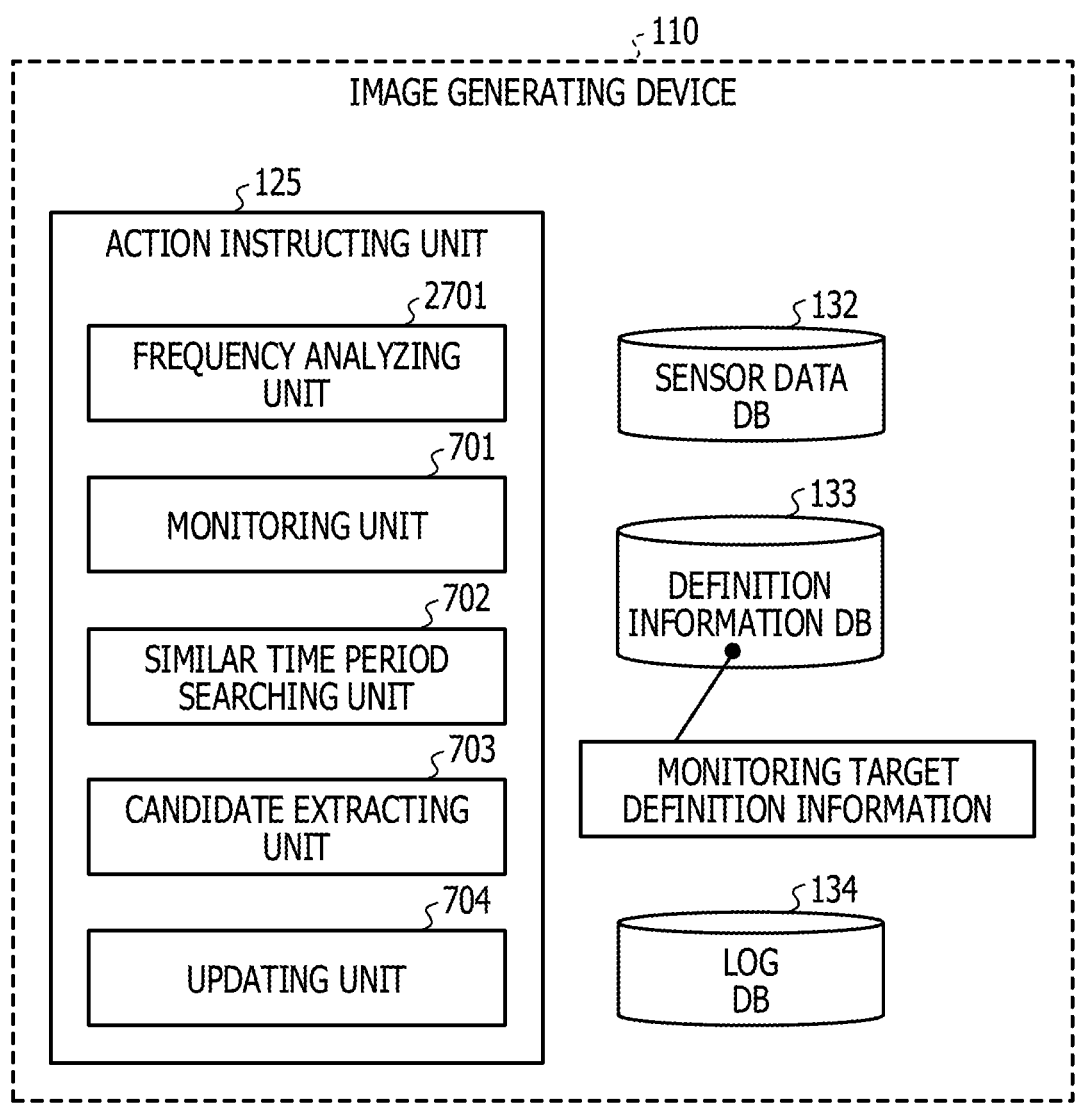
FIG. 27 is a fourth diagram illustrating a functional configuration of an action instructing unit and respective DBs in an image generating device.

FIG. 27 is a fourth diagram illustrating a functional configuration of an action instructing unit and respective DBs in an image generating device. As illustrated in FIG. 27, the action instructing unit 125 includes a frequency analyzing unit 2701 in addition to the respective parts illustrated in FIG. 7. In addition, the definition information DB 133 has monitoring target definition information different from the monitoring target definition information 1100 illustrated in FIG. 11.

The frequency analyzing unit 2701 performs frequency analysis of monitoring target log data, and separates the monitoring target log data into data in a high frequency band, data in a medium frequency band, and data in a low frequency band, for example. The frequency analyzing unit 2701 performs the frequency analysis by, for example, a method such as empirical mode decomposition (EMD). In addition, the frequency analyzing unit 2701 notifies the monitoring unit 701 of data in a frequency band suitable for detecting a particular non-verbal behavior of the user 160 in the separated monitoring target log data.

<Description of Monitoring Target Definition Information Stored in Definition Information DB>

FIG. 28 is a fourth diagram illustrating an example of definition information stored in a definition information DB, and is a diagram illustrating monitoring target definition information. Monitoring target definition information 2800 includes a "subtle behavior check" in addition to the information items included in the monitoring target definition information 1100.

Defined as the "subtle behavior check" is information indicating whether or not to perform determination using data in a given frequency band in the monitoring target log data. "true" indicates that determination is performed using data in a given frequency band in the monitoring target log data. "false" indicates that determination is performed using the monitoring target log data (data before being separated into given frequency bands).

For example, in a fifth row of data rows of the monitoring target definition information 2800 in FIG. 28, "Bone_Head" and "Bone_Chest" are defined as monitoring target log data, and "true" is defined for the "subtle behavior check."

Therefore, the monitoring unit 701 inputs data in each frequency band or a particular frequency band determined in advance with regard to "Bone_Head" and "Bone_Chest" to the trigger checking API="isRestles."

<Example of Frequency Analysis>

Figure 29:
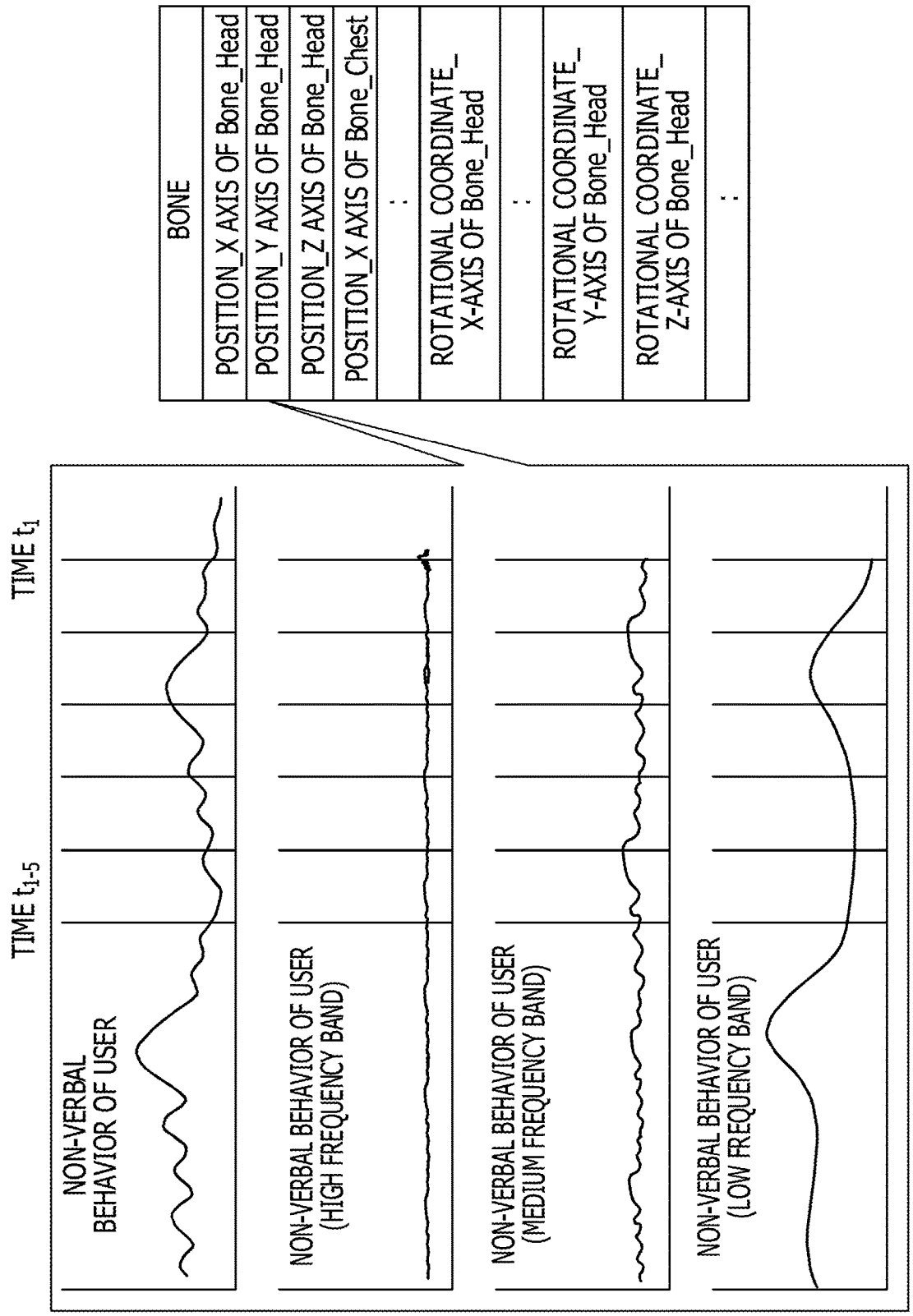
FIG. 29 is a diagram illustrating an example of frequency analysis by a frequency analyzing unit.

An example of the frequency analysis by the frequency analyzing unit 2701 will next be described. FIG. 29 is a diagram illustrating an example of frequency analysis by a frequency analyzing unit.

As illustrated in FIG. 29, the frequency analyzing unit 2701, for example, performs frequency analysis of time series data on the Y-coordinate position of "Bone_Chest" at a present time and in a most recent period (from time $t_{1-5}$ to time $t_1$), and separates the time series data into data in a high frequency band, data in a medium frequency band, and data in a low frequency band.

Whether or not the output of "isRestles" is "true" for the user 160 (restless or uneasy state) depends on the data in the high frequency band. The monitoring unit 701 therefore performs a non-verbal behavior trigger check for the user 160 using the time series data in the high frequency band in the time series data of the Y-coordinate position of "Bone_Chest." For example, whether or not the output of "isRestles" is "true" is determined.

<Machine Avatar Image Update Processing>

Figure 30:
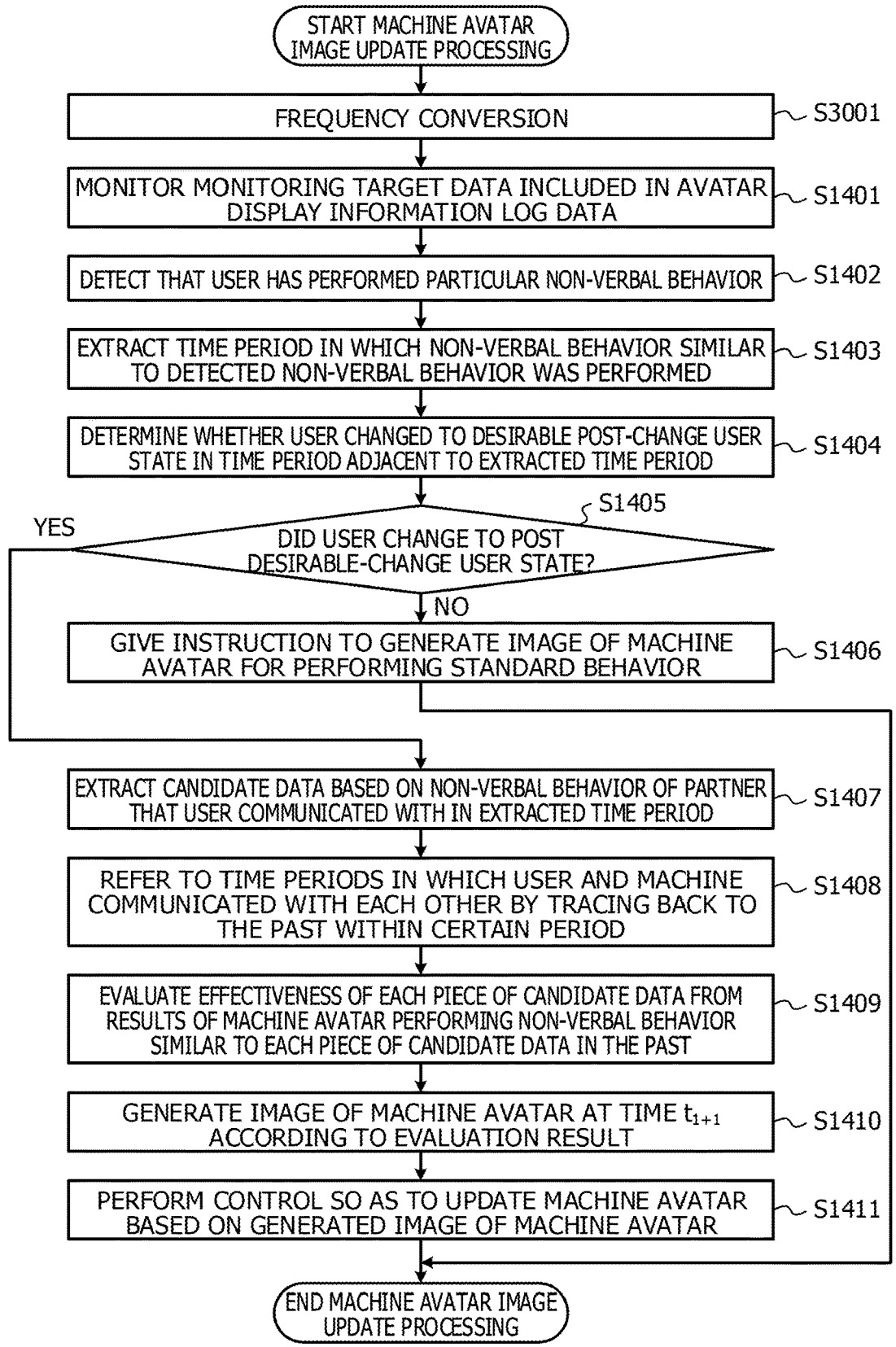
FIG. 30 is a fourth flowchart of machine avatar image update processing.

A flow of machine avatar image update processing will next be described. FIG. 30 is a fourth flowchart of machine avatar image update processing. Incidentally, of respective processes illustrated in FIG. 30, steps S1401 to S1411 are substantially the same as the respective corresponding processes in FIG. 14. Description will therefore be omitted in the following.

In step S3001, the frequency analyzing unit 2701 performs frequency analysis of monitoring target log data, and separates the monitoring target log data into data in a high frequency band, data in a medium frequency band, and data in a low frequency band, for example. In addition, the frequency analyzing unit 2701 notifies the monitoring unit 701 of data in a frequency band (for example, the high frequency band) suitable for extracting a particular non-verbal behavior of the user 160 in the separated monitoring target log data.

Thus, the seventh embodiment judges the monitoring target log data using the data in the frequency band suitable for determining whether or not the user 160 has performed a particular non-verbal behavior. It is therefore possible to avoid a situation in which even though the user 160 performs a particular non-verbal behavior, the monitoring unit 701 overlooks the particular non-verbal behavior. For example, even in a case where another slow motion and a jittering motion occur simultaneously, it is possible to avoid a situation in which the monitoring unit 701 overlooks the jittering motion desired to be detected as a non-verbal behavior.

[Eighth Embodiment]

In the foregoing first to sixth embodiments, the monitoring unit 701 determines whether or not the user 160 has performed a particular non-verbal behavior using a trigger checking API for monitoring target log data. On the other hand, an eighth embodiment performs frequency analysis of monitoring target log data, and determines whether or not the user 160 has performed a particular non-verbal behavior by inputting the monitoring target log data to a trigger checking API after removing a steady non-verbal behavior. Incidentally, a steady non-verbal behavior refers to a motion caused by the pulsation of a heart or respiration. The following description will be made of the eighth embodiment, centering mainly on differences from the first embodiment.

<Description of Functional Configuration of Action Instructing Unit and Respective DBs in Image Generating Device>

Figure 31:
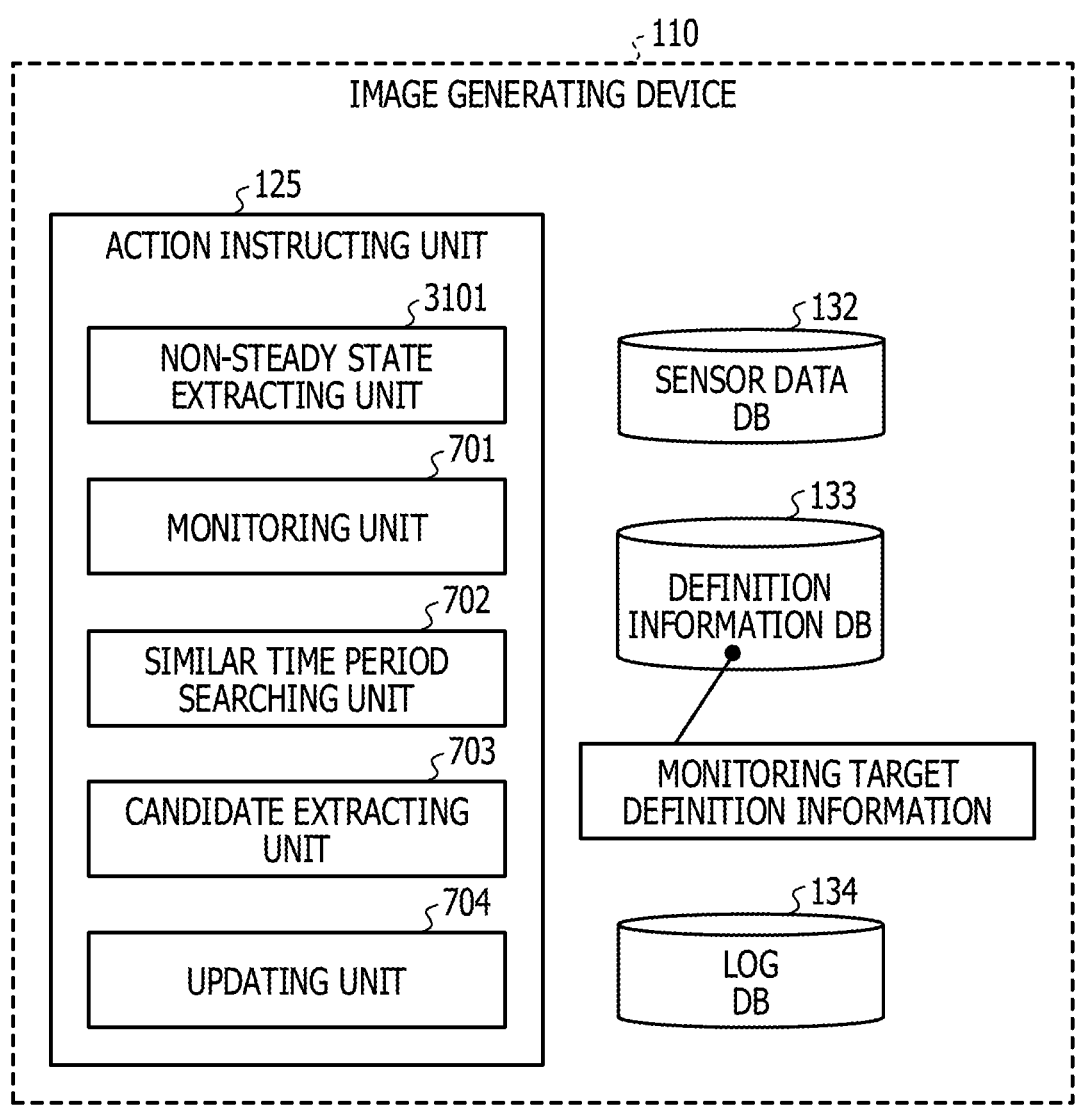
FIG. 31 is a fifth diagram illustrating a functional configuration of an action instructing unit and respective DBs in an image generating device.

FIG. 31 is a fifth diagram illustrating a functional configuration of an action instructing unit and respective DBs in an image generating device. As illustrated in FIG. 31, the action instructing unit 125 includes a non-steady state extracting unit 3101 in addition to the respective parts illustrated in FIG. 7. In addition, the definition information DB 133 has monitoring target definition information 3200 different from the monitoring target definition information 1100 illustrated in FIG. 11 and FIG. 27.

The non-steady state extracting unit 3101 performs frequency analysis of monitoring target log data, and separates the monitoring target log data into data in a high frequency band, data in a medium frequency band, and data in a low frequency band, for example. The non-steady state extracting unit 3101 performs the frequency analysis by, for example, a method such as EMD. In addition, the non-steady state extracting unit 3101 removes data in a frequency band in which a steady non-verbal behavior tends to appear, the data having a type label in which a steady non-verbal behavior tends to appear, from the separated monitoring target log data, and then notifies resulting data to the monitoring unit 701. For example, the non-steady state extracting unit 3101 extracts data including a non-steady non-verbal behavior from the monitoring target data, and notifies the data including the non-steady non-verbal behavior to the monitoring unit 701.

Description will be made by citing a concrete example. The pulsation of a heart, for example, is between 60 beats to 80 beats per minute, and is included in a low frequency band around 1 [Hz]. On the other hand, of respective bones, "Bone_Chest" is a bone close to the position of the heart, and therefore the position coordinates of "Bone_Chest" tend to be affected by the pulsation of the heart. For example, time series data on the position coordinates of "Bone_Chest" may be said to be data having a type label in which a steady non-verbal behavior tends to appear.

Accordingly, the non-steady state extracting unit 3101 separates time series data on the position coordinates of "Bone_Chest" of a particular user into data in a high frequency band ($IMF_{high}$), data in a medium frequency band ($IMF_{mid}$), and data in a low frequency band ($IMF_{low}$). A steady non-verbal behavior is included in $IMF_{low}$. Thus, the non-steady state extracting unit 3101 removes $IMF_{low}$, and notifies $IMF_{mid}$ and $IMF_{high}$ to the monitoring unit 701.

<Description of Monitoring Target Definition Information Stored in Definition Information DB>

FIG. 32 is a fifth diagram illustrating an example of definition information stored in a definition information DB, and is a diagram illustrating monitoring target definition information. The monitoring target definition information may be the monitoring target definition information 3200 in FIG. 31. The monitoring target definition information 3200 includes "steady non-verbal behavior filtering" and a "steady non-verbal behavior frequency band" in addition to the information items included in the monitoring target definition information 1100.

Defined as the "steady non-verbal behavior filtering" is whether or not to remove a given frequency band.

Defined as the "steady non-verbal behavior frequency band" is a frequency band to be removed. In a second row of data rows of the monitoring target definition information 3200 in FIG. 32, "Bone_Head," "Bone_LeftShoulder," and "Bone_RightShoulder" are defined as monitoring target data. With regard to "Bone_Head" in the monitoring target data, the monitoring unit 701 inputs data before being separated into the given frequency bands to a trigger checking API="isNap." On the other hand, with regard to "Bone_LeftShoulder" and "Bone_RightShoulder," the monitoring unit 701 inputs data in the high frequency band and the medium frequency band to the trigger checking API="isNap." This is because a steady non-verbal behavior is included in data in the low frequency band.

In a fourth row of the data rows, "Bone_Head" and "Bone_Chest" are defined as monitoring target data. With regard to "Bone_Head" in the monitoring target data, the monitoring unit 701 inputs data before being separated into the given frequency bands to the trigger checking API="isRestles." On the other hand, with regard to "Bone_Chest," the monitoring unit 701 inputs data in the high frequency band and the medium frequency band to the trigger checking API="isNap." This is because a steady non-verbal behavior is included in the data in the low frequency band.

<Machine Avatar Image Update Processing>

Figure 33:
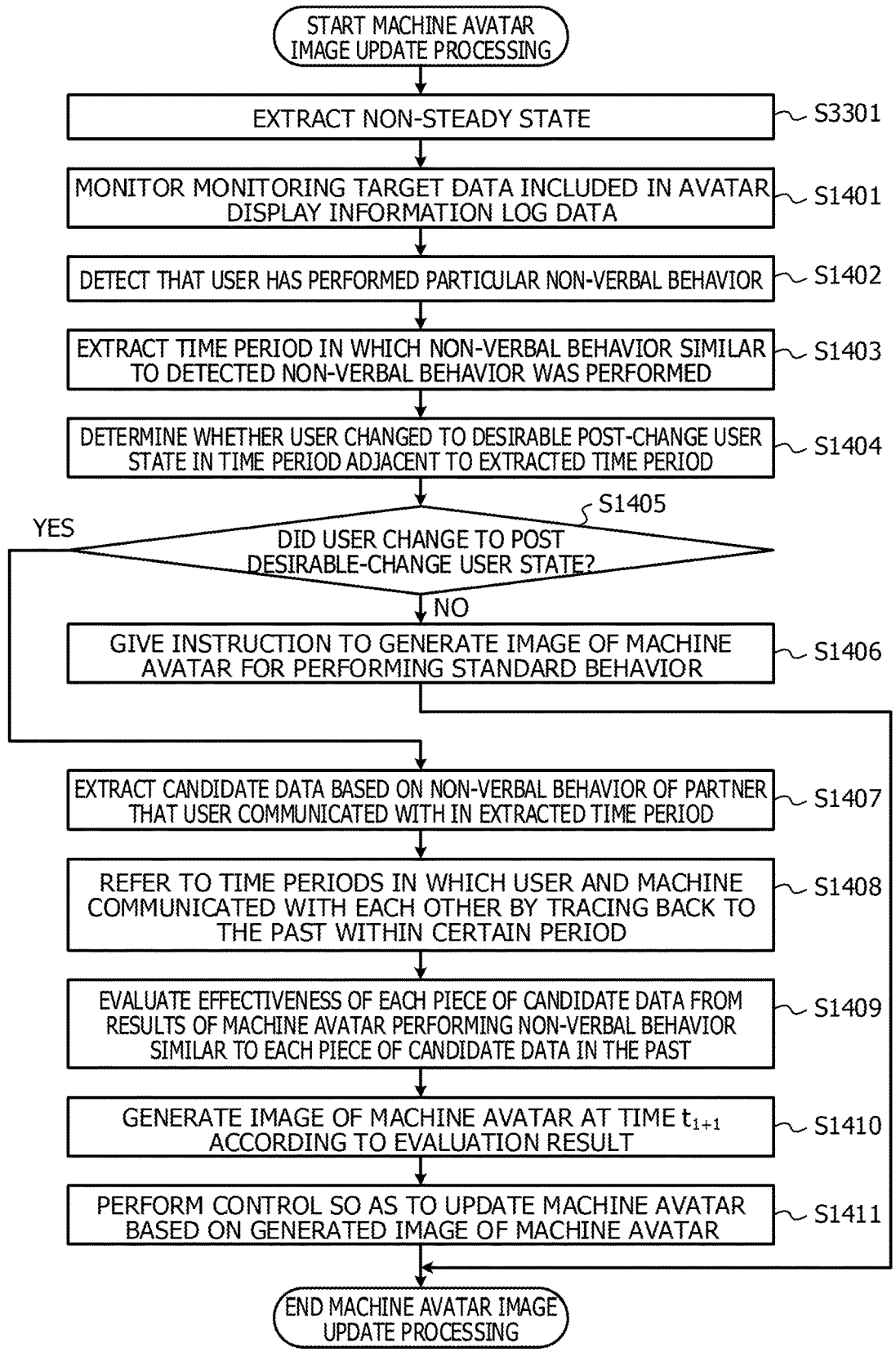
FIG. 33 is a fifth flowchart of machine avatar image update processing.

A flow of machine avatar image update processing will next be described. FIG. 33 is a fifth flowchart of machine avatar image update processing. Incidentally, of respective processes illustrated in FIG. 33, steps S1401 to S1411 are substantially the same as the respective corresponding processes in FIG. 14. Description thereof will therefore be omitted in the following.

In step S3301, the non-steady state extracting unit 3101 performs frequency analysis of monitoring target log data, and separates the monitoring target log data into data in a high frequency band, data in a medium frequency band, and data in a low frequency band, for example. In addition, the non-steady state extracting unit 3101 removes data in a frequency band in which a steady non-verbal behavior tends to appear, the data having a type label in which a steady non-verbal behavior tends to appear, from the separated monitoring target log data, and then notifies resulting data to the monitoring unit 701.

Thus, the eighth embodiment removes data in a frequency band in which a steady non-verbal behavior is included, and judges the monitoring target log data. It is therefore possible to avoid a situation in which a steady non-verbal behavior of the user 160 is erroneously determined to be a particular non-verbal behavior. In addition, as far as an objective of judging a non-verbal behavior is concerned, the presence or absence of a non-verbal behavior may be determined using input data from which a steady non-verbal behavior, which may be noise data, is removed. It is thus possible to improve determination accuracy.

[Ninth Embodiment]

The foregoing sixth embodiment generates synthesized data by synthesizing social behavior log data of the machine avatar at a present time and in a most recent period and social behavior log data corresponding to candidate data. On the other hand, in generating synthesized data, a ninth embodiment includes data on a switching action between most recent avatar display information log data of the machine avatar and candidate data. A switching action refers to a given action synthesized to provide a natural action when the most recent avatar display information log data of the machine avatar and the candidate data are synthesized. Switching actions include, for example, a blink, an action of long closing eyes, a sigh, a nod, an action of being reseated, and an action of touching the body with a hand.

It is thereby possible to reduce a feeling of strangeness between an image of the machine avatar at time $t_{1+1}$ and an image of the machine avatar at time $t_1$ when the image of the machine avatar at time $t_{l+1}$ is displayed. The following description will be made of the ninth embodiment.

<Description of Functional Configuration of Action Instructing Unit and Respective DBs in Image Generating Device>

Figure 34:
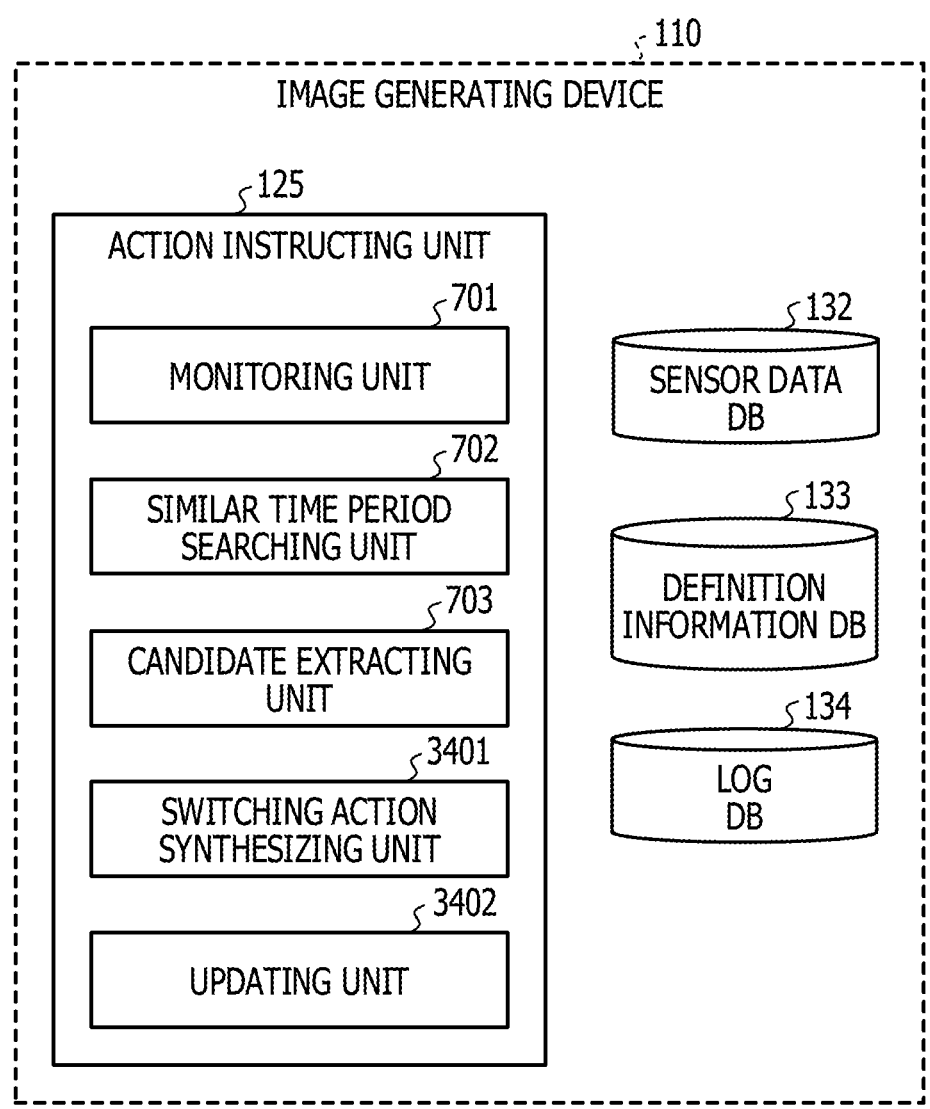
FIG. 34 is a sixth diagram illustrating a functional configuration of an action instructing unit and respective DBs in an image generating device.

FIG. 34 is a sixth diagram illustrating a functional configuration of an action instructing unit and respective DBs in an image generating device. Differences from FIG. 7 lie in that a switching action synthesizing unit 3401 is provided and in that functions of an updating unit 3402 are different from functions of the updating unit 704.

The switching action synthesizing unit 3401 synthesizes avatar display information log data of the machine avatar at a present time and in a most recent period, switching action data, and candidate data.

Here, suppose that coded data obtained by encoding the avatar display information log data of the machine avatar at the present time and in the most recent period (time $t_{l-5}$ to time $t_l$) is "$AB_{mt1}$." In addition, suppose that coded data obtained by encoding the switching action data is "$AB_{cc1}$," and that coded data obtained by encoding the candidate data 1 (see FIG. 7) is "$AB_{pc}$." The switching action synthesizing unit 3401 synthesizes "$AB_{mt1}$," "$AB_{cc1}$," and "$AB_{pc}$."

Figure 35:
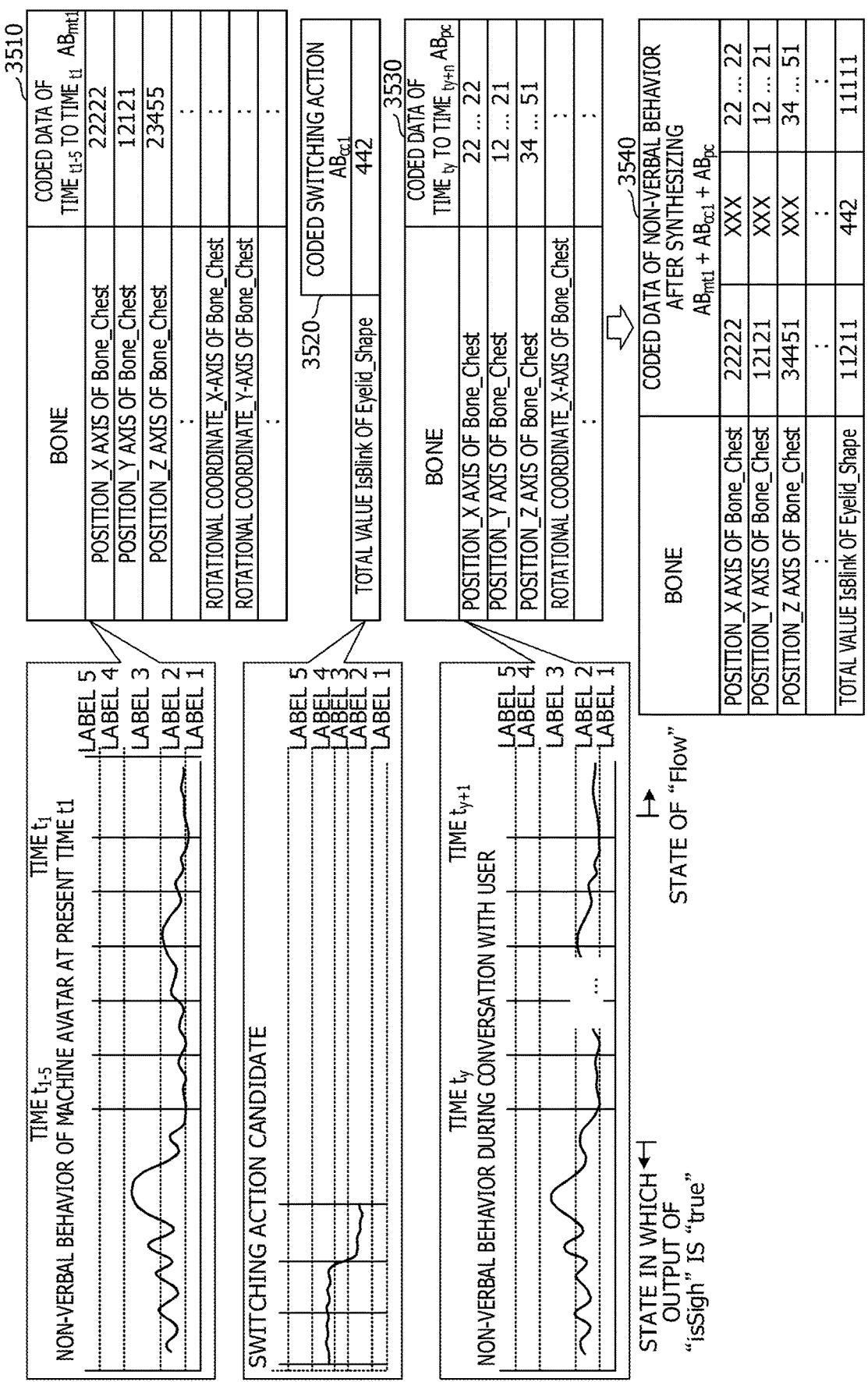
FIG. 35 is a diagram illustrating details of synthesis processing by a switching action synthesizing unit.

Description will be made by citing a concrete example with reference to FIG. 35. FIG. 35 is a diagram illustrating details of synthesis processing by a switching action synthesizing unit. Suppose, for example, that coded data on the X-coordinate position of "Bone_Chest" in $AB_{mt1}$, $AB_{cc1}$, and $AB_{pc}$ is 22222, no definition (XXX), and 22, . . . , 22, respectively (see tables 3510 and 3530). In this case, synthesized data generated by the switching action synthesizing unit 3401 is 22222XX22, . . . , 22 (see a table 3540).

Here, suppose that a total value "isBlink" of "Eyelid_Shape" is defined as a switching action (see a table 3520). The total value "isBlink" of "Eyelid_Shape" refers to a value expressing a blinking state in a range of zero to one from a positional state of a mesh on the periphery of eyes, with a closed state of eyelids as zero and an opened state of eyelids as one.

In this case, no definition for the position coordinates of Bone_Chest is provided as a switching action. Therefore, coded data indicating that no action is to be performed is automatically inserted in the part of "XXX."

However, when no definition for the position coordinates of Bone_Chest is provided as a switching action, coded data indicating that some action is to be performed may be automatically inserted in the part of "XXX." For example, last coded data ("2") of $AB_{mt1}$ and first coded data ("2") of $AB_{pc}$ may be duplicated as respective halves, and automatically inserted. Alternatively, an average value ("2") of last coded data ("1") of $AB_{mt1}$ and first coded data ("3") of $AB_{pc}$ may be duplicated and automatically inserted.

The updating unit 3402 evaluates the effectiveness of the synthesized data generated by the switching action synthesizing unit 3401, and generates an image of the machine avatar at time $t_{l+1}$ based on switching action data and candidate data corresponding to synthesized data evaluated as effective.

Here, suppose that coded data indicating that no action is to be performed is automatically inserted in the part of the switching action ("XXX") when the switching action synthesizing unit 3401 generates synthesized data. In this case, the updating unit 3402 inserts data indicating a standard action of the machine avatar. A standard action of the machine avatar refers to, for example, an action of lowering both arms and swaying while relaxed.

The updating unit 3402 replaces all of the switching action ("XXX") by the standard action. Alternatively, the updating unit 3402 may replace a first half part of the switching action by an action for realizing natural switching between the non-verbal behavior at the present time and in the most recent period and the first half part of the switching action. In addition, the updating unit 3402 may replace a second half part of the switching action by an action for realizing natural switching between the second half part of the switching action and the non-verbal behavior at time $t_{l+1}$.

In addition, suppose that when the switching action synthesizing unit 3401 generates synthesized data, the switching action synthesizing unit 3401 duplicates and automatically inserts the last coded data ("2") of $AB_{mt1}$ and the first coded data ("2") of $AB_{pc}$ as respective halves in the part of the switching action ("XXX"). In this case, the updating unit 3402 duplicates avatar display information log data corresponding to the duplicated coded data, and inserts the avatar display information log data as switching action data.

In addition, the updating unit 3402 selects an appropriate switching action from among a plurality of switching actions. For example, the updating unit 3402 calculates degrees of similarity between synthesized data including the switching actions and synthesized data not including the switching actions, and selects a switching action corresponding to a higher degree of similarity. Further, the updating unit 3402 uses the switching action and candidate data corresponding to the synthesized data including the selected switching action when generating an image of the machine avatar at time $t_{l+1}$. Thus, the image of the machine avatar at time $t_{l+1}$ may be generated based on the synthesized data in which the inclusion of the switching action produces a smaller effect.

For example, suppose that the synthesized data including the switching actions is $AB_{mt1}+AB_{cc1}+AB_{pc}$ and $AB_{mt1}+AB_{cc2}+AB_{pc}$. In addition, suppose that the synthesized data not including the switching actions is $AB_{mt1}+AB_{pc}$. In this case, the updating unit 3402 calculates both a degree of similarity between $AB_{mt1}+AB_{cc1}+AB_{pc}$ and $AB_{mt1}+AB_{pc}$ and a degree of similarity between $AB_{mt1}+AB_{cc2}+AB_{pc}$ and $AB_{mt1}+AB_{pc}$.

Here, the updating unit 3402 calculates the degrees of similarity using coded data obtained by encoding social behavior log data. Incidentally, there may be a mode in which the degrees of similarity of the non-verbal behaviors are calculated for each bone or each social behavior by comparison of time series data of avatar bones. The following description will be made of a case where the degree of similarity between $AB_{mt1}+AB_{cc1}+AB_{pc}$ and $AB_{mt1}+AB_{pc}$ and the degree of similarity between $AB_{mt1}+AB_{cc2}+AB_{pc}$ and $AB_{mt1}+AB_{pc}$ are calculated using coded data obtained by encoding social behavior log data as illustrated in the fifth embodiment. Incidentally, because $AB_{mt1}$ and $AB_{pc}$ are common coded data, the updating unit 3402 calculates a degree of similarity between $AB_{mt1}+AB_{pc}$ and $AB_{cc1}$ and a degree of similarity between $AB_{mt1}+AB_{pc}$ and $AB_{cc2}$. In addition, suppose that $AB_{cc1}$ and $AB_{cc2}$ are generated based on last coded data included in $AB_{mt1}$ and first coded data included in $AB_{pc}$, and $AB_{cc1}$ and $AB_{cc2}$ will be described as $AB_{cc1}'$ and $AB_{cc2}'$ in the following.

The updating unit 3402 calculates a distance between the ratio of an approaching tendency of $AB_{mt1}+AB_{pc}$ and the ratio of an approaching tendency of $AB_{cc1}'$. Here, suppose that −0.2 is calculated as the distance between the ratio of the approaching tendency of $AB_{mt1}+AB_{pc}$ and the ratio of the approaching tendency of $AB_{cc1}'$. In addition, the updating unit 3402 calculates a distance between the ratio of an avoiding tendency of $AB_{mt1}+AB_{pc}$ and the ratio of an avoiding tendency of $AB_{cc1}'$. Here, suppose that 0.15 is calculated as the distance between the ratio of the avoiding tendency of $AB_{mt1}+AB_{pc}$ and the ratio of the avoiding tendency of $AB_{cc1}'$.

Next, the updating unit 3402 calculates a distance between the ratio of the approaching tendency of $AB_{mt1}+AB_{pc}$ and the ratio of an approaching tendency of $AB_{cc2}'$. Here, suppose that −0.3 is calculated as the distance between the ratio of the approaching tendency of $AB_{mt1}+AB_{pc}$ and the ratio of the approaching tendency of $AB_{cc2}'$. In addition, the updating unit 3402 calculates a distance between the ratio of the avoiding tendency of $AB_{mt1}+AB_{pc}$ and the ratio of an avoiding tendency of $AB_{cc2}'$. Here, suppose that 0.10 is calculated as the distance between the ratio of the avoiding tendency of $AB_{mt1}+AB_{pc}$ and the ratio of the avoiding tendency of $AB_{cc2}'$.

Supposing that Degree of Similarity=1−((|Approaching Tendency Distance|+|Avoiding Tendency Distance|)/2), the degree of similarity between $AB_{mt1}+AB_{cc1}'+AB_{pc}$ and $AB_{mt1}+AB_{pc}$ is 1−((|−0.2|+|0.15|)/2)=0.825. In addition, the degree of similarity between $AB_{mt1}+AB_{cc2}'+AB_{pc}$ and $AB_{mt1}+AB_{pc}$ is 1−((|−0.3|+|0.10|)/2)=0.8.

Consequently, the updating unit 3402 selects $AB_{cc1}'$ as an appropriate switching action. Further, the updating unit 3402 generates an image of the machine avatar at time $t_{i+1}$ based on $AB_{cc1}f+AB_{pc}$ including $AB_{cc1}'$ as the appropriate switching action data and the candidate data $AB_{pc}$.

<Machine Avatar Image Update Processing>

Figure 36:
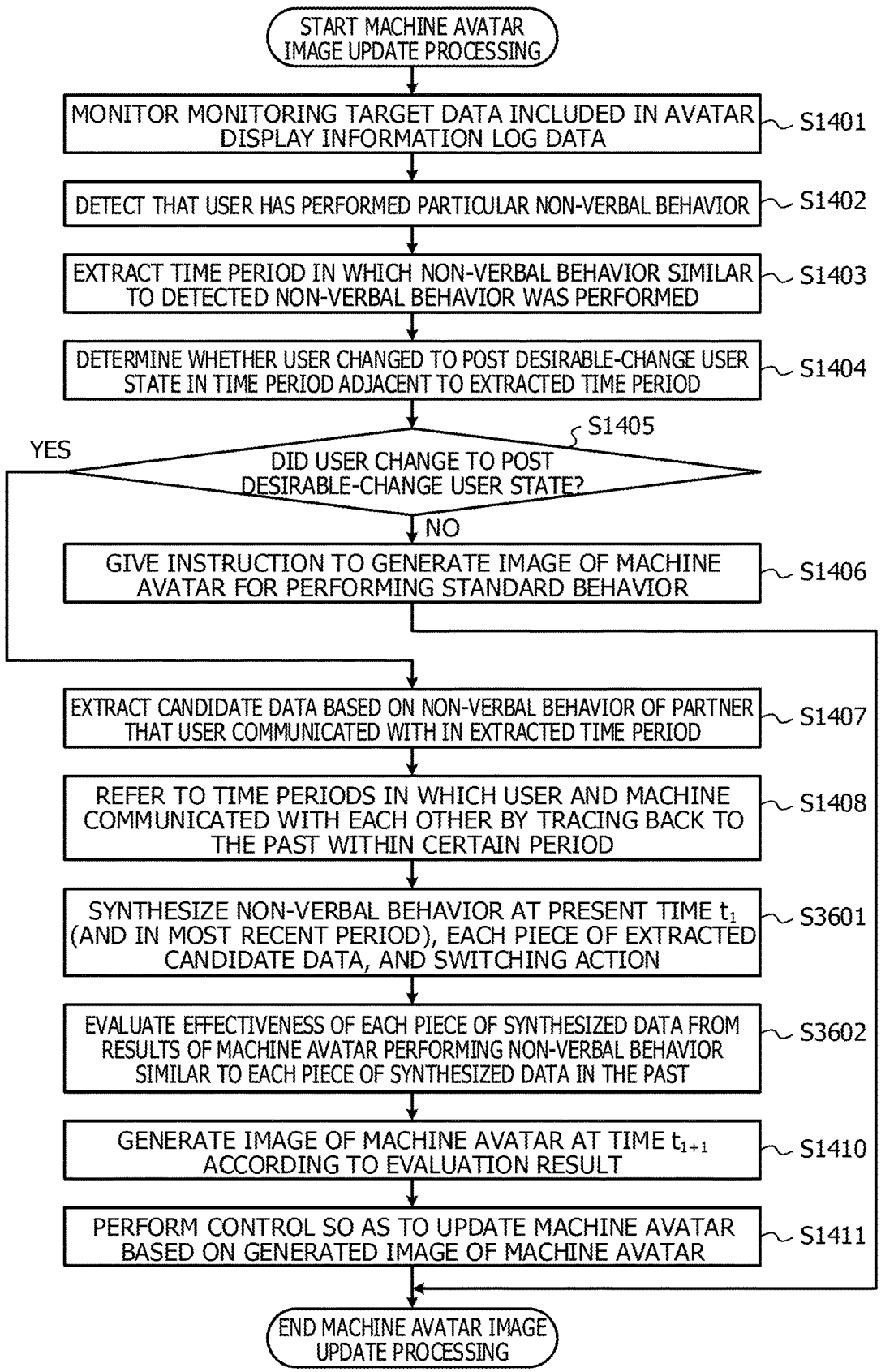
FIG. 36 is a sixth flowchart of machine avatar image update processing.

A flow of machine avatar image update processing will next be described. FIG. 36 is a sixth flowchart of machine avatar image update processing. Incidentally, of respective processes illustrated in FIG. 36, steps S1401 to S1408 and steps S1410 and S1411 are substantially the same as the respective corresponding processes in FIG. 14. Description will therefore be omitted in the following.

In step S3601, the switching action synthesizing unit 3401 generates synthesized data by synthesizing the avatar display information log data of the machine avatar at the present time and in the most recent period, switching action data, and candidate data.

In step S3602, the updating unit 3402 evaluates the effectiveness of the synthesized data.

By thus including appropriate switching action data to generate an image of the machine avatar, the ninth embodiment may reduce a feeling of strangeness between the image of the machine avatar at time $t_{i+1}$ and the image of the machine avatar at time $t_i$ when displaying the image of the machine avatar at time $t_{i+1}$.

It is to be noted that the present technology is not limited to the configurations illustrated herein. For example, the configurations cited in the foregoing embodiments may be combined with other elements. In these respects, the present technology may be changed without departing from the spirit of the present technology, and may be defined appropriately according to modes of application thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An action control method executed by a computer, the method comprising:
   detecting, on the basis of data obtained by a sensor, a first state of a first user in communication with a first machine avatar;
   extracting candidate data, from action history data, in which any user was in the first state;
   selecting a time period from a start time to a detection time that the detecting detects the first state of the first user;
   excluding one or more actions from the candidate data, the excluded one or more actions having taken place before the selected time period;
   identifying an action from the candidate data in which the one or more actions are excluded, the identified action being an action resulting in the any user changing from the first state to a second state; and
   causing the first machine avatar to take an action corresponding to the identified action.

2. The action control method according to claim 1, wherein the first state is non-verbal behavior.

3. The action control method according to claim 1, wherein the second state is a desirable non-verbal behavior for responding to the identified action.

4. The action control method according to claim 1, wherein the second state is a desirable social behavior for responding to the identified action.

5. The action control method according to claim 1, wherein
   the first state is detected by monitoring a particular action in a given frequency band among actions performed by the first user.

6. The action control method according to claim 1, wherein
   the first state is detected by monitoring a particular action not in a given frequency band among actions performed by the first user.

7. The action control method according to claim 1, wherein the one or more excluded actions are actions in which the any user is not in a desirable state for responding to the identified action.

8. The action control method according to claim 1, wherein the time period is a time period before the detection time.

9. The action control method according to claim 1, wherein the excluding includes calculating ratios for the candidate data relating to the any user changing from the first state to the second state, and the identifying being based on the calculated ratios.

10. The action control method according to claim 1, wherein the identifying includes synthesizing a candidate action and a switching action, the candidate action being specified based on the excluding.

11. An action control device comprising:
   a memory; and
   a processor coupled to the memory and the processor configured to:
   detect, on the basis of data obtained by a sensor, a first state of a first user in communication with a first machine avatar;

extract candidate data, from action history data, in which any user was in the first state;

select a time period from a start time to a detection time that the detecting detects the first state of the first user;

exclude one or more actions from the candidate data, the excluded one or more actions having taken place before the selected time period;

identify an action from the candidate data in which the one or more actions are excluded, the identified action being an action resulting in the any user changing from the first state to a second state; and cause the first machine avatar to take an action corresponding to the identified action.

12. The action control device according to claim 11, wherein the first state is non-verbal behavior.

13. The action control device according to claim 11, wherein the second state is a desirable non-verbal behavior for responding to the identified action.

14. The action control device according to claim 11, wherein the second state is a desirable social behavior for responding to the identified action.

15. The action control device according to claim 11, wherein the first state is detected by monitoring a particular action in a given frequency band among actions performed by the first user.

16. The action control device according to claim 11, wherein the first state is detected by monitoring a particular action not in a given frequency band among actions performed by the first user.

17. The action control device according to claim 11, wherein the one or more excluded actions include actions in which the any user is not in a desirable state for responding to the identified action.

18. A non-transitory computer-readable storage medium storing an action control program that causes a computer to execute a process comprising:

detecting, on the basis of data obtained by a sensor, a first state of a first user in communication with a first machine avatar;

extracting candidate data, from action history data, in which any user was in the first state;

selecting a time period from a start time to a detection time that the detecting detects the first state of the first user;

excluding one or more actions from the candidate data, the excluded one or more actions having taken place before the selected time period;

identifying an action from the candidate data in which the one or more actions are excluded, the identified action being an action resulting in the any user changing from the first state to a second state; and causing the first machine avatar to take an action corresponding to the identified action.

* * * * *